US009486710B2

(12) United States Patent
Kaneoka et al.

(10) Patent No.: US 9,486,710 B2
(45) Date of Patent: Nov. 8, 2016

(54) MANAGEMENT SERVER, CONTROLLING METHOD THEREOF, NON-TRANSITORY COMPUTER READABLE STORAGE MEDIUM HAVING STORED THEREON A COMPUTER PROGRAM FOR A MANAGEMENT SERVER AND TERMINAL DEVICE

(71) Applicants: Seiken Kaneoka, Tokyo (JP); Yuji Osato, Tokyo (JP); Kazuhiko Tajima, Tokyo (JP); Yoshiyuki Shimofure, Tokyo (JP); Kazuya Murakami, Tokyo (JP); Hiroki Doushita, Tokyo (JP)

(72) Inventors: Seiken Kaneoka, Tokyo (JP); Yuji Osato, Tokyo (JP); Kazuhiko Tajima, Tokyo (JP); Yoshiyuki Shimofure, Tokyo (JP); Kazuya Murakami, Tokyo (JP); Hiroki Doushita, Tokyo (JP)

(73) Assignee: KONAMI DIGITAL ENTERTAINMENT CO., LTD., Tokyo (JP)

( * ) Notice: Subject to any disclaimer, the term of this patent is extended or adjusted under 35 U.S.C. 154(b) by 262 days.

(21) Appl. No.: 14/453,053

(22) Filed: Aug. 6, 2014

(65) Prior Publication Data

US 2014/0351338 A1    Nov. 27, 2014

Related U.S. Application Data

(63) Continuation-in-part of application No. PCT/JP2013/051710, filed on Jan. 28, 2013.

(30) Foreign Application Priority Data

Feb. 6, 2012 (JP) ................................ 2012-023157
Mar. 19, 2012 (JP) ................................ 2012-061621

(51) Int. Cl.
*H04L 29/08*    (2006.01)
*H04L 12/58*    (2006.01)
*A63F 13/795*   (2014.01)

(52) U.S. Cl.
CPC ............ *A63F 13/795* (2014.09); *H04L 51/32* (2013.01); *H04L 67/22* (2013.01); *H04L 67/306* (2013.01); *A63F 2300/556* (2013.01)

(58) Field of Classification Search
CPC ............ A63F 2300/556; A63F 13/12; A63F 13/795; H04L 67/22; H04L 67/306; H04L 51/32
USPC ........................................................ 709/204
See application file for complete search history.

(56) References Cited

U.S. PATENT DOCUMENTS

| 8,388,450 | B1 | 3/2013 | McGuirk et al. |
| 2002/0090996 | A1 | 7/2002 | Maehiro |

(Continued)

FOREIGN PATENT DOCUMENTS

| JP | 2001-167188 A | 6/2001 |
| JP | 2001-321570 A | 11/2001 |

(Continued)

OTHER PUBLICATIONS

Communication dated Aug. 12, 2014, issued by the Japanese Patent Office in counterpart Japanese application No. 2013-007056.

(Continued)

*Primary Examiner* — Tu Nguyen
(74) *Attorney, Agent, or Firm* — Sughrue Mion, PLLC

(57) ABSTRACT

A management server is provided with an accepting unit for accepting identification information identifying an application, a specifying unit adapted for specifying a part or all of candidate users satisfying all of conditions out of one or more users with whom a request user's friendship is built in one or more utilized applications that the request user has utilized, a first condition in which the candidate user utilizes the application identified by the identification information, a second condition in which the request user's friendship with the candidate user has not been built in the identified application, a third condition in which a friend upper limit is not encountered, and a display controlling unit adapted for displaying the part or all of the candidate users specified by the specifying unit in the terminal device of the request user in order to select one or more users from the part or all of the candidate users.

13 Claims, 39 Drawing Sheets

(56) References Cited

U.S. PATENT DOCUMENTS

| | | | |
|---|---|---|---|
| 2007/0173324 A1 | 7/2007 | Multerer et al. | |
| 2008/0243853 A1 | 10/2008 | Reding et al. | |
| 2009/0164574 A1* | 6/2009 | Hoffman | H04W 4/02 709/204 |
| 2009/0197681 A1 | 8/2009 | Krishnamoorthy et al. | |
| 2010/0063969 A1 | 3/2010 | Kasargod et al. | |
| 2011/0124415 A1* | 5/2011 | Shimono | A63F 13/12 463/42 |
| 2012/0233255 A1* | 9/2012 | Nishina | A63F 13/12 709/204 |

FOREIGN PATENT DOCUMENTS

| | | |
|---|---|---|
| JP | 2002-157204 A | 5/2002 |
| JP | 2003-071138 A | 3/2003 |
| JP | 2005-322070 A | 11/2005 |
| JP | 2008-109704 A | 5/2008 |
| JP | 2010-039871 A | 2/2010 |
| JP | 2011-060165 A | 3/2011 |
| KR | 10-2010-0118975 A | 11/2010 |

OTHER PUBLICATIONS

Communication dated Aug. 19, 2014, issued by the Japanese Patent Office in counterpart Japanese application No. 2013-007055.

International Search Report dated Apr. 16, 2013, issued by the International Searching Authority in counterpart International application No. PCT/JP2013/051710.

Ryuji Kanbe, Let's create mixi application!, Sotec Co., Ltd, Apr. 30, 2010, the first edition, 38 total pages.

Sun-Boku Study Group, Sunshine Bokujo Perfect Guide, Glory Co., Ltd, Mar. 1, 2010, the first edition, the first copy, p. 18,, 26-27.

Appli-Style vol. 2, General Information Magazine, East Press, Apr. 1, 2011, p. 37.

"Facebook Game GoGoFarm." Art & Soft Space. Dec. 13, 2010. Web. (http://vart1.tistory.com/503). Four pages total.

* cited by examiner

FIG. 3

TBL11

| ID | AppID | RefID | UID | LastLogin |
|---|---|---|---|---|
| 1 | 00000001 | 00000011 | XCV56714 | 2012/2/7 |
| 2 | 00000002 | 00000011 | YUJ85224 | 2012/2/6 |
| 3 | 00000003 | 00000011 | 23150QWE | 2012/1/1 |
| 4 | 00000002 | 00000123 | REK354602 | 2011/12/22 |
| 5 | 00000001 | 00003120 | QWE75891 | 2012/1/25 |
| ⋮ | ⋮ | ⋮ | ⋮ | ⋮ |

FIG. 4

TBL12

| ID | UID | Limit |
|---|---|---|
| 1 | XCV56714 | 48 |
| 2 | 23150QWE | 24 |
| 3 | REK354602 | 36 |
| ⋮ | ⋮ | ⋮ |

FIG. 5

TBL13

| ID | Group | AppID | RefID_From | RefID_To | UID_From | UID_To | Stat |
|----|-------|-------|------------|----------|----------|--------|------|
| 1 | Freinds | 00000001 | 00000011 | 00003120 | XCV56714 | QWE75891 | 1 |
| 2 | Freinds | 00000002 | 00000123 | 00000011 | REK354602 | 23150QWE | 0 |
| 3 | Rival | 00000001 | 00003120 | 00000011 | QWE75891 | XCV56714 | null |
| 4 | Block | 00000002 | 00000123 | 00003120 | REK354602 | SCF55663 | null |
| 5 | Freinds | 00000001 | 00000011 | 00002221 | XCV56714 | KLY5711 | 2 |
| ... | ... | ... | ... | ... | ... | ... | ... |

TBL14

| ID | AppID | RefID_From | RefID_To | Date | Stat |
|---|---|---|---|---|---|
| 1 | 00000001 | 00000011 | 00003120 | 2011/7/3 | 1 |
| 2 | 00000004 | 04563371 | 00089320 | 2011/2/6 | 0 |
| 3 | 00000002 | 01002050 | 00120047 | 2012/1/5 | 1 |
| ⋮ | ⋮ | ⋮ | ⋮ | ⋮ | ⋮ |

FIG. 43

TBL11a

| ID | UID | LastLogin |
|---|---|---|
| 1 | XCV56714 | 2012/2/7 |
| 2 | YUJ85224 | 2012/2/6 |
| 3 | 23150QWE | 2012/1/1 |
| ⋮ | ⋮ | ⋮ |

FIG. 44

TBL12a

| ID | UID | Limit |
|---|---|---|
| 1 | XCV56714 | 48 |
| 2 | 23150QWE | 24 |
| ⋮ | ⋮ | ⋮ |

FIG. 45

TBL13a

| ID | Group | UID_From | UID_To | Stat |
|---|---|---|---|---|
| 1 | Freinds | XCV56714 | QWE75891 | 1 |
| 2 | Freinds | YXZ96325 | NHY54571 | 0 |
| 3 | Rival | QWE75891 | XCV56714 | null |
| 4 | Block | KLP88914 | SSK21230 | null |
| 5 | Freinds | XCV56714 | KLY5711 | 2 |
| ⋮ | ⋮ | ⋮ | ⋮ | ⋮ |

MANAGEMENT SERVER, CONTROLLING METHOD THEREOF, NON-TRANSITORY COMPUTER READABLE STORAGE MEDIUM HAVING STORED THEREON A COMPUTER PROGRAM FOR A MANAGEMENT SERVER AND TERMINAL DEVICE

CROSS-REFERENCES TO RELATED APPLICATION

This application is a Continuation Application of PCT Application No. PCT/JP2013/51710, filed Jan. 28, 2013 and based upon and claiming the benefit of priority from prior Japanese Patent Applications Serial No. 2012-023157 filed Feb. 6, 2012 and Serial No. 2012-061621 filed Mar. 19, 2012, the entire contents of all of which are incorporated herein by reference.

TECHNICAL FIELD

The present invention relates to techniques of inviting a user with whom a friendship is built on a service to another service.

BACKGROUND ART

In recent years, services providing applications on the Internet have been spreading rapidly. As one of these kinds of services, there is a game provided on a site such as an SNS (Social Networking Service). In this case, a game system often provides tools including an email, a chat, a bulletin board for communication. A user gets acquainted with other users by using the tools for communication to establish friendships with them. A user who becomes a friend may participate in a game that another user plays to battle a strong enemy jointly.

A conventional game system extracts users who can be candidate friends, and presents the extracted users to a user who requests the presentation of the candidate friends. (see Patent Document 1)

CITATION LIST

Non-Patent Document

Non-Patent Document 1: Appli-Style Vol. 2, General Information Magazine, East Press, Apr. 1, 2011, p. 37

SUMMARY OF INVENTION

Technical Problem

In the game system, plural games are usually provided, so that a game server is installed for each game. In the conventional game system, a friendship is managed in each game server, so the friendship exists independently for each game. A user who can be a friend in each game is restricted to one who has become friends on the SNS (real friend), or one who is arbitrarily chosen by the game system (virtual friend). It sometimes happens that a trusting relationship with the user who is arbitrarily chosen by the game system is built through progress of the game. If one user is the virtual friend with whom another user's trusting relationship is built, the other user wants to be friends with the one user even in the other games. If the one user is the real friend, there is an opportunity to communicate with the one user by using a mail function on the SNS. However, if the one user is the virtual friend, it is possible to communicate with the one user only in the game in which the other user's friendship with the one user is built. Therefore, there is a problem that the other user cannot choose the one user with whom the other user's friendship is built in another game as a user to whom the other user sends a friend request in a certain game. To solve the problem, it might be helpful that a function to search users is provided in the certain game in which the other user wants to send the friend request to the one user. However, it is difficult to achieve the function partly because a registration may be conducted using the same name when plural users are registered, partly because a processing load for the search is applied. There is another problem that it is unclear whether or not the one user to whom the other user wants to send the friend request in the certain game has played the certain game. This is because the one user needs to play the certain game if the other user sends the friend request to the one user in the certain game.

In view of the above situation, the present invention aims to provide a management server in which a user's friendship with another user is easily built in a certain application if the user's friendship with the other user is built in another application.

Solution to Problem

A measure employed in the present invention to solve the problem will be described below.

A management server according to the present invention, which is capable of communicating with plural application servers corresponding to plural applications respectively and terminal devices of users, which includes: an accepting unit adapted for accepting identification information identifying an application designated through an operation of the terminal device performed by a request user requesting a presentation of a candidate user who is a candidate for a friend; a specifying unit adapted for specifying a part or all of candidate users satisfying all of conditions out of one or more users with whom the request user's friendship is built in one or more utilized applications that the request user has utilized, a first condition in which the candidate user utilizes the designated application identified by the identification information accepted by the accepting unit, a second condition in which the request user's friendship with the candidate user has not been built in the designated application, a third condition in which a friend upper limit is not encountered; a display controlling unit adapted for displaying the part or all of the candidate users specified by the specifying unit in the terminal device of the request user in order to select one or more users from the part or all of the candidate users; and an instructing unit adapted for instructing the application server corresponding to the application indicated by the identification information accepted by the accepting unit to send a friend request for the one or more users selected out of the part or all of the candidate users by the request user.

The application includes a game application as an example. However, the present invention is not limited to this example. The application may include any kind of application.

In the above-described management server, it is preferable that the specifying unit specifies the candidate user satisfying the first condition by referring to a first user information table storing user information of one or more users utilizing the application identified by the identification information, the first user information table in which the user information is associated with the identification information, and specifies the candidate user satisfying the second condition by referring to a first friendship table storing at least a pair of user information of one user and user information of another user having a friendship with the one user, the first friendship table in which the pair of the user information of the one user and the user information of the other user is associated with the identification information.

In the present invention, the first user information table and the first friendship table may be included in a storing unit of the management server, and may be included an external storing device which can communicate with the management server.

The above-described invention is provided with a user information synchronizing unit adapted for synchronizing contents of the first user information table with contents of a second user information table storing user information of one or more users utilizing the application provided by the application server; and a friendship synchronizing unit adapted for synchronizing contents of the first friendship table with contents of a second friendship table storing at least a pair of the user information of one user and the user information of another user having friendship with the one user in the application provided by the application server.

In this invention, a timing of synchronization is optional. For instance, when the user information is updated in the application server, or the friendship is built as the result of approval, the synchronization may be conducted immediately. The synchronization may be conducted all together at a predetermined time. The second user information table and the second friendship table may be included in a part or all of the plural application servers, or may be included an external storing device which can communicate with a part or all of the plural application servers.

In above-described management server, the pair of the user information of the one user and the user information of the other user stored in the first friendship table may include the user information of the one user sending a friend request to the other user, and the user information of the other user accepting the friend request.

It is preferable that the specifying unit extracts the user information of the other user accepting the friend request in the pair of the user information of the other user accepting the friend request and the user information of the one user sending the friend request which coincides with the user information of the request user out of the pair of the user information of the one user and the user information of the other user associated with the identification information corresponding to the application the request user has utilized by referring to the first friendship table. It is also preferable that the specifying unit extracts the user information of the one user sending the friend request in the pair of the user information of the one user sending the friend request and the user information of the other user accepting the friend request which coincides with the user information of the request user. Then, it is preferable that the other user in the extracted user information of the other user and the one user in the extracted user information of the one user are treated as the user with whom the friendship is built in the application the request user has utilized.

In the above-described management server, it is preferable that the server includes an acquiring unit adapted for acquiring the friend upper limit of any of the users, which is set in the application server corresponding to the identification information accepted by the accepting unit, and the specifying unit specifies the candidate user satisfying the third condition by referring to the friend upper limit table storing the friend upper limit acquired by the acquiring unit, the first friend upper limit table in which the acquired friend upper limit is associated with the user information of the user.

More specifically, it is preferable that the acquiring unit includes a friend upper limit synchronizing unit adapted for synchronizing contents of the first friend upper limit table with contents of a second friend upper limit table storing the friend upper limit managed by the application server, the second friend upper limit table in which the managed friend upper limit is associated with the user information of each of the users. In this invention, a timing of synchronization is optional. For instance, when the friend upper limit is varied in the application server, it is preferable that the synchronization may be conducted immediately. If some delays are allowable, the synchronization may be conducted all together at a predetermined time. The second friend upper limit table may be included in the part or all of the plural application servers, or may be included in the external storing device which can communicate with the part or all of the plural application servers.

In the above-described management server, it is preferable that the server include an acquiring unit adapted for sending an inquiry request for the friend upper limit of any of the users to the application server corresponding the identification information accepted by the accepting unit, and acquiring the friend upper limit from the application server as a response to the inquiry request, and the specifying unit specifies the candidate user satisfying the third condition on the basis of the friend upper limit acquired by the acquiring unit.

In the above-described management server, it is preferable that the condition that the candidate user utilizes the application within a predetermined period is added to the first condition, the specifying unit specifies the candidate user satisfying the first condition by referring to an access table storing date information indicating a date of utilizing the application, the access table in which the date information is associated with the user information of the user.

The present invention does not limit the structures of various tables. For instance, the user information table and the access table may be configured as one table. The access table may be included in the management server, or may be included in the external storing device which can communicate with the management server.

In the above-described management server, it is preferable that the display controlling unit displays the utilized application the request user has utilized in the terminal device of the request user in order to select the one or more users from the part or all of the candidate users, and the specifying unit specifies the part or all of the candidate users satisfying all of the conditions out of the users with whom the request user's friendship is built in the utilized application selected by the request user in the terminal device.

In this invention, the utilized application may be displayed for each of utilized applications. Plural utilized applications may be specified, so the specified utilized applications may be displayed in the terminal device of the request user.

In the above-described management server, it is preferable that the specifying unit specifies the number of users who can be invited to utilized application the request user has utilized, and the display controlling unit displays the number of the users who can be invited specified by the specifying unit in the terminal device of the request user.

In this invention, the number of the users who can be invited may be specified for each of the utilized applications, and the specified number of users may be displayed for each of the utilized applications in the terminal of the request user. The total number of the users who can be invited in the plural applications may be specified, and the specified total number of the users may be displayed in the terminal device of the request user.

The present invention can be comprehended as a non-transitory computer readable recording medium with a program stored thereon, the program is used for a computer of the management server. In this case, the non-transitory computer readable recording medium with the program according to the present invention stored thereon, the program is used for the computer of the management server capable of communicating with plural application servers corresponding to plural applications respectively and terminal devices of users. The program causes the computer to function as: an accepting unit adapted for accepting identification information identifying an application designated the basis of an operation of the terminal device by a request user requesting a presentation of a candidate user who is a candidate for a friend; a specifying unit adapted for specifying a part or all of candidate users satisfying all of conditions out of one or more users with whom the request user's friendship is built in one or more utilized applications that the request user has utilized, a first condition in which the candidate user utilizes the designated application identified by the identification information accepted by the accepting unit, a second condition in which the request user's friendship with the candidate user has not been built in the designated application, a third condition in which a friend upper limit is not encountered; a display controlling unit adapted for displaying the part or all of the candidate users specified by the specifying unit in the terminal device of the request user in order to select one or more users from the part or all of the candidate users; and an instructing unit adapted for instructing the application server corresponding to the application indicated by the identification information accepted by the accepting unit to send a friend request for the one or more users selected out of the part or all of the candidate users by the request user.

The present invention can be comprehended as a controlling method for controlling a management server. In this case, the controlling method for controlling a management server according to the present invention is a method for controlling the management server capable of communicating with plural application servers corresponding to plural applications respectively and terminal devices of users. The method is provided with: accepting identification information identifying an application designated through an operation of the terminal device performed by a request user requesting a presentation of a candidate user who is a candidate for a friend; specifying a part or all of candidate users satisfying all of conditions out of one or more users with whom the request user's friendship is built in one or more utilized applications that the request user has utilized, a first condition in which the candidate user utilizes the designated application identified by the accepted identification information, a second condition in which the request user's friendship with the candidate user has not been built in the designated application, a third condition in which a friend upper limit is not encountered; displaying the part or all of specified candidate users in the terminal device of the request user in order to select one or more from the part or all of the candidate users; and instructing the application server corresponding to the application indicated by the accepted identification information to send a friend request for the one or more users selected out of the part or all of the candidate users by the request user.

The present invention can be comprehended as a non-transitory computer readable recording medium with a program stored thereon, the program is used for a computer of the terminal device of the user. In this case, the non-transitory computer readable recording medium with the program according to the present invention stored thereon, the program is used for a computer of the terminal device of the user, which is capable of communicating with the management server connected to plural application servers corresponding to plural applications respectively the management server being capable of communicating with plural terminal devices of plural users. Each of the plural application servers manages the friend upper limit indicating an upper limit of the number of friends for each of the users. The management server is provided with: an accepting unit adapted for accepting identification information identifying an application designated through an operation of the terminal device performed by the request user requesting a presentation of a candidate user who is a candidate for the friend; the specifying unit adapted for specifying a part or all of candidate users satisfying all of conditions out of one or more users with whom the request user's friendship is built in one or more utilized applications that the request user has utilized, a first condition in which the candidate user utilizes the designated application identified by the identification information accepted by the accepting unit, a second condition in which the request user's friendship with the candidate user has not been built in the designated application, a third condition in which a friend upper limit is not encountered; the display controlling unit adapted for displaying the part or all of the candidate users specified by the specifying unit in the terminal device of the request user in order to select one or more users from the part or all of the candidate users; and the instructing unit adapted for instructing the application server corresponding to the application indicated by the identification information accepted by the accepting unit to send a friend request for the one or more users selected out of the part or all of the candidate users by the request user. The program causes the computer to function as: a detecting unit adapted for detecting a variation of the friend upper limit of the user of the terminal device; and a notifying unit adapted for notifying the management server of a varied friend upper limit if the variation of the friend upper limit is detected by the detecting unit.

BRIEF DESCRIPTION OF DRAWINGS

FIG. 3 is an explanatory view illustrating an example of a data structure of a user information table, FIG. 4 is an explanatory view illustrating an example of a data structure of a friend upper limit table, FIG. 5 is an explanatory view illustrating an example of a data structure of a relation table, FIG. 43 is an explanatory view illustrating an example of a data structure of a second user information table according to the variation, FIG. 44 is an explanatory view illustrating an example of a data structure of the second table of a friend upper limit according to the variation, FIG. 45 is an explanatory view illustrating an example of a data structure of a second relation table according to the variation.

EMBODIMENTS OF INVENTION

With reference to the accompanying drawings, various embodiments of an application system by using a management server according to the present invention will be described.

1. Configuration of Application System

Figure 1:
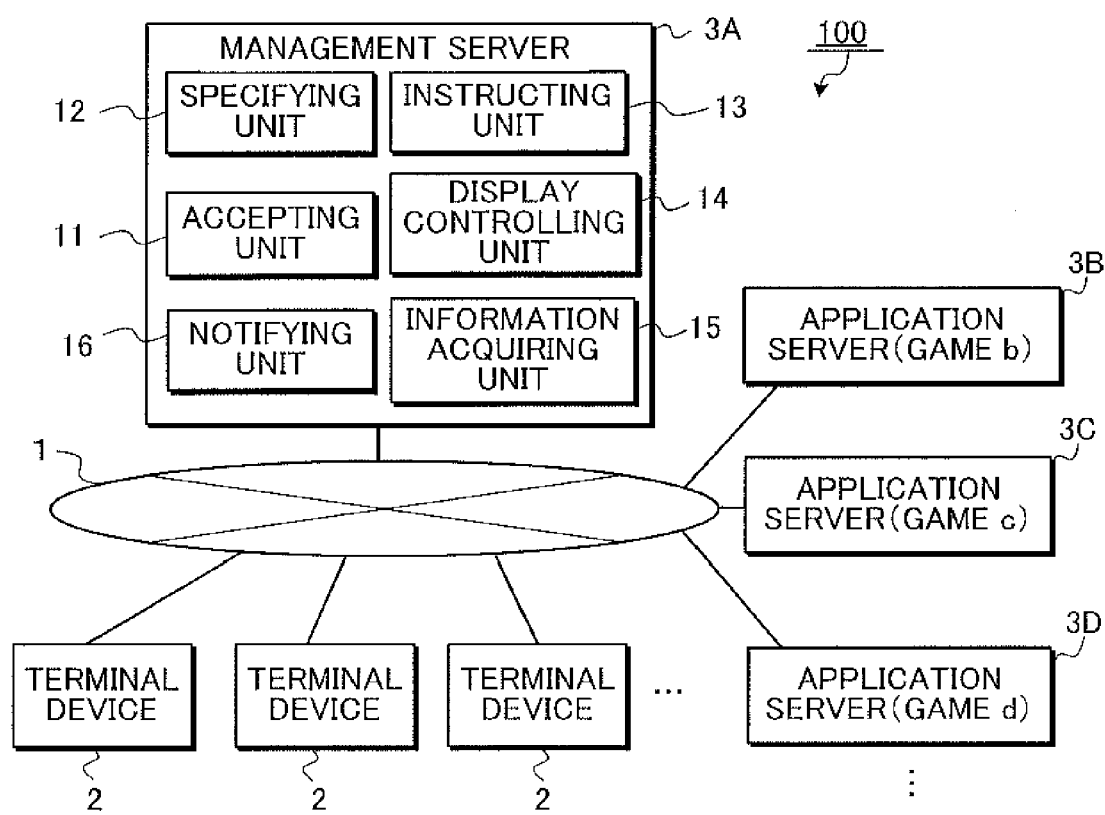
FIG. 1 is a block diagram of an application system according to an embodiment of the present invention.

FIG. 1 is a block diagram of an application system 100 according to an embodiment of the present invention. The application system 100 is provided with a communication network 1 such as the Internet, a user's terminal device 2, a management server 3A, and application servers including application servers 3B, 3C, 3D. The application servers 3B, 3C, 3D provide SNS sites, in which users can communicate with each other, and various services to the users. The communication between the users is achieved by sending and receiving messages between the users. Sending and receiving of the messages are achieved by using tools including a bulletin board, an email, a chat, for example. In this embodiment, the services that the application servers 3B, 3C, 3D provide are games including a game b, a game c, a game d respectively. The user of each of the application servers 3B, 3C, 3D builds friendships with other users in the same game (application) to conduct communication such as greeting, comments with each other, so that the user can acquire points having exchange value on the game. In a battle on the game, the game progresses more advantageously as the user has a lot of friends. For example, the user can receive friends' support.

If one user as a requester sends a friend request to another user as a receiver, and the receiver accepts the friend request, a friendship is built between the requester and the receiver. In addition, one user who plays a certain game can invite another user who does not play the game to the game in the application system 100.

The management server 3A provides the SNS site in which users can communicate with each other to each of the users, and functions as an Internet portal. The management server 3A centrally manages friendships built in the application servers 3B, 3C, 3D.

The user's terminal device 2 can perform communication through the communication network 1. For example, a personal computer or a cellular phone is used as the terminal device 2. The application system 100 can provide the users a communication function between the users and shopping function for games, services, and products.

Figure 2:
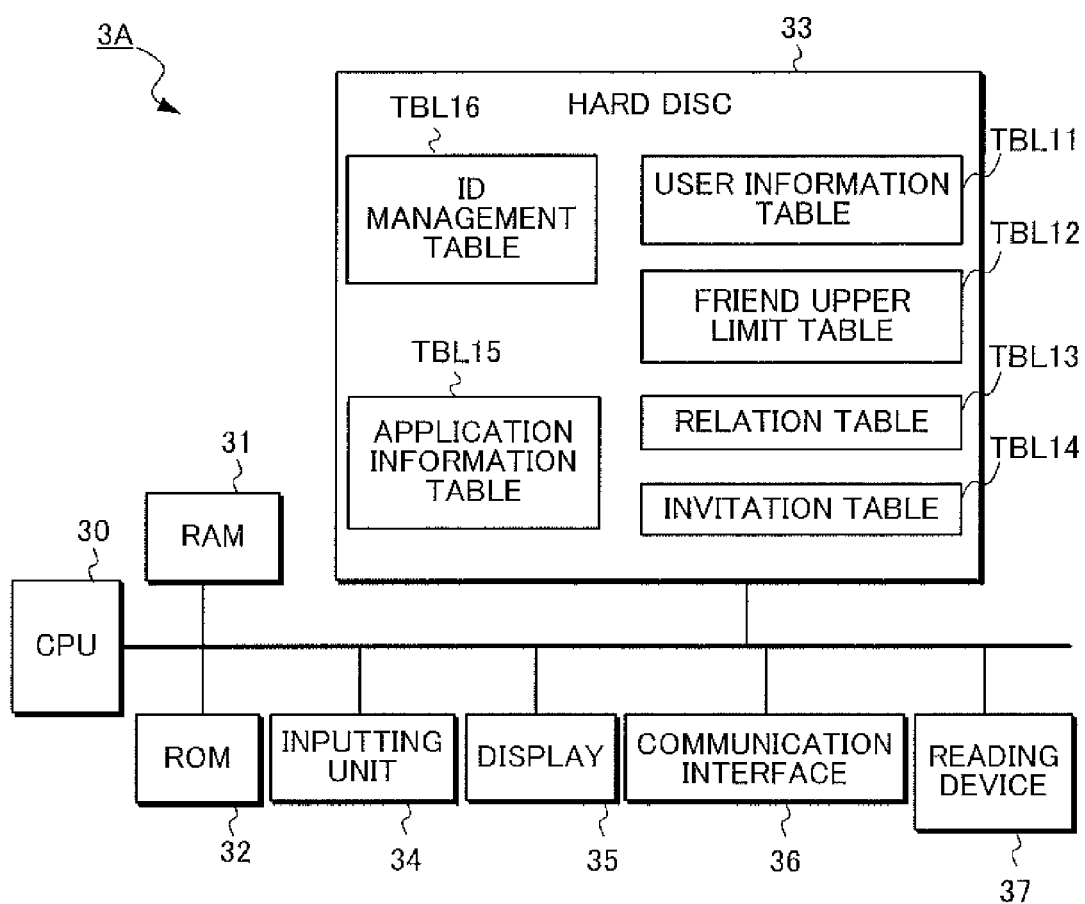
FIG. 2 is a block diagram illustrating a configuration of a management server.

FIG. 2 illustrates the configuration of the management server. As illustrated in FIG. 2, the management server 3A is provided with a CPU (Central Processing Unit) 30 controlling the whole of the server, a RAM (Random Access Memory) 31 functioning as a work area of the CPU 30, a ROM (Read Only Memory) 32 storing a program such as a boot program, a hard disc 33 storing various programs and data, an inputting unit 34 including a keyboard and a mouse, a display 35 displaying images, a communication interface 36 communicating with an external apparatus through the communication network 1, and a reading device 37 reading an information recording medium such as a compact disc.

The hard disc 33 stores tables including a user information table TBL11, a friend upper limit table TBL12, a relation table TBL13, an invitation table TBL14, an application information table TBL15, an ID management table TBL16.

FIG. 3 illustrates the data structure of the user information table TBL11. In the user information table TBL11, plural records are stored. One record is provided with a record identification information ID identifying each of the records uniquely, an identification information AppID identifying each of the applications, a reference identification information RefID identifying each of the users uniquely, a user identification information UID identifying each of the applications and each of the users uniquely, and a last login information LastLogin indicating the date of the last login.

The reference identification information RefID is not open to users, but used inside the system. The reference identification information RefID is associated with a login identification information UserID that is known to the users, and managed in the ID management table TBL16. A unique reference identification information RefID is assigned to a unique user even if the unique user utilizes a different application. However, the user identification information UID is different in every application. The function of the user identification information UID corresponds to the pair of the function of the identification information AppID and the function of the reference identification information RefID. It is unnecessary to be able to identify the application only based on the user identification information UID.

For example, in each of records in which the record identification information ID is "1", "2", and "3", "00000011" is stored as the reference identification information RefID, which is assigned to a unique user. However, the identification information AppID and the user identification information UID are different in each of the records in which the record identification information ID is "1", "2", and "3".

The correspondence of the login identification information UserID and the reference identification information RefID is managed in the ID management table TBL16. If the login identification information UserID is stolen by a third party, for example, it is possible to issue a new login identification information UserID, and associate the new login identification information UserID with the reference identification information RefID. This restoration is achieved only by updating the ID management table TBL16, but does not affect the other tables.

FIG. 4 illustrates the data structure of the friend upper limit table TBL12. In the table TBL12, plural records are stored. In one record, the record identification information ID, the user identification information UID, and the friend upper limit Limit are associated with each other. As described above, the application serves 3B, 3C, 3D provide games as the applications. The friend upper limit is set in every game. The friend upper limit varies depending on the user's level. If the friend upper limit varies, each of the application servers 3B, 3C, 3D send the management server 3A a pair of the user identification information UID and the friend upper limit Limit as a notification of the friend upper limit. When receiving the notification of the friend upper limit, the management server 3A updates the table TBL12. Therefore, the management server 3A can centrally manage the friend upper limit Limit of each user.

FIG. 5 illustrates the data structure of the relation table TBL13. In the relation table TBL13, plural records are stored. In one record, a record identification information ID, the identification information AppID, a group information Group illustrating a type of relationship, a requester's reference identification information RefID_From that is the reference identification information RefID of the requester, a receiver's reference identification information RefID_To that is the reference identification information RefID of the receiver, a requester's user identification information UID_From that is the user identification information UID of the requester, a receiver's user identification information UID_To that is the user identification information UID of the receiver, and a status information Stat illustrating the status of the request are associated with each other, and are stored.

The details of friendships between users are stored separately in a requester side and in a receiver side, so that there is a merit in that memory capacity is reduced. If the user identification information UID of a certain user and the user identification information UID of all users who have friendships with the certain user are stored by associating them with each other, twice the amount of the memory capacity is necessary. For example, assuming that a user A is the requester, and a user B is the receiver, if the user identification information of one user having a friendship with another user is stored for each of users, it is necessary to store information that the user B has a friendship with the user A, and information that the user A has a friendship with the user B. Contrary, in this embodiment, the requester's user identification information and the receiver's user identification information are stored in one record by associating them with each other, so that the memory capacity can be reduced by half Processing steps can be reduced by half even if the status information Stat is updated.

A relationship between a certain user and another user includes a friendship, a relationship as rivals, and a relationship of blocking. The friendship is established when a friend request of the certain user is sent to another user, and another user approves the friend request. The relationship as rivals is established when the certain user reports the other user to be a rival. The other user's approval for the report is unnecessary to establish the relationship as rivals. For example, if the certain user is nervous about the other user who plays the same game, and registers the other user as a rival, the relationship as rivals is used. The relationship of blocking is established when the certain reports the other users who the certain users wants to block in the same way as establishing relationship as rivals. The other user's approval for the report is unnecessary to establish the relationship of blocking. If a friend request is often sent from the other user even though the certain user refuses to accept the request, or the certain user is annoyed by the other user's comments on a bulletin board, the certain users registers the other user as a blocking user. The relationship of blocking is used for this registration.

If the relationship between users in the record is the friendship, "Friends" is recorded as the group information Group. If the relationship between users in the record is the relationship as rivals, "Rival" is recorded as the group information Group. If the relationship between users in the record is the relationship of blocking, "Block" is recorded as the group information Group. If the friend request is pending, "0" is recorded as the status information Stat. If the friend request has been accepted, "1" is recorded as the status information Stat. If the friend request has been refused, "2" is recorded as the status information Stat. The relationship as rivals and the relationship of blocking are established only by reporting, so that it is unnecessary to record the status information Stat. Therefore, "null" is recorded as the status information Stat in this case. In the relationship as rivals and the relationship of blocking, "0" may be recorded as the status information Stat in this case.

The record in which the record identification information ID is "1" indicates that the friend request from the user indicated with"00000011" as the reference identification information RefID to the user indicated with "00003120" as the reference identification information RefID has been accepted. At the timing that the user indicated with "00000011" as the reference identification information RefID conducts the friend request, the record in which the record identification information ID is "1" is generated, so that the status information Stat is set to "0". After the user indicated with "00003120" as the reference identification information RefID receives the friend request, at the timing that the user accepts or refuses the friend request, the status information Stat is updated to "1" indicating the acceptance, or updated to "2" indicating the refusal.

If the identification information AppID is limited to that of a specific game by referring to the relation table TBL13, it is possible to comprehend the friendships between the users in the game. It is possible to comprehend the user who has a friendship with a certain user, or the user having a friend request pending.

If the friendship is cancelled after the friendship is built, the record is deleted. If a field indicating that the record is valid or invalid is newly added, the record may be invalid after the friendship is cancelled without deleting the record. If the friendship is built again between one user and the other user with whom the friendship is cancelled, a new record may be generated.

Figures 6, 7:
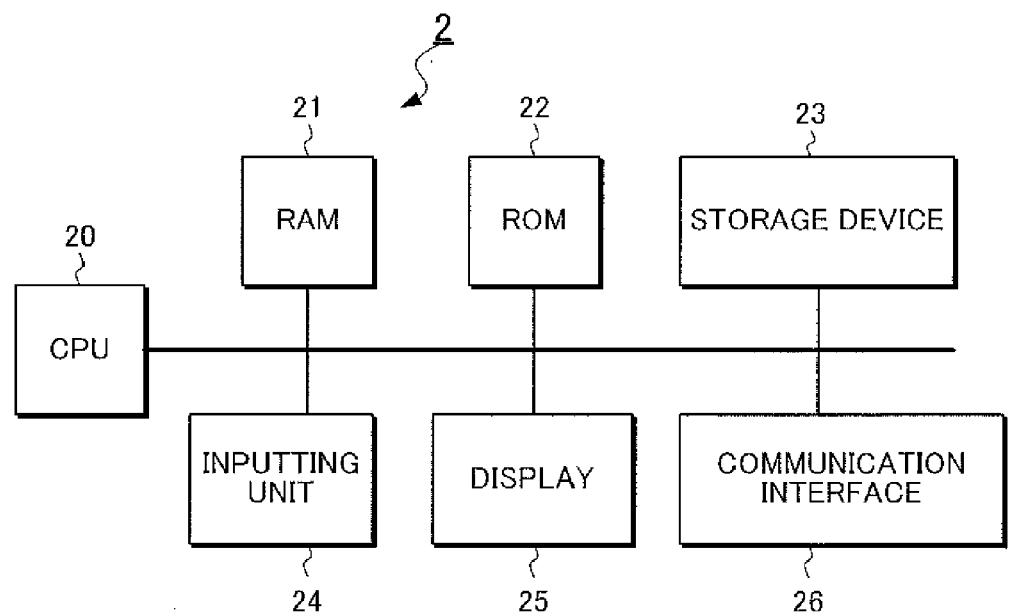
FIG. 6 is an explanatory view illustrating an example of a data structure of an invitation table.
FIG. 7 is a block diagram illustrating a configuration of a terminal device.

FIG. 6 illustrates the data structure of the invitation table TBL14 managing a history of invitation. In one record of the invitation table TBL14, a record identification information ID, the identification information AppID, a requester's reference identification information RefID_From that is the reference identification information RefID of the user inviting the other user, a receiver reference identification information RefID_To that is the reference identification information RefID of the user who is invited, a date information Date indicating the date of the invitation, and a status information Stat indicating the status of the invitation are associated with each other, and are stored. If the status information Stat is "0", it indicates that a request of the invitation is pending. If the status information Stat is "1", it indicates that a request of the invitation has been approved or refused.

It is possible to know who invites, who is invited, and at which game the invitation is sent by referring the invitation table TBL14. For example, the record in which the record identification information ID is "1" indicates that the invitation from the user indicated with "00000011" as the reference identification information RefID to the user indicated with "00003120" as the reference identification information RefID has been sent, and been approved or refused.

At the timing that the user indicated with "00000011" as the reference identification information RefID sends the invitation, the record in which the record identification information ID is "1" is generated, so that the status information Stat is set to "0". After the user indicated with "00003120" as the reference identification information RefID receives the invitation, at the timing that the user accepts or refused the invitation, the status information Stat is updated to "1".

If the status information Stat is "1", the invitation is approved or refused. In this case, the management server 3A controls the system so that the invitation cannot be sent again to the user who approves or refuses once. If the CPU 30 judges that the pending status of the invitation is continued beyond a predetermined period from the beginning of the invitation on the basis of the date information Data indicating the date of the invitation, the CPU 30 forcibly updates the status information Stat to "1" indicating the refusal. If a field indicating that the record is valid or invalid is newly added, the record may be invalid after the lapse of the predetermined period.

In one record of the application information table TBL15 shown in FIG. 2, the record identification information ID, the identification information AppID, an application name information indicating the name of the application (the name of the game), an explanation information indicating the details of the application (the game), and an icon information indicating an icon corresponding to the application are associated with each other, and are stored.

The CPU 30 of the management server 3A functions as an accepting unit 11, a specifying unit 12, an instructing unit 13, a display controlling unit 14, an information acquiring unit 15, and a notifying unit 16 by executing a predetermined control program.

The accepting unit 11 accepts the identification information AppID identifying the application designated through an operation the terminal device performed by the request user requesting a presentation of a candidate user who is a candidate for a friend. The identification information AppID may presented from the terminal device 2, or from the application servers 3B, 3C, 3D.

In the friend request, the specifying unit 12 specifies a part or all of candidate users satisfying all of conditions among the users with whom the friendship is built in the application other than one in which the friend request is sent out of utilized applications the request user has utilized. The first condition is that the candidate user utilizes the application indicated with the identification information AppID accepted by the accepting unit 11. The second condition is that the request user's friendship with the candidate has not been built in the designated application. The third condition is that the friend upper limit is not encountered. The friend request is conducted for the game in which the request user wants to become the friend with another user on the premise that the request user's friendship is built with the other user in the game other than one in which the request user wants to become the friend with the other user. Therefore, the other user needs to utilize the designated application (the first condition). The request user wants to become the friend with the other user. Consequently, it is natural that the request user's friendship is not built with the other user (the second condition). It is necessary to consider the friend upper limit (the third condition).

In the invitation, the specifying unit 12 specifies a part or all of candidate users satisfying a condition that the part or all of the candidate users do not utilize the application designated with the identification information AppID accepted by the accepting unit 11.

The display controlling unit 14 displays the part or all of the candidate users specified by the specifying unit 12 in the terminal device 2 of the request user in order to select the candidate user from the candidate users. Specifically, the display controlling unit 14 generates a page on which it is possible to select the one or more candidate users (refer to FIG. 13). The selectable way includes an aspect that one or more the candidate users are displayed to the request user to be selected in a sequence by switching pages per a predetermined unit out of all of the candidate users. The selectable way also includes another aspect that the candidate users are displayed to the request user to be selected by extracting one or more the candidate users out of all of the candidate users randomly or according to a predetermined rule. The display controlling unit 14 displays usage information relating to the application acquired by an information acquiring unit 15 in the terminal device 2 of the request user.

The instructing unit 13 instructs the application servers 3B, 3C, 3D corresponding to the application indicated with the identification information AppID accepted by the accepting unit 11 to send the friend request to one or more the users selected out of one or more the candidate users by the request user. Accordingly, a requested user notices that the friend request is conducted when accessing the application servers 3B, 3C, 3D. The requested user can know that the friend request reaches on a page such as the user's own page.

The information acquiring unit 15 acquires the usage information relating to a predetermined application, which is popular among predetermined friends and is accepted by the accepting unit 11, in an inquiring processing described later. The details of the inquiring processing will be described later.

The notifying unit 16 notifies the candidate user selected out of one or more the candidate users displayed in the terminal unit 2 of an invitation request. The details of this processing will be described later.

FIG. 7 illustrates the configuration of the terminal device 2. The terminal device 2 is provided with a CPU 20 controlling the whole of the terminal device 2, a RAM 21 functioning as a working area of the CPU 20, a ROM 22 storing programs such as boot program, a storage device 23 storing various program and data, an inputting unit 24 including a ten key and a communication interface 26 communicating with an external device through the communication network 1.

2. Operation of the Application System

In the application system 100, it is possible for a certain user to invite another user who does not play the game to the game that the certain user plays. It is possible to send the friend request to the other user playing the game, including a friend in the other game. It is possible for the user to inquire games which is popular among the friends in plural games the user plays or the number of friends who play each game. Common processing that is common to the invitation and the friend request, the friend request processing relating to the friend request, the invitation processing relating to the invitation, and the inquiring processing relating to various inquiries will be described below.

2-1: The Common Processing

Figure 8:
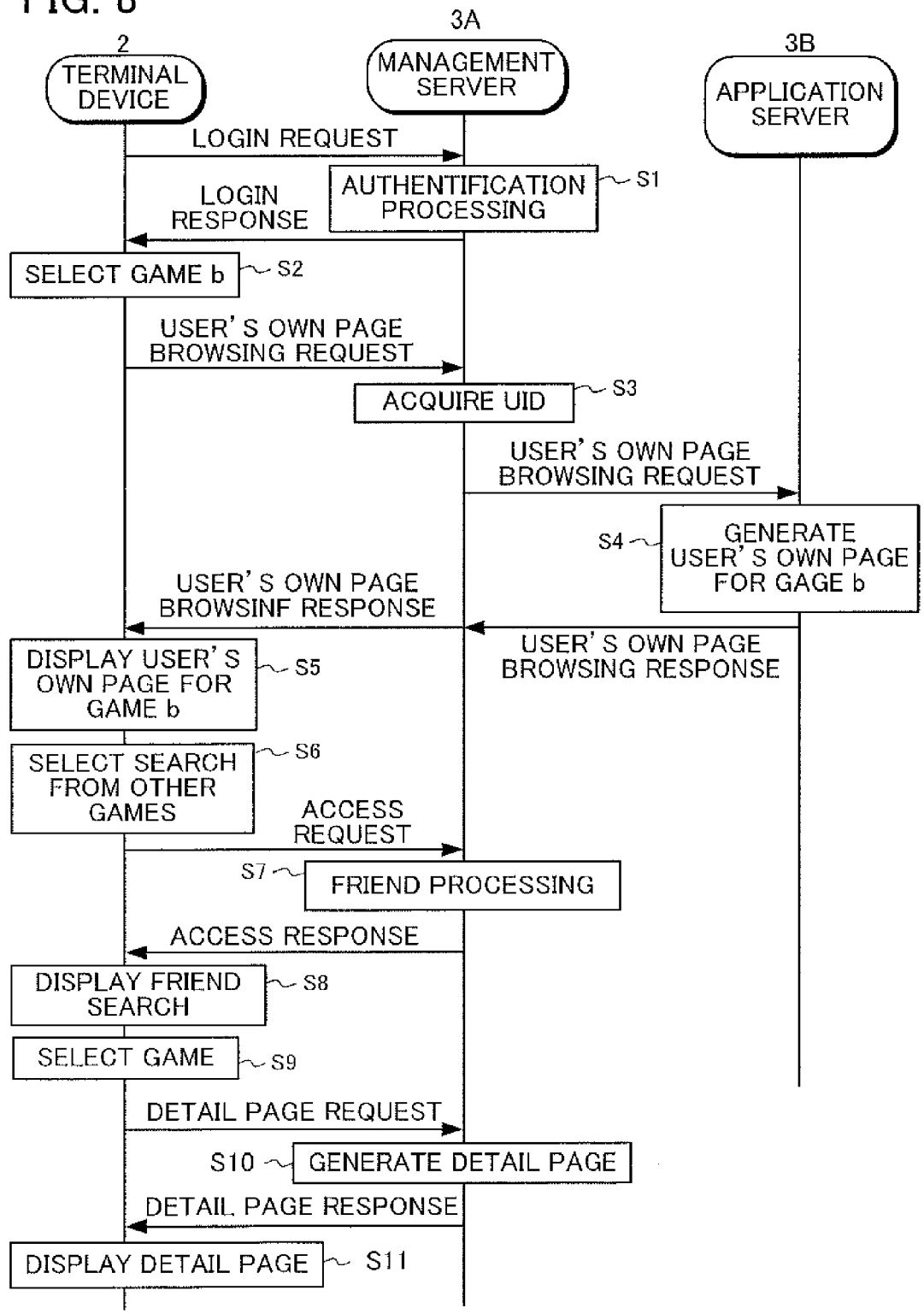
FIG. 8 is a sequence diagram illustrating an operation sequence of an application system according to common processing.

FIG. 8 illustrates an operation sequence of the application system relating to the common processing. When the user of the terminal device 2 accesses a login page of the application by starting the application that runs on a web browser or is installed in the terminal device 2, a login screen is displayed on the display 25 of the terminal device 2. On this login screen, input boxes for inputting the login identification information UserID and a password PSW are displayed. If the user inputs information in the input boxes, and presses a send button, the CPU 20 of the terminal device 2 sends a login request including the inputted login identification information UserID and the password to the management server 3A.

When the CPU 30 of the management server 3A receives the login request, the CPU 30 of the management server 3A executes authentication processing (S1). Specifically, the CPU 30 judges whether or not a pair of the login identification information UserID and the password is stored. If judgment condition is satisfied, the CPU 30 allows a login. If the judgment condition is not satisfied, the CPU 30 refuses the login. The CPU 30 sends a login response indicating a result of the judgment to the terminal device 2. The pair of the login identification information UserID and the password once inputted in the terminal device 2 has been being stored for a predetermined period in the terminal device 2. Therefore, the login can be omitted only for the predetermined period.

After that, it is assumed that one user selects the game by selecting a selection item (S2). In this case, the CPU 20 of the terminal device 2 sends a user's own page browsing request to the management server 3A.

If the CPU 30 of the management apparatus 3A receives the user's own page browsing request, the CPU 30 acquires the reference identification information RefID corresponding to the login identification information UserID by referring the ID management table TBL16. The CPU 30 acquires the user identification information UID corresponding to the reference identification information RefID and the identification information AppID of the game b by referring the user information table TBL11 (S3).

If the CPU 30 of the management server 3A sends the user's own page browsing request including the user identification information UID to the application server 3B providing the game b, the application server 3B generates the user's own page for the game b corresponding to the user identification information UID to send this information as a user's own page browsing response to the terminal device 2 through the management server 3A.

The user identification information UID acquired in step S3 may be notified to the terminal device 2, so that the communication between the terminal device 2 and the application server 3B may be conducted without using the management server 3A.

Figure 9:
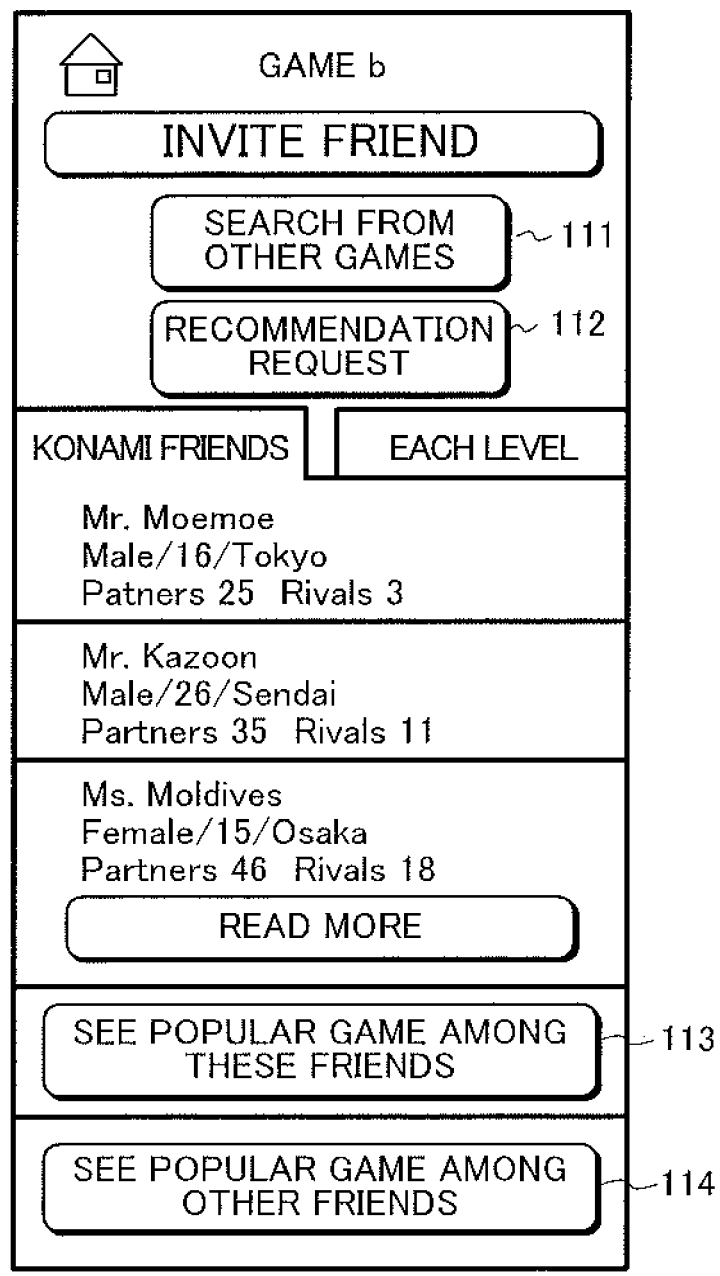
FIG. 9 is an example of a screen displayed when "INVITE FRIEND" is selected from selection item pairs of a user's own page.

If the CPU 20 of the terminal device 2 receives the user's own page browsing response, the CPU 20 displays the user's own page for the game b on the display 25 (S5). If the user selects "INVITE FRIEND" from the selection item of the user's own page, the screen shown in FIG. 9 is displayed, for instance. In this screen, if the user clicks a button 112 indicating "RECOMMENDATION REQUEST", the application server 3B extracts the other users with whom the one user's friendships are not built, so that the application server 3B generates a page of a list of the extracted users, and notifies the page to the terminal device 2. The one user selects some users with whom the one user wants to become friends out of the list. The CPU 30 of the management server 3A notifies the some users selected by the one user that friend requests have been sent to the selected some users by displaying that on the selected users' own page, for example. If a current number of the one user's friend reaches the friend upper limit in the game b, the button 112 indicating "RECOMMENDATION REQUEST" is set to be invalid not to be clicked, or not to be displayed.

In this screen, if the one user selects "SEARCH FROM OTHER GAMES" by clicking a button 111, this page is switched to a friend page. The data to link to the friend page of the SNS site is assigned to the button 111. The data also includes the identification information AppID indicating the game b and the user identification information UID indicating the one user. If the CPU 30 of the management server 3A receives an access request to the friend page, the CPU 30 of the management server 3A executes the friend processing (S7), and sends an access response back.

Figure 10:
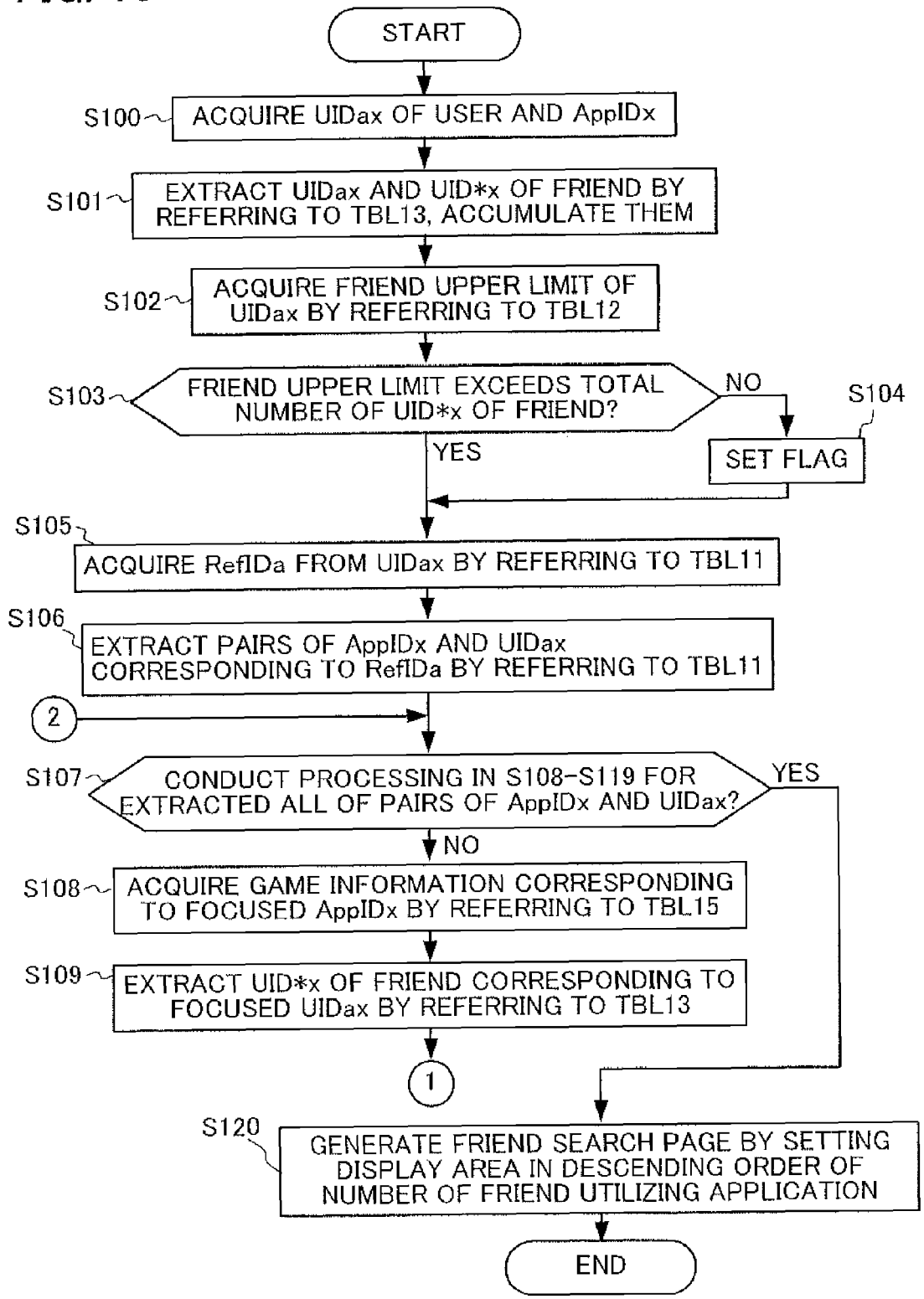
FIG. 10 is a flowchart illustrating processing details of friend processing.
Figure 11:
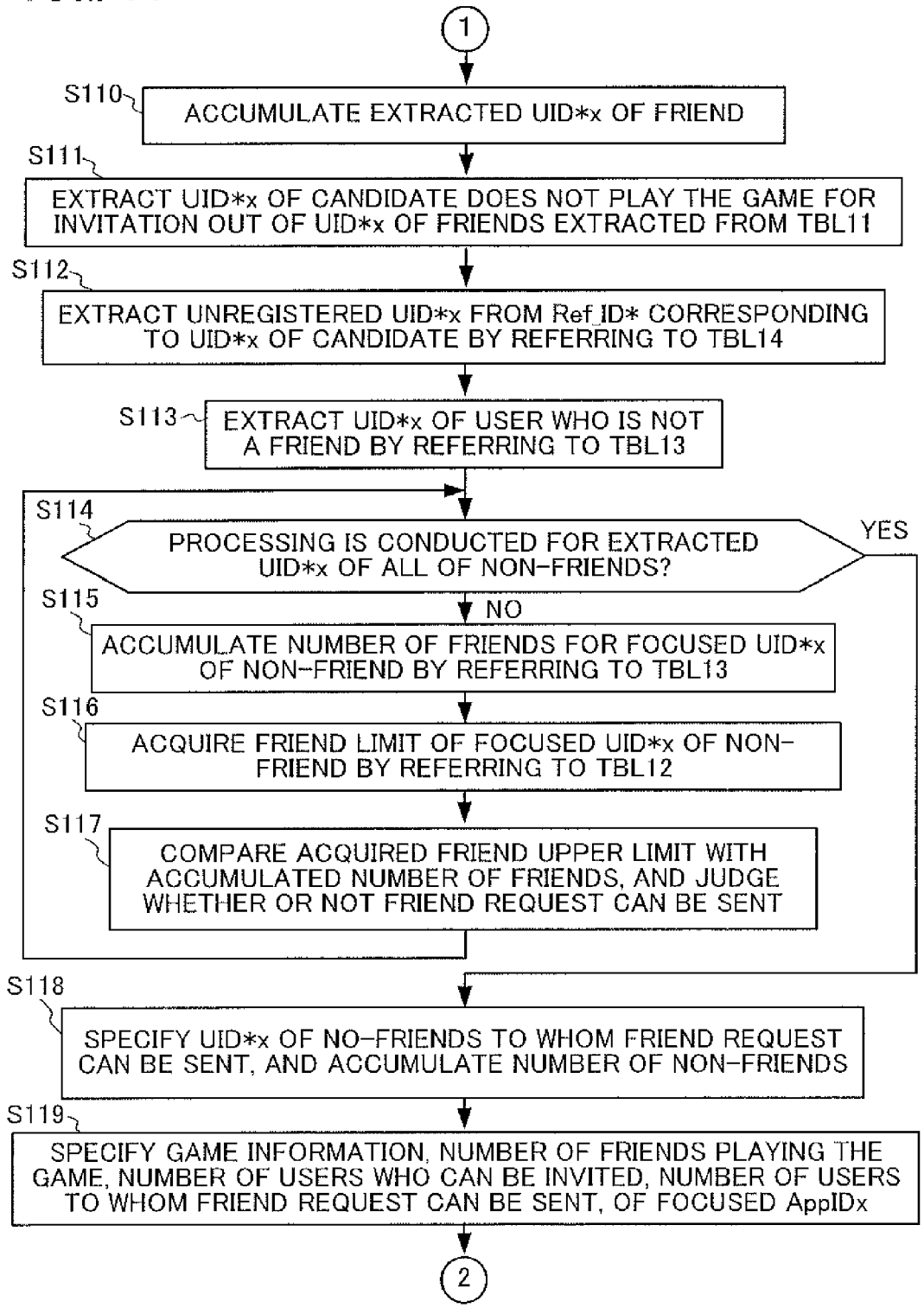
FIG. 11 is a flowchart illustrating processing details of friend processing.

With reference to FIG. 10 and FIG. 11, the details of the friend processing will be described. In the following explanation, the one user who selects "SEARCH FROM OTHER GAMES" is called "user A". The subscript "a" is added to information relating to the user A. The subscript "*" is added to information relating to the other users. The identification information AppID is common information to the user A and the other users, which is uniquely defined for each game. Therefore, the subscript "x" is added to the identification information AppID. The reference identification information UID is information that is given for each game, so that different user identification information UID is assigned to a unique user if the unique user plays a different game. Therefore, the subscript "ax" is added to the user identification information UID of the user A. The subscript "*x" is added to the user identification information UID of the other users.

The CPU 30 acquires the user identification information UIDax and the identification information AppIDx of the game to which the user A wants to invite the other users, which are included in the received access request (S100). In this embodiment, the acquired identification information AppIDx is "00000001", which indicates "game b" that is subject to the friend request and the invitation. The acquired user identification information UIDax is "XCV56714".

The CPU 30 executes processing of judging whether or not the number of friends of the user A reaches the friend upper limit (S101-S104). The CPU 30 extracts the user identification information UID*x of the other users in records in each of which the status information Stat associated with the user identification information UIDax of the user A indicates a friendship status (Stat=1) or a pending status (Stat=0) by referring to the relation table TBL13. The CPU 30 accumulates the number of the extracted information (S101). The CPU 30 acquires the friend upper limit corresponding to the user identification information UIDax of the user A by referring to the friend upper limit table TBL12 (S102).

The CPU 30 judges whether or not the acquired friend upper limit exceeds the accumulated number of the user identification information UID*x of the other users (S103). If this judgment condition is negated, the accumulated number of the user identification information UID*x of the other users, that is, the number of the friends and the users in the pending status for the user A has reached the friend upper limit in the game in which the user A wants to send the friend request to the other users. Therefore, the friend request is unavailable. In this case, the CPU 30 sets a flag indicating that the friend request is unavailable (S104).

The CPU 30 acquires the reference identification information RefID of the user A out of the use identification information UIDax by referring to the user information table TBL11 (S105). The CPU 30 specifies one or plural pairs of the identification information AppID and the user identification information UIDax corresponding to the reference identification information RefIDa of the user A by referring to the user information table TBL11 (S106). For example, assuming that the details stored in the user information table TBL11 is ones show in FIG. 3, and the reference identification information RefIDa of the user A is "00000011", in this case, the pairs of the identification information AppIDx and the user identification information UIDax are "AppID=00000001, UID=XCV56714", "AppID=00000002, UID=YUJ85224, "AppID=00000003, UID=23150QWE". The pairs of all of the extracted identification information AppID and the user identification information UIDax include the pair "AppID=00000001, UID=XCV56714" in a subject game that is subject to the friend request or the invitation. Therefore, the pairs except for the pair in the subject game are described as all of the extracted pairs of the identification information AppIDx and user identification information UIDax in the following processing. This is because the other user with whom the user A's friendship has been built in the subject game cannot be subject to the friend request or the invitation.

The CPU 30 judges whether or not the processing in step S108-S119 is terminated with respect to all of the extracted pairs of the identification information AppIDx and user identification information UIDax (S107). The CPU 30 terminates the friendship processing if the processing in step S108-S119 is terminated. If the processing in step S108-S119 is not terminated, one of the pairs of the identification information AppIDx and user identification information UIDax, for which the processing is not terminated, is focused on.

The CPU 30 acquires the name of the application and the icon information corresponding to the focused identification information AppIDx by referring the application information table TBL15 (S108). The acquired names of the applications (names of the games) are displayed on an area 122 of a friend search page mentioned below (refer to FIG. 12). Icons indicated by the icon information are displayed on an area 121.

The CPU 30 conducts the processing of counting the number of the friends in the focused applications (S109-S110). The CPU 30 extracts the user identification information UID*x of the friends corresponding to the focused user identification information UIDax (S109). The user identification information UID*x of the friends, with whom the user A's friendships are built in the games other than the subject game, are extracted. Specifically, the receiver's reference identification information RefID_To is extracted out of the record in which the user identification information UIDax of the use A in a certain game coincides with the requester's user identification information UID_From. The requester's identification information RefID_From is extracted out of the record in which the user identification information UIDax coincides with the receiver's user identification information UID_To. The user identification information UID corresponding to the extracted receiver's user identification information RefID_To and the extracted requester's reference identification information RefID_From become the user identification information UID*x of the friends with whom the user A's friendships are built.

The CPU 30 accumulates the number of the extracted user identification information UID*x of the friends (S110). The accumulated numbers of the friends are displayed on the friend search page as the friend number for each game (refer to an area 123 in FIG. 12 described below).

The CPU 30 conducts the processing of specifying the other users who can be invited to the focused application (S111-S112). The CPU 30 extracts the user identification information UID*x of one or more the candidate users, who are the users do not play the subject game that is subject to invitation, out of the user identification information UID*x of the friends extracted in step S109 by referring the user information table TBL11 (S111). Specifically, the CPU 30 acquires the reference identification information RefID* of the friends corresponding to the user identification information UID*x of the friends extracted in step S109 by referring the user information table TBL11, and acquires one or plural identification information AppIDx corresponding to the acquired reference identification information RefID*. If the identification information AppIDx of the subject game is not included in the acquired one or plural identification information AppIDx, the CPU 30 extracts the user identification information UID*x and the reference identification information RefID* of one or more the candidate users who do not play the subject game. According to the embodiment, the user information table TBL11 associating the identification information of various games with the user identification information UID of all of the users is provided, so that it is possible to centrally manage the users of plural games.

If the CPU 30 confirms that the reference identification information RefIDa indicating the use A is recorded as the requester, and the reference identification information RefID* corresponding to the user identification information UID*x of the candidate user is recorded as the receiver in the invitation table TBL14, the CPU 30 excludes the user identification information UID*x of the candidate user, and extracts the user identification information UID*x of remaining candidate users to accumulate them (S112). The pairs of the user as the requester whose invitation is pending or has been accepted and the user as the receiver are recorded in the invitation table TBL14. The invitation is not conducted again for the user in the pair including the user who has been invited even once. Therefore, it is possible to specify the users whom the user A can invite and the number of the users. The accumulated numbers of the friends whom the user A can invite are displayed on the friend search page for each game (refer to an area 124 of FIG. 12 described below).

The CPU 30 conducts the processing of specifying the user to whom the friend request can be sent in the focused application (S113-S118). If the flag indicating that the friend request is unavailable is set in the processing of step S104, the CPU 30 proceeds the processing to step S119 without conducting the above processing (S113-S118). The CPU 30 extracts the user identification information UID*x of the users (non-friends) with whom the user A's friendships have not been built (S113). The CPU 30 extracts the users with whom the user A's friendships is built in the game other than the subject game in which the user A wants to conduct the friend request and who have utilized the subject game (the first condition), and extracts the users with whom the user A's friendships is not built in the subject game (the second condition). According to the embodiment, the pairs of the requesters and the receivers in the friend request are stored in the relation table TBL13, so that it is unnecessary to memorize all of the other user information in records in which the status information associated with one user information indicates the friendship status using the one user information as a key, it is possible to reduce the memory capacity.

In the above-described step S105, the identification information AppIDx indicating the utilized games the user A utilizes and the user identification information UIDax of the user A in the utilized games are specified. In step S106 and thereafter, one of the pairs of the extracted identification information AppIDx and the user identification information UIDax of the other users utilize the utilized games corresponding to the extracted identification information AppIDx is focused. The CPU 30 extracts the other users playing the utilized game the user A utilizes by referring the user information table TBL11 (the first condition).

The CPU 30 may specify the other users satisfying the first condition by using the result of the extraction in step S109. The CPU 30 may specify the user identification information UID*x of the other users with whom the user A's friendships are built in the subject game in which the user A wants to conduct the friend request by referring to the relation table TBL13 and by using the result of the extraction in step S105. The CPU 30 excludes the other users specified by the result of the extraction in step S105 out of the other users satisfying the first condition, and extracts the user identification information UID*x of the users (non-friends) with whom the user A's friendships have not been built.

The CPU 30 judges whether or not the processing of steps S115-S119 is terminated for the user identification information UID*x of all of the users extracted in step S113, with whom the use A's friendship is not built (S114). If the judgment condition is satisfied, the CPU 30 proceeds the processing to step S118. If the judgment processing is not satisfied, the CPU 30 proceeds the processing to step S115, and accumulates the number of friends of a focused non-friend indicated with the user identification information UID*x of the focused non-friend by referring the relation table TBL13. In this case, as in step S119, the CPU 30 extracts the receiver's reference identification information RefID_To out to the record in which the requester's user identification information UID_From coincides with the user identification information UID*x of the focused non-friend, and extracts the requester's reference identification information RefID_From out of the record in which the receiver's user identification information UID_To coincides with the user identification information UID*x of the focused non-friend. The number of the user identification information UID corresponding to the extracted receiver's reference identification information RefID_To and the extracted requester's reference identification information RefID_From becomes the number of the friends of the focused non-friend indicated with the user identification information UID*x of the focused non-friend. The CPU 30 accumulates the number of the friends of the focused non-friend.

The CPU 30 acquires the friend upper limit of the focused non-friend indicated with the user identification information UID*x of the focused non-friend by referring to the friend upper limit table TBL12 (S116). The CPU 30 compares the acquired friend upper limit with the accumulated the number of the friends, and judges that the friend request is available for the focused non-friend if the accumulated number of the friends does not reach the friend upper limit (the third condition). If the accumulated number reaches the friend upper limit, the CPU 30 judges that the friend request is unavailable for the focused non-friend (S117). The CPU 30 returns the processing to step S114, and repeats the processing of the steps S114-S117 until the judgment condition of the step S114 is satisfied. If the judgment condition of the step S114 is satisfied, the CPU 30 proceeds the processing to step S118.

In step S118, the CPU 30 specifies the user identification information UID*x of the non-friends to whom the friend request can be sent, and accumulates the number the non-friends. The accumulated number of the non-friends is the number of the users with whom the user A's friendships is not built in the subject game and with whom the user A's friendships is built in the other games other than the subject game. The accumulated number of the non-friends is displayed on the friend search page for each game (refer to an area 125 in FIG. 12 described below).

The CPU 30 stores the game information of focused game corresponding to the focused identification information AppIDx acquired in the processing in step S104, the number of the friends playing the focused game accumulated in the processing in step S110, the number of the users who can be invite to the focused game accumulated in the processing in step S112, and the number of the users to whom the friend request can be sent in the focused game accumulated in the processing in step S118, on a variable area or a working area temporally (S119).

The CPU 30 returns the processing to step S107 illustrated in FIG. 10. If the processing of steps S107-S119 for all of the identification information AppIDx extracted in step S102 is terminated, the CPU 30 generates the friend search page on which games are arranged in descending order of the number of the friends (S120), and terminates the processing.

In the processing of step S104, if the flag indicating that the friend request is unavailable is set, the CPU 30 does not display the number of the friends playing the focused gamed accumulated in step S110, or displays the message, "You have hit your friend request limit. You can't send a friend request."

Figure 12:
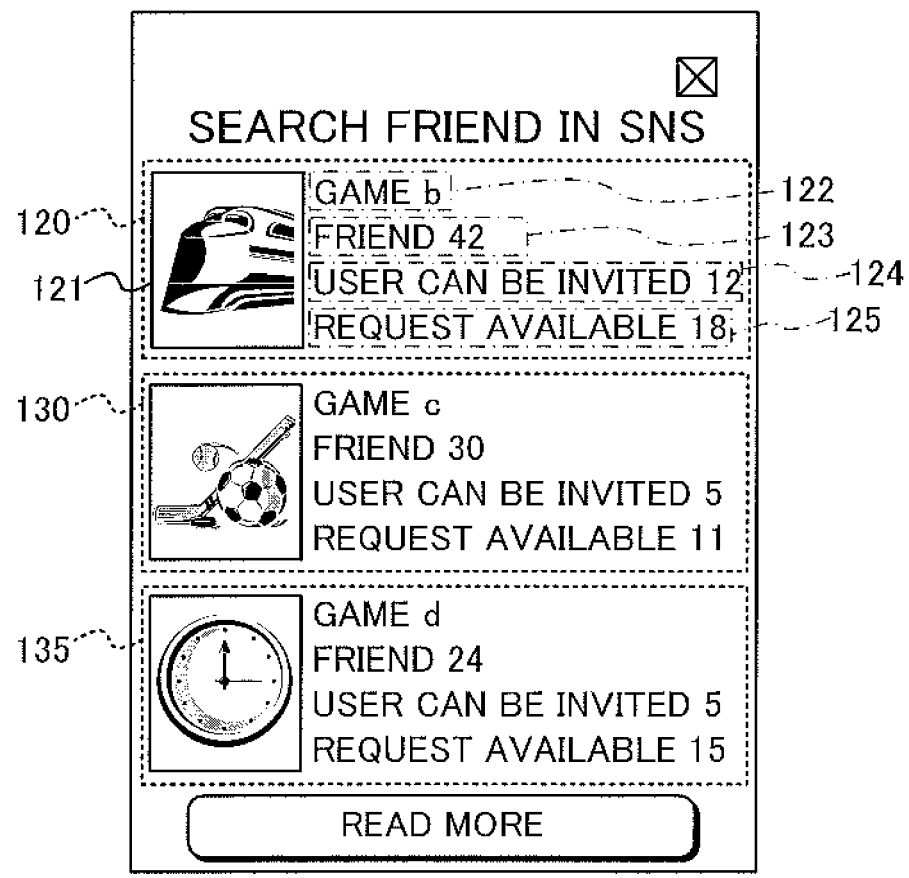
FIG. 12 is an explanatory view illustrating an example of a friend search page.

The explanation will be back to FIG. 8. If the friend processing is terminated in the management server 3A (S7), and the friend search page is generated, the CPU 30 of the management server 3A sends the friend response including the friend search page to the terminal device 2. If the CPU 20 of the terminal device 2 receives the friend response, the CPU 20 displays the friend search page on the display 25. FIG. 12 illustrates an example of the friend search page. In this example, game display areas 120, 130, 135 are arranged. The games are displayed on the game display area 120, the game display area 130, and the game display area 135 in the descending order of the number of the friends utilizing the games.

In the area 121, an icon is displayed using the icon information read from the application information table TBL15. In the area 122, the name of the application (the name of the game) is displayed. These pieces of information are acquired in the processing of step S108. In the area 123, the number of the friends with whom the user A's friendships are built is displayed. This information is acquired in the processing of step S110. In the area 124, the number of the friends who can be invited by the user A. This information is acquired in the processing of step S112. In the area 125, the number of the friends to which the friend request can be sent by the user A. This information is acquired in the processing of step S118.

In this example, the CPU 30 displays the number of the friends who can be invited together with the number of the friends to whom the friend request can be sent on the terminal device 2 for each of the utilized applications. However, the CPU 30 may be provided with only a part of the functions so that only either of the numbers is displayed. The names of the users who become candidates for the friend request or the invitation may be displayed without displaying the number of the users. The number of the friends and the names of users who become candidates may be displayed.

In this example, the CPU 30 specifies the number of the users to whom the friend request can be sent for each of utilized games to display the number on the terminal device 2 for each of utilized games. The CPU 30 may specify the total number of the users to whom the friend request can be sent for plural utilized applications to display the total number on the terminal device 2 of the request user. The total number of the users who can be invited may be specified for plural utilized applications as in the friend request to display the total number on the terminal device 2 of the request user.

If the user A selects either of the games displayed on the area 120, area 130, and area 135 (S9 illustrated in FIG. 8), the CPU 20 of the terminal device 2 sends the detail page request to the management server 3A. If the CPU 30 of the management server 3A receives the detail page request, the CPU 30 generates the detail page corresponding to the selected game (S10) to return the detail page response including the detail page to the terminal device 2. If the CPU 20 of the terminal device 2 receives the detail page response, the CPU 20 displays the detail page on the display 25.

Figure 13:
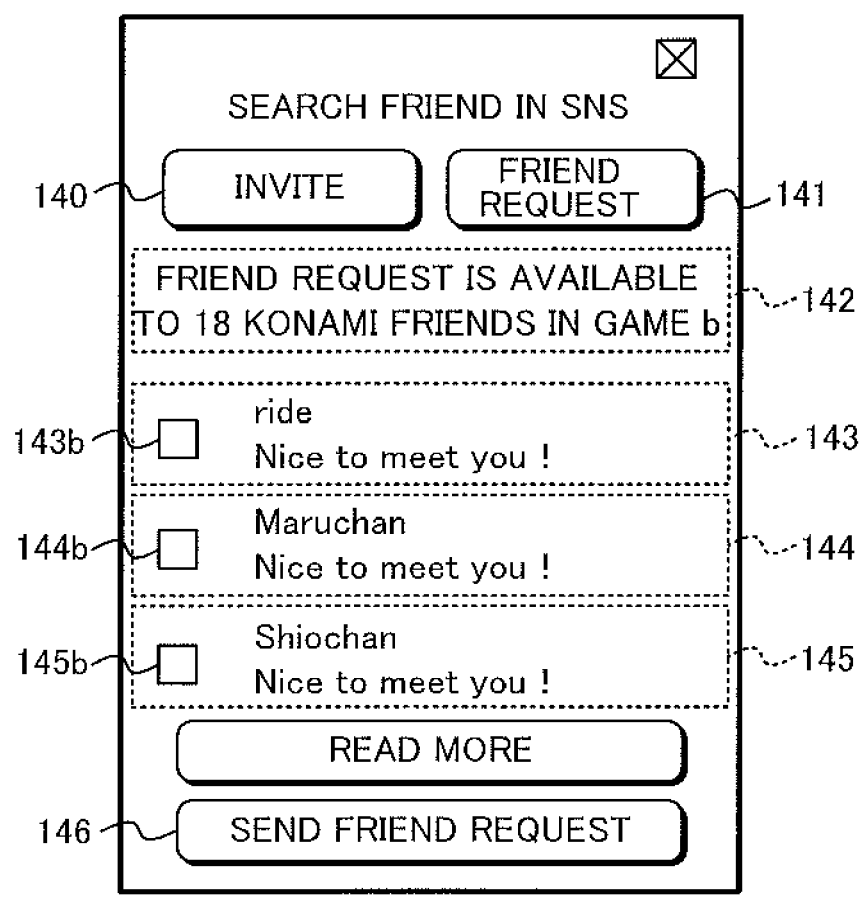
FIG. 13 is an explanatory view illustrating an example of a detail page.

FIG. 13 illustrates an example of the detail page. In this example, it is assumed that the user A selects the game b on the friend search page illustrated in FIG. 12. In the detail page as illustrated in FIG. 13, the button 140 and the button 141 are displayed. The button 140 corresponds to the invitation. The button 141 corresponds to the friend request. If the user A clicks the button 140 indicating "INVITE" in the state illustrated in FIG. 13, the page is switched to the detail page for the invitation illustrated in FIG. 16.

In the detail page for the friend request illustrated in FIG. 13, it is displayed in the area 142 how many more users having the friendship with the user A in the other games the user A can send the friend request to for the game b. The number of the users to whom the friend request can be sent is the same as that displayed in the area 125 illustrated in FIG. 12. The number is acquired by the processing of step S118. If the friend upper limit for the user A is less than the number of the users to whom the friend request can be sent, the number that is the difference between the current number of friends and the friend upper limit is displayed. In the areas 143-145, the names of the users who are candidates for the friend request, and checkboxes 143b, 144b, 145b are displayed. It is possible to conduct the friend request by checking the checkboxes 143b, 144b, 145b and clicking the button 146. The friend request can be sent to plural users simultaneously.

According to the embodiment, a screen on which the utilized games can be selected is displayed on the terminal device of the request user. Further, having the friendship for the selected utilized game becomes a condition for being the candidate user. Therefore, it is possible for the request user to select the game to suit the request user's preference. For example, it is possible to select the utilized game similar to the game in which the request user wants to conduct the invitation.

2-2: Friend Request Processing

Figure 14:
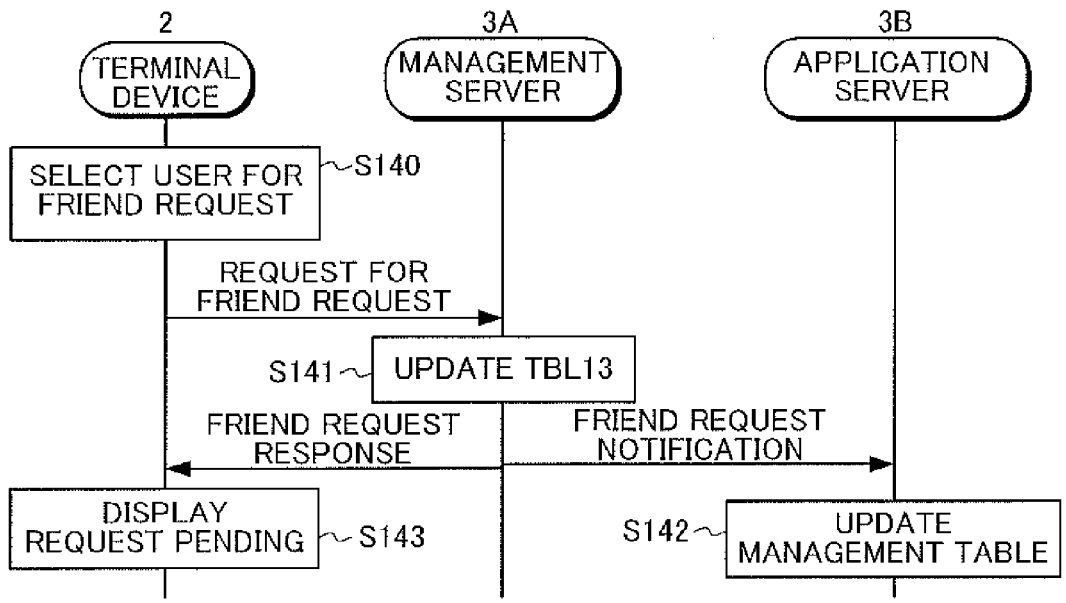
FIG. 14 is a sequence diagram illustrating an operation sequence of an application system relating to friend request processing.

FIG. 14 illustrates an operation sequence of the application system relating to the friend request processing. If the user A selects the friend in the friend request in the terminal device 2 (S140), the CPU 20 of the terminal device 2 sends a request of the friend request to the management server 3A. The request for the friend request includes the requester's user identification information UID_From and the receiver's user identification information UID_To.

If the CPU 30 of the management server 3A receives the request of the friend request, the CPU 30 updates the stored contents of the relation table TBL13 (S141). Specifically, the CPU 30 acquires the requester's reference identification information RefID_From corresponding to the requester's user identification information UID_From and the receiver's reference identification information RefID_To corresponding to the receiver's user identification information UID_To, and generates the record in which the status information Stat is set to "pending" (Stat=0) to store the record in the relation table TBL13. If the identification information AppID is included in the request for the friend request, the identification information AppID may be used. The identification information AppID corresponding to the requester's user identification information UID_From and the receiver's user identification information UID_To may be acquired by referring to the user information table TBL11.

It is assumed that the game in which the user A wants to conduct the friend request is the game b, and the user A sends the friend request to the other users with whom the user A has the friendship in the game c, but not have the friendship in the game b. In this case, the CPU 30 of the management server 3A sends friend request notification together with the user identification information UID of the other users as receivers of the friend request to the management server 3B that manages the game b for which the friend request is sent. The CPU 30 functions as the instruction unit instructing the application server 3B providing the game b to indicate the friend request for the other users as receivers who the user A selects from one or more the candidate users. If the application server 3B receives the friend request notification, the application server 3B updates the management table so that the friend request from the user A can be displayed on the other users' own page (S142).

The management server 3A returns the friend request response to the terminal device 2. If the CPU 20 of the terminal device 2 receives the friend request response, the CPU 20 indicates that the friend request is pending on a page such as the user A's own page.

According to the embodiment, the management server 3A displays one or more the candidate users satisfying the first, second and third conditions on the terminal device 2 of the user A so that the user A can select one or more the candidate users. The first, second, and third conditions will be explained below.

The first condition: the user has a friendship with the user A in the utilized application the user has utilized, and utilizes subject application in which the user A wants to conduct the friend request.

The second condition: the user has a friendship with the user A in the subject application.

The third condition: the friend upper limit of the user is not encountered.

Accordingly, it is possible to utilize trust relationships that are built in different applications even in a new application. If one user plays a certain game, the one user can send the friend request to familiar users with whom the friendships are built in the other games without sending the friend request to strange users. There is a merit that it is easy to build the friendship with the other users when starting a new game.

According to the embodiment, the pairs of the user information of the users having the friendships with each other are stored in the relation table TBL13 in the management server 3A. Therefore, it is possible to centrally manage the friendships that are built in various applications. The user information table TBL11 in which the identification information and the user information are associated with each other to be stored is provided. Therefore, it is possible to satisfy the first condition by referring to the user information table TBL11.

According to the embodiment, the pairs of request sides and recipient sides are stored in the relation table TBL13. Therefore, it is unnecessary to store all of the other user information in records in which the status information associated with one user information indicates the friendship status using the one user information as a key. This allows the memory capacity for data to be reduced.

According to the embodiment, the friend upper limit set for each of applications is centrally managed in the management, server 3A by using the first friend upper limit table TBL12. Therefore, it is possible to select the played application.

According to the embodiment, the utilized applications are displayed in the terminal device 2 of the user A so that the utilized applications can be selected. Having the friendship for the selected utilized game becomes a condition for being the candidate user. Therefore, it is possible for the user sending the friend request to select utilized application similar to the application in which the user wants to build a friendship. It is easy to select the application and the friend if the application and the friend for the invitation have been decided.

According to the embodiment, it is possible to know the number of the users to whom the friend request can be sent, the convenience for the user sending the friend request is significantly improved.

2-3: Invitation Processing

Figure 15:
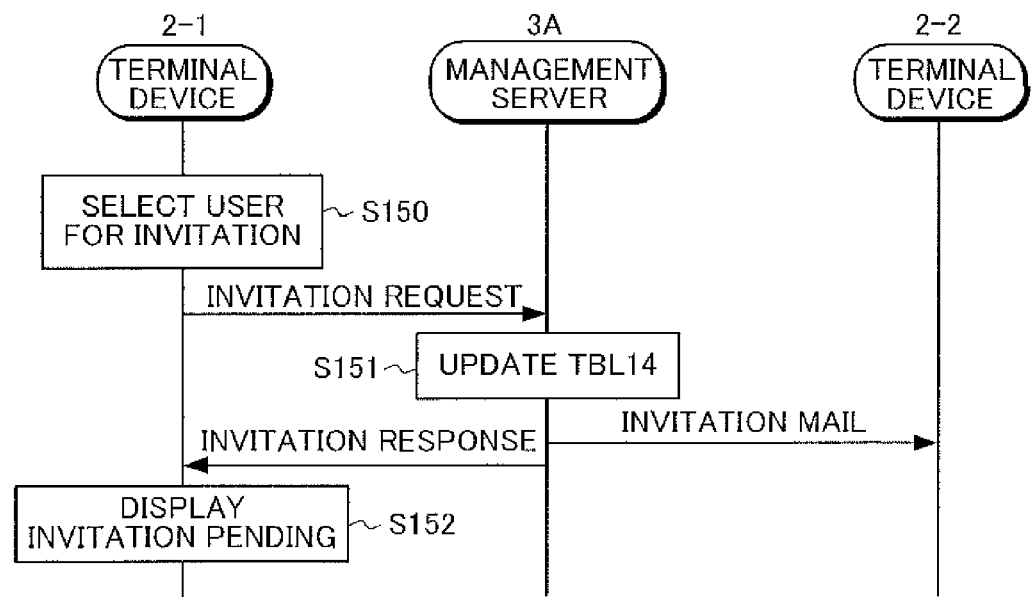
FIG. 15 is a sequence diagram illustrating an operation sequence of an application system relating to invitation processing.
Figure 16:
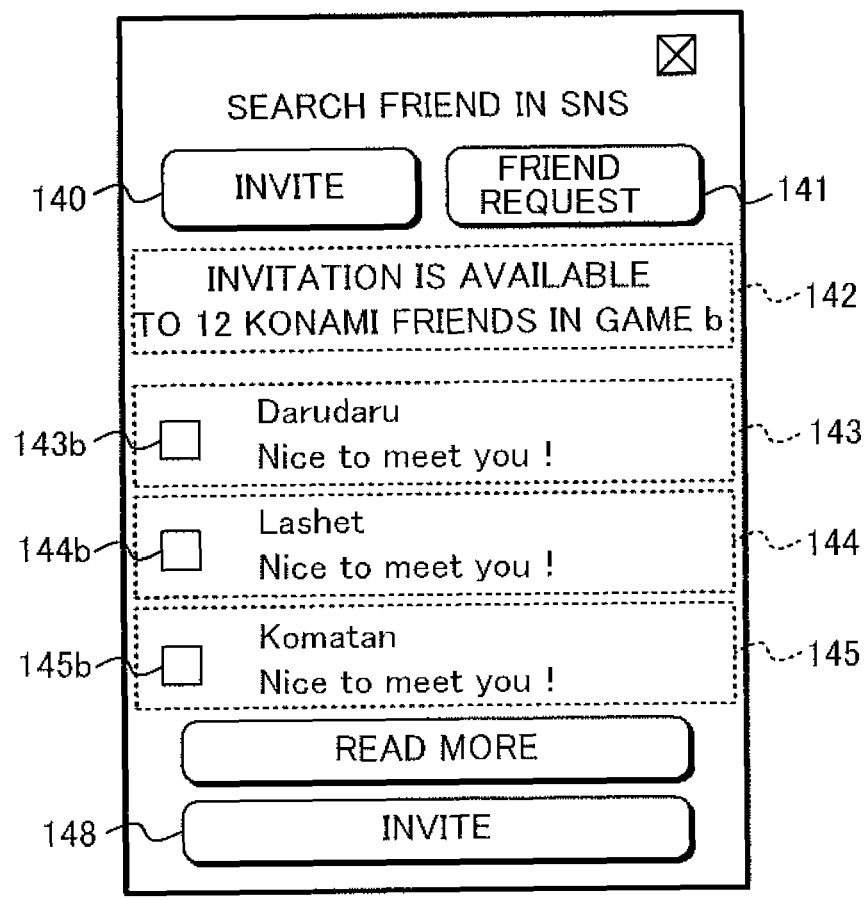
FIG. 16 is an explanatory view illustrating an example of a detail page for invitation.

FIG. 15 illustrates an operation sequence of the application system relating to the invitation processing. If the user A selects the friends in the invitation in the terminal device 2 (S150), the CPU 20 of the terminal device 2 sends the invitation request to the management server 3A. FIG. 16 illustrates an example of the detail page for the invitation. In this example, it is assumed that the user A selects the game b in the friend search page illustrated in FIG. 12. In the detail page for the invitation, it is displayed in the area 142 how many more users having the friendship with the user A in the other games can the user A invite for the game b. The number of the users who can be invited is the same as that displayed in the area 124 illustrated in FIG. 12. The number is acquired by the processing of the step S112. In the areas 143-145, the names of the users who are candidates for the invitation, and checkboxes 143b, 144b, 145b are displayed. It is possible to conduct the invitation of the friends by checking the checkboxes 143b, 144b, 145b and clicking the button 148. The invitation can be conducted to plural users simultaneously.

According to the embodiment, it is possible to know the number of the users to whom the friend request can be sent, the convenience for the user sending the friend request is significantly improved.

The number of the friends who can be invited displayed in the area 142 is acquired by the processing of steps S111 and S112. The CPU 30 extracts one or more the candidate users satisfying the condition that one or more the candidate users do not play the subject game that is subject to the invitation. The CPU 30 extracts the user identification information UID*x of one or more the candidate users, who do not play the game that is subject to invitation, out of the user identification information UID*x of the friends having the friendships with the user A in a certain game other than the subject game by referring the user information table TBL11 (S111). Specifically, the CPU 30 acquires the reference identification information RefID* of the friends corresponding to the user identification information UID*x of the friends extracted in step S109 by referring the user information table TBL11, and further acquires the pairs of the extracted user identification information UID*x of the friends, the acquired reference identification information RefID*, and one or plural identification information AppIDx corresponding to the acquired reference identification information RefID*. The CPU 30 extracts the user identification information UID*x of one or more the candidate users and the reference identification information RefID*x in the paris not including the identification information AppIDx of the subject game in which the invitation is conducted. That is, the CPU 30 extracts the user identification information UID*x and the reference identification information RefID*x of one or more the candidate users not playing the subject game that is subject to the invitation.

The CPU 30 extracts pairs other than ones in which the reference identification information RefIDa indicating the user A as a requester and the reference identification information RefID*x corresponding to the user identification information UID*x of the candidate user as a receiver are recorded in the invitation table TBL 14, and accumulates them (S112). The CPU 30 excludes the users who has the invitation pending or has accepted the invitation recorded in the invitation table TBL 14, so that the CPU 30 specifies one or more the candidate users who the user A can invite and the number of one or more the candidate users.

In FIG. 15, if the CPU 30 of the management server 3A receives the invitation request, the CPU 30 updates the memory contents of the invitation table TBL 14 (S151). Specifically, the CPU 30 acquires the requester's reference identification information RefID_From corresponding to the requester's user identification information UID_From, the receiver's reference identification information RefID_To corresponding to the receiver's user identification information UID_To, and the identification information AppID by referring to the invitation table TBL14. The CPU 30 generates the record in which the status information Stat is set to "Pending" (Stat=0), and stores the record in the invitation table TBL 14. As illustrated in FIG. 6, in one record of the invitation table TBL 14, the record identification information ID, the identification information AppID, the requester's reference identification information RefID_From that is the reference identification information RefID of the user as the requester, the receiver's reference identification information RefID_To that is the reference identification information RefID of the user as the receiver, a date information Date indicating the date of the invitation, and a status information Stat indicating the status of the invitation are associated with each other to be stored. If the status information Stat is "0", it indicates that the invitation is pending. If the status information Stat is "1", it indicates that the invitation has been approved or refused. The CPU 30 rewrites the contents of the status information Stat depending on the status. In the example show in FIG. 6, the CPU 30 generates the record in which ID is "1" in the invitation table TBL 14 at the timing that the user whose reference identification information RefID is "00000011" conducts the invitation, and rewrites the status information Stat to "0". The rewriting unit 53 rewrites the status information Stat to "1" at the timing that the user whose reference identification information RefID is "00003120" receives the invitation, and accepts or refuse the invitation.

In the embodiment, the first status includes a refusal and an acceptance. Therefore, the user is excluded from the candidate user in not only the case that the invitation is refused, in but also the case that the invitation is accepted. It is unnecessary to invite the user accepting the invitation because the user has played the subject game that is subject to the invitation. It is possible to exclude the refusing user and the invited user simultaneously and to reduce the processing load by using the above-described data structure.

It is assumed that the game to which the user A wants to invite is the game b, and the user A invites the other user B having the friendship with the user A in the game C. The user A manages the terminal device 2-1. The user B manages the terminal device 2-2. In this case, the CPU 30 of the management server 3A sends the invitation mail notifying that the invitation is conducted. The CPU 30 may display the message notifying that the user A invites the user B to the game b on the user B's own page of the SNS site in the management server 3A for the user B. The CPU 30 of the management server 3A may send an invitation article to the other social medium or the bulletin board to post that. As illustrated in FIG. 1, the CPU 30 functions as the notifying unit 16 notifying the user A's invitation request to one or more the candidate users selected out of one or more the candidate users displayed in the terminal device 2-1.

The CPU 30 of the management server 3A sends the invitation response back to the terminal device 2-1. If the CPU 20 of the terminal device 2-1 receives the invitation response, the CPU 20 displays that the invitation is pending.

According to the embodiment, if the user plays a certain game, the user can send the friend request to the familiar friends with whom the friendships are built in the other games without sending the friend request to strange users. Therefore, there is a merit that it is possible to spread a new game to the friends in the other games. Further, there is a merit that it is easy to build a friendship in a new game if the friends in the other games participate in the new game.

The CPU 30 as the specifying unit 12 excludes the record in which the status information Stat is "1" from records that are subject to extraction when extracting the user identification information UID*x of one or more the candidate users who can be invited by referring to the invitation table TBL 14. It is the case that the invitation is accepted or refused if the status information Stat is "1". Therefore, the specifying unit 12 does not send the invitation again to such a user. According to the embodiment, the invitation table TBL 14 is managed by associating the status information indicating the status of the invitation with the user information. It is possible to know the status of the invitation by referring to the invitation table TBL 14. It is possible to prevent a nuisance that the invitation is sent again even if the invitation is refused since the user is excluded from one or more the candidate users if the status information indicates refusal.

According to the embodiment, it is possible to cut waste that the invitation is sent again even if the invitation is pending since the user to whom the invitation is pending is excluded from one or more the candidate users, and to reduce the processing load of the management server 3A.

2-4: Inquiring Processing

The inquiring processing is processing of inquiring of the management server 3A the usage information relating to the applications the friends of the user A utilize. The usage information includes the ranking of popular games among the friends, the number of the friends who utilize a certain game, the number of the user to whom the friend request can be sent, and the number of the user who can be invited.

The inquiring processing includes ranking processing of indicating popular games among the friends, friend number processing of specifying a certain game and inquiring the number of the friends who play the certain game.

The ranking processing will be explained. The ranking processing includes the first ranking processing and the second ranking processing. The first ranking processing is processing of deciding the ranking of the popular among the users with whom the friendships are built in specified games.

The second ranking processing is processing of deciding the ranking of the popular games among the users with whom the friendships are built in unspecified games.

The screen illustrated in FIG. 9 is displayed on the display of the terminal device 2 of the user A. In this screen, the button 113 corresponds to the first ranking processing. The button 114 corresponds to the second ranking processing.

Figure 17:
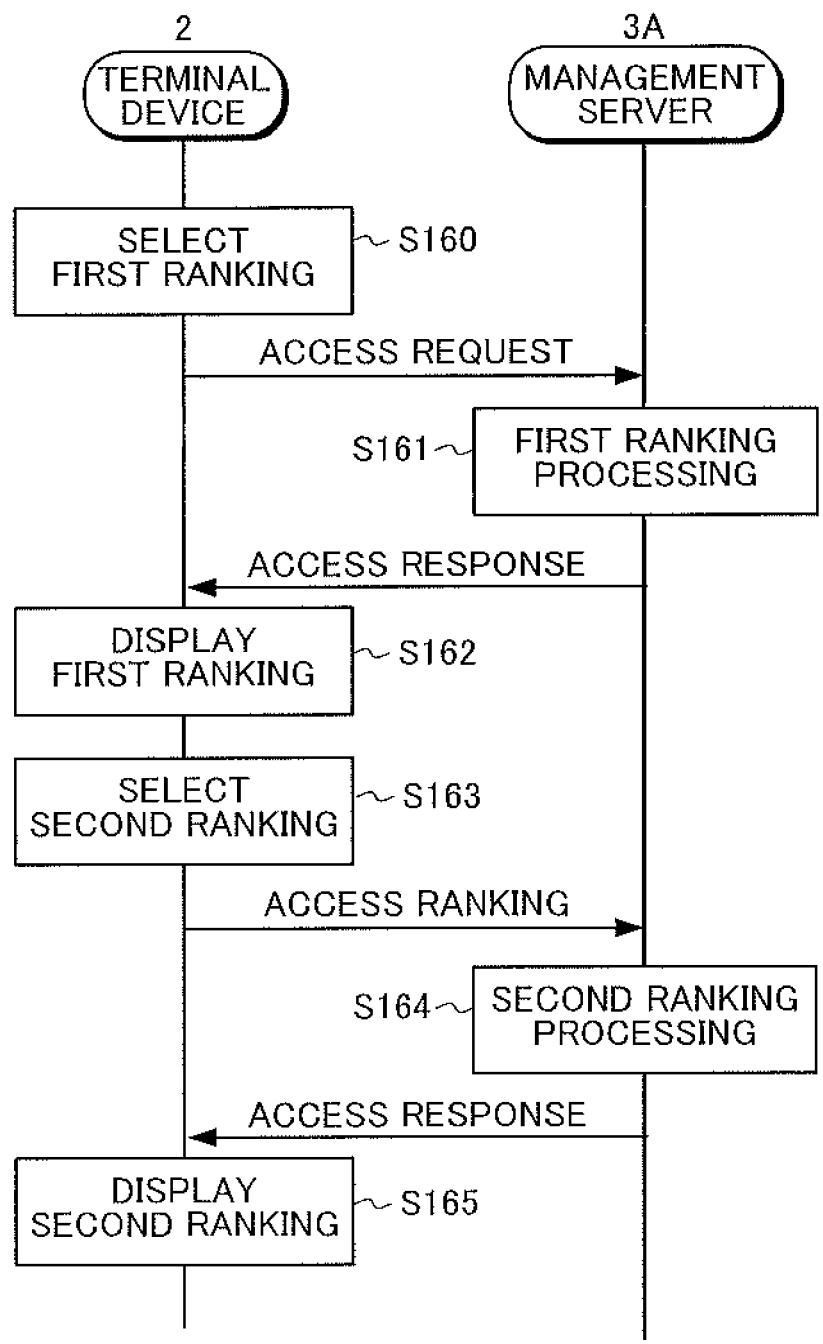
FIG. 17 is a sequence diagram illustrating an operation sequence of an application system relating to ranking processing.

FIG. 17 illustrates an operation sequence of the application system relating to the ranking processing. If "SEE POPULAR GAME AMONG THESE FRIENDS" (the first ranking processing) is selected (S160) by clicking the button 113 (FIG. 9), the screen is switched to the popular application page of the management server 3A. The link to the popular application page of the SNS site is defined in the button 113. In the definition of the link, the link information of the user identification information UID indicating the users is included. If the CPU 30 of the management server 3A receives an access request to the popular application page which is popular among the friends in the game indicated by the identification information AppID, the CPU 30 executes the first ranking processing of generating the first ranking page (S161).

Figure 23:
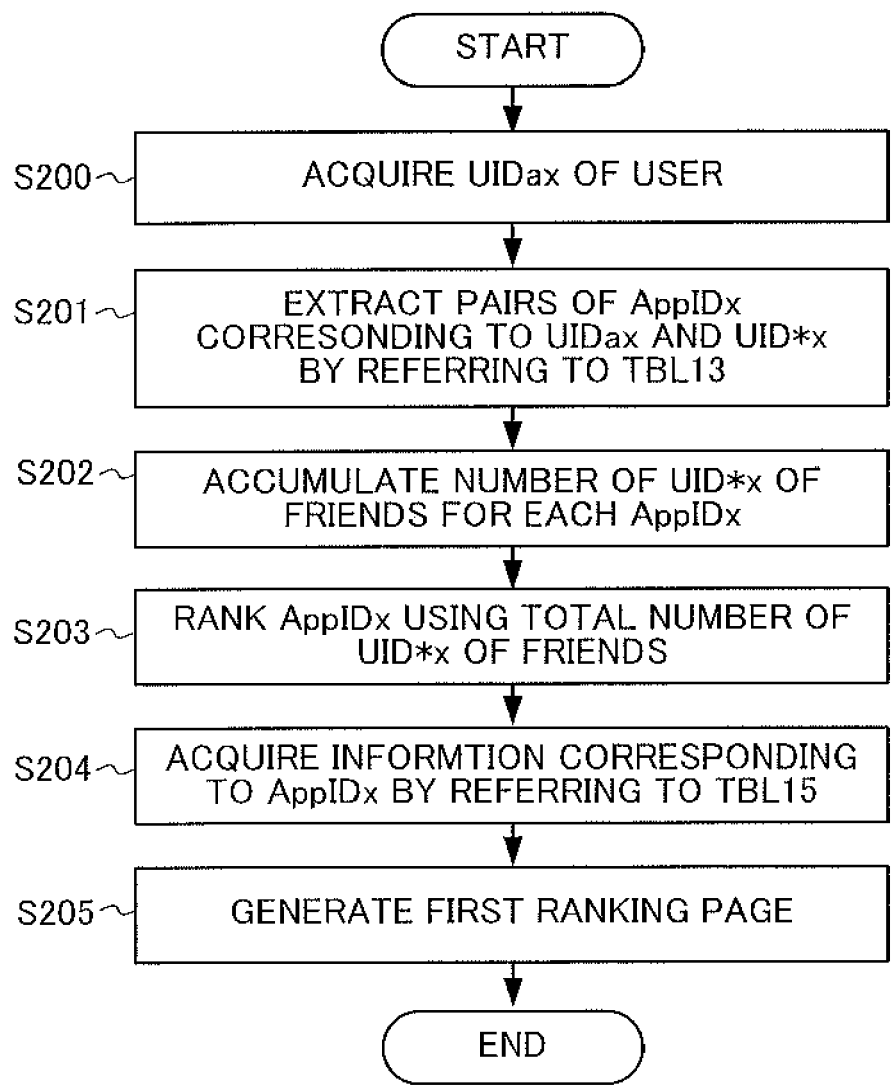
FIG. 23 is a flowchart illustrating details of the ranking processing.

FIG. 23 illustrates the details of the first ranking processing. The CPU 30 acquires the user identification information UIDax included the received access request (S200). The CPU 30 specifies the user identification information UID*x of the friends corresponding to the user identification information UIDax of the user A in the record in which the group information Group indicates "Friends" by referring to the relation table TBL 13 (S201).

Specifically, the CPU 30 extracts the record satisfying that (Group=Friends) AND {(UID_To=UIDax) OR (UID_From=UIDax)} AND (Stat=1), and specifies one or plural of the user identification information UID*x included in them.

The CPU 30 accumulates the number of the extracted user identification information UID*x for each of the identification information AppIDx (S202). The CPU 30 specifies the order of the popularity of the games specified by the identification information AppIDx. The CPU 30 acquires the names of the games corresponding to the extracted identification information AppIDx, the explanation information, and the icon information by referring to the application information table TBL 15. The CPU 30 generates the first ranking page. The CPU 30 arranges the explanation of the games in the descending order of the number of the friends playing the games, and generates the first ranking page.

If the terminal device 2 receives an access response including the first ranking page from the management server 3A, the terminal device 2 displays the first ranking page on the display 25 (S162).

The CPU 30, in step S201, specifies the user identification information UIDax of the user A in the game illustrated in FIG. 9 out of the plural games, and specifies the users having the friendships with the user A in the illustrated game by referring to the user identification information UID*x. The CPU 30 functions as the information acquiring unit 15 for acquiring the usage information indicating the ranking of each game that the specified users, that is, the friends play, and the number of the friends playing each game.

According to the embodiment, the information acquiring unit 15 acquires the usage information relating to the application the friends of the user A, who are the request users, utilize in the application associated with the access request to the page of the popular application that is popular among the friends. The display controlling unit 14 displays the acquired usage information in the terminal device 2. This allows the request user to obtain various information relating to the friends through the specific application.

If "SEE POPULAR GAME AMONG THE OTHER FRIENDS" is selected (S163) by clicking the button 114 (FIG. 9), the screen is switched to the popular application page of the management server 3A. The link to the popular application page in the SNS site is defined to the button 113. In the definition of the link, the link information of the user identification information UID indicating the users is included. If the CPU 30 of the management server 3A receives an access request to the popular application page which is popular among the friends in the plural games the users play, the CPU 30 executes the second ranking processing of generating the second ranking page (S164). If the CPU 20 of the terminal device 2 receives the access response including the second ranking page from the management server 3A, the CPU 20 displays the second ranking page on the display 25 (S165).

The ranking of the popular application by using the button 113 is the ranking of the application that is popular among the friends in the specific game. However, the ranking of the popular application by using the button 114 is the ranking of the application that is popular among the friends in any of the plural games the users play. If the user plays only one game, the details of the ranking of the popular applications by using the button 113 becomes the same as that by using the button 114.

Figure 18:
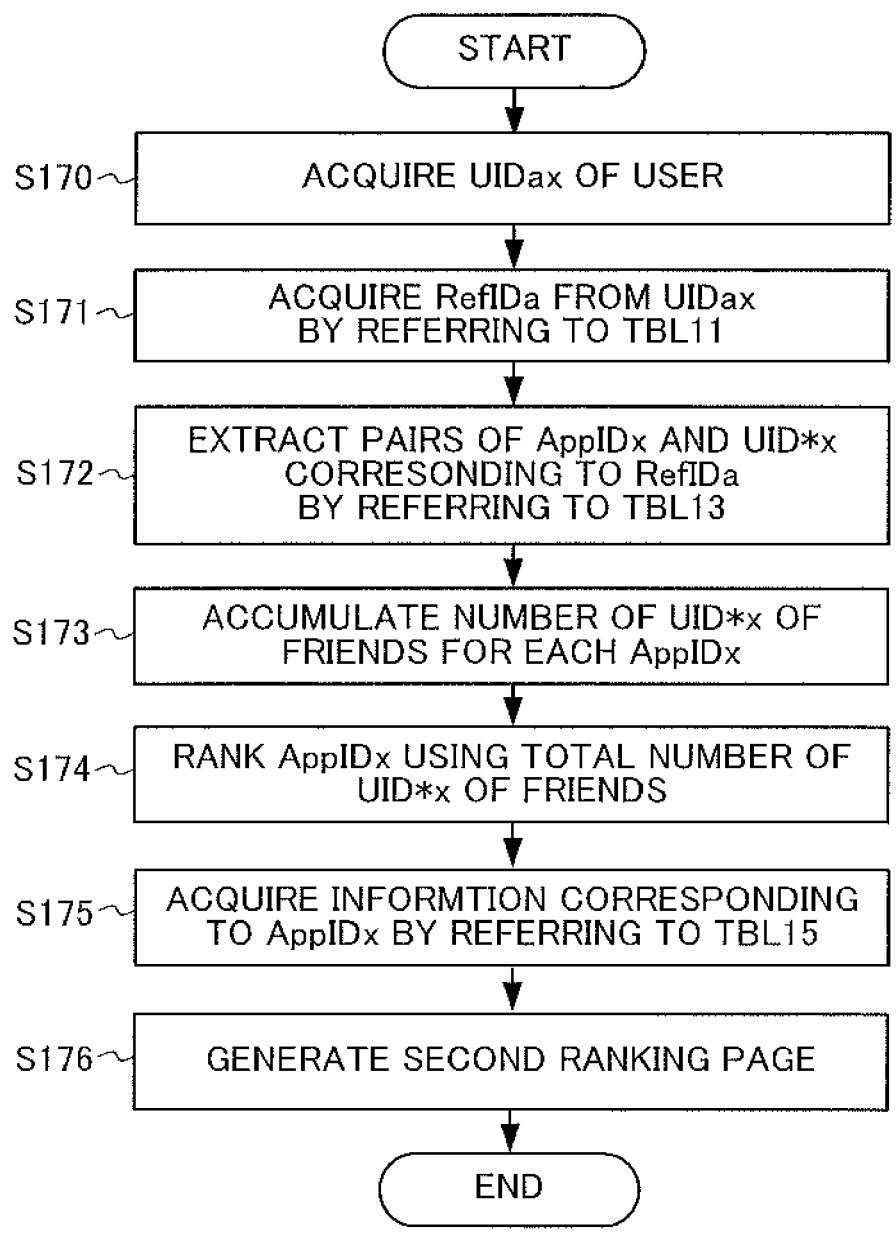
FIG. 18 is a flowchart illustrating details of the ranking processing.

FIG. 18 illustrates the details of the ranking processing. The CPU 30 acquires the user identification information UIDax included in the received the access request (S170). The CPU 30 acquires the reference identification information RefIDa of the user A using the user identification information UIDax by referring to the user information table TBL11 (S171). The CPU 30 extracts the pairs of the group information Group indicating "Friends", the identification information AppIDx corresponding to the reference identification information RefID of the user A, and the user identification information UIDax (S172).

Specifically, the CPU 30 extracts the record satisfying that (Group=Friends) AND {(RefID_To=RefIDa) OR (RefID_From=RefDa)} AND (Stat=1), and extracts one or plural of the pairs of the identification information AppIDx and the user identification information UID*x included in them.

The CPU 30 accumulates the number of the extracted user identification information UID*x for each of the identification information AppIDx (S173). The CPU 30 specifies the order of the popularity of the games specified by the identification information AppIDx on the basis of the accumulated number of the user identification information UID*x of the friends (S174). The CPU 30 acquires the names of the games corresponding to the extracted identification information AppIDx, the explanation information, and the icon information by referring to the application information table TBL 15. The CPU 30 generates the second ranking page (S176). The CPU 30 arranges information including the explanation of the games in the descending order of the number of the friends playing the games to generate the second ranking page. If the terminal device 2 receives the access response including the second ranking page from the management server 3A, the terminal device 2 displays the second ranking page on the display 25.

The CPU 30, in step S172, specifies the identification information AppIDx of the game the user A has utilized out of the plural games, and further specifies the users having the friendships with the user A by using the user identification information UID*x. The CPU 30 functions as the information acquiring unit 15 for acquiring the usage information indicating the ranking of each game that the specified users, that is, the friends play, and the number of the friends playing each game.

Figure 19:
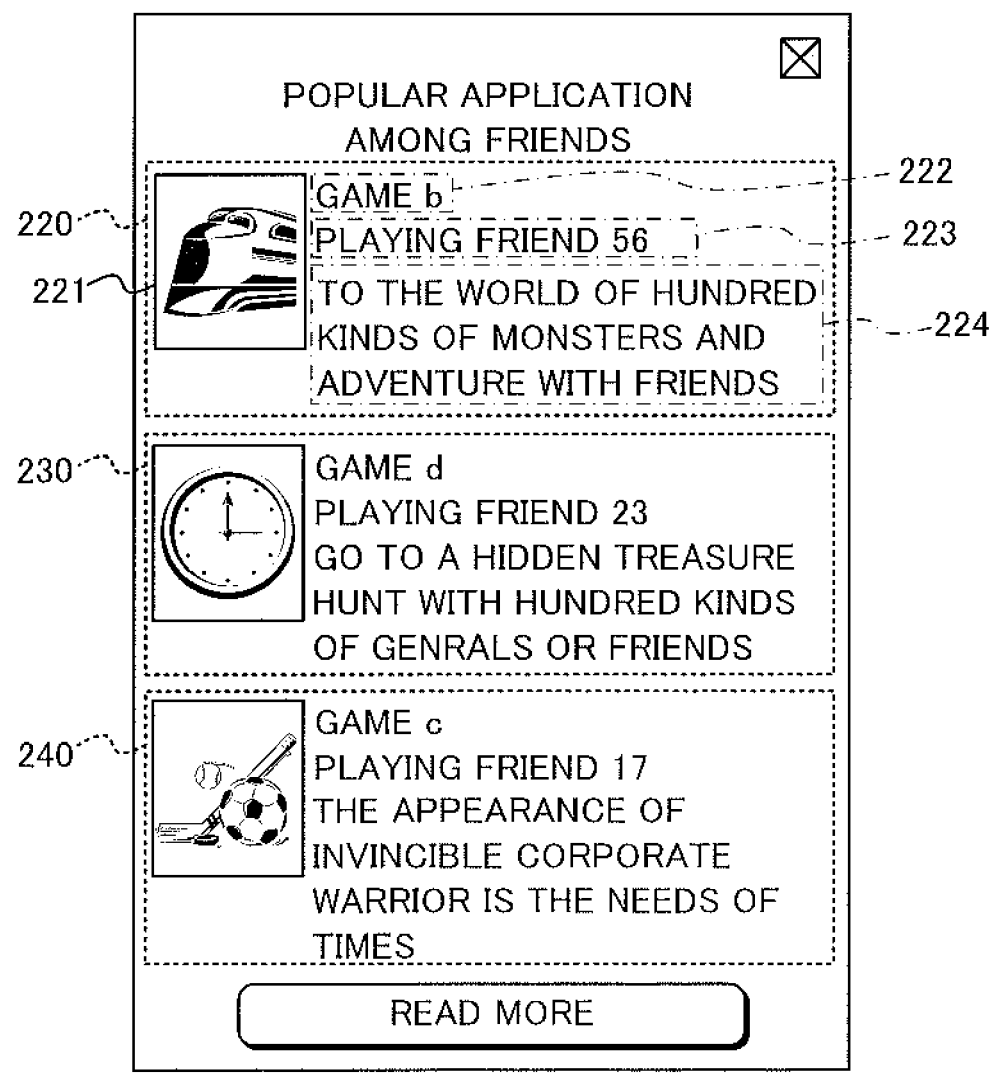
FIG. 19 is an explanatory view illustrating an example of a ranking page.

FIG. 19 illustrates an example of the second ranking page. In this example, the ranking indicating areas 220, 230, 240 are arranged, so that the ranking is displayed in the ranking indicating area 220, the ranking indicating area 230, the ranking indicating area 240, in the descending order of the ranking.

According to the embodiment, the applications (games) are displayed in the descending order of the number of the users utilizing the games among the friends. Therefore, the user can know the popular ranking of the applications (games) at a glance.

In the area 221, the icon is displayed using the icon information read from the application information table TBL15. In the area 222, the name of the application (the name of the game) is displayed. These pieces of information are acquired by the processing in step S175. In the area 223, the number of the other users who have the friendships with the user A in any of the games the user A plays and who have played the game b. This information is acquired by the processing in step S173. In the area 224, the explanation of the game b is displayed. This information is acquired by the processing in step S175. The games displayed in the page also includes the game the user A has not played.

According to the embodiment, it is possible to know the number of the friends playing the game for each game. This allows the user to know the game that is popular among the friends. Therefore, it is possible for the user to obtain the criterion in the case of selecting a new game.

According to the embodiment, the information acquiring unit 15 acquires the usage information relating to the applications the friends utilize, the friends with whom the friendships are built in the utilized applications the user A who is the request user has utilized. The display controlling unit 14 displays the acquired usage information in the terminal device 2. Therefore, the user A who is the request user can obtain various information relating to the applications the friends utilize.

Figure 20:
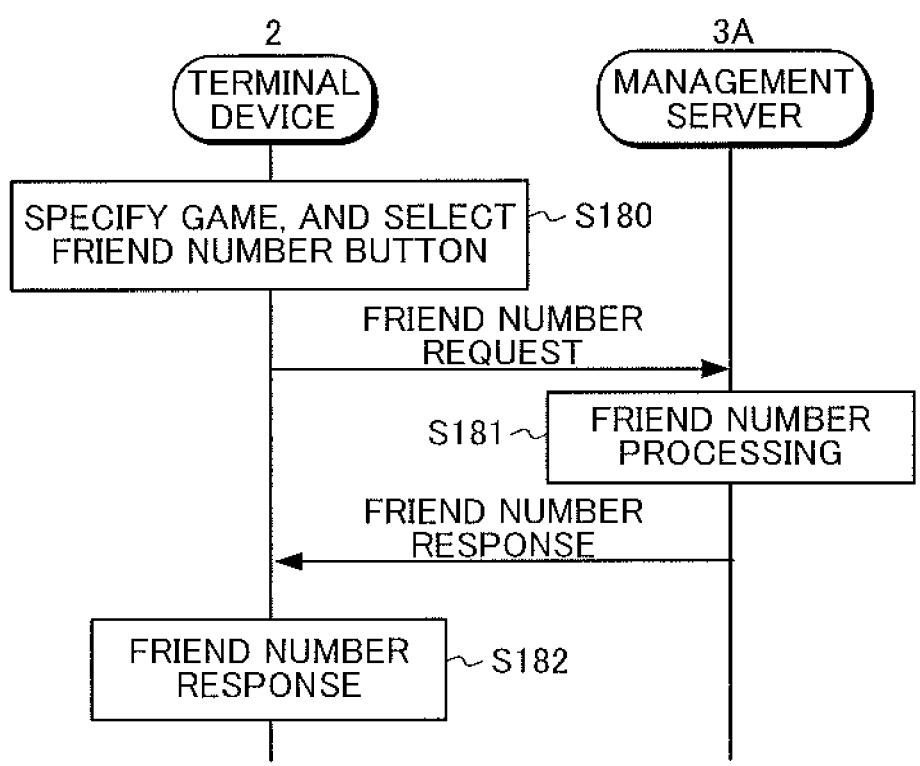
FIG. 20 is a sequence diagram illustrating an operation sequence of an application system relating to friend number processing.

The friend number processing will be explained. FIG. 20 illustrates an operation sequence of the application system relating to the friend number processing. In the user's own page of the SNS site that the management server 3A provides for each user, the friend number button is provided. It is possible to specify the game and inquire the number of the friends by using the friend number button.

If the user A selects the number of the friends by clicking the friend number button relating to a certain game in the terminal device 2 of the user A (S180), the CPU 20 of the terminal device 2 sends friend number request to the management server 3A. If the CPU 30 of the management server 3A receives the friend number request, the CPU 30 executes the friend number processing for generating the friend number page (S181).

Figure 21:
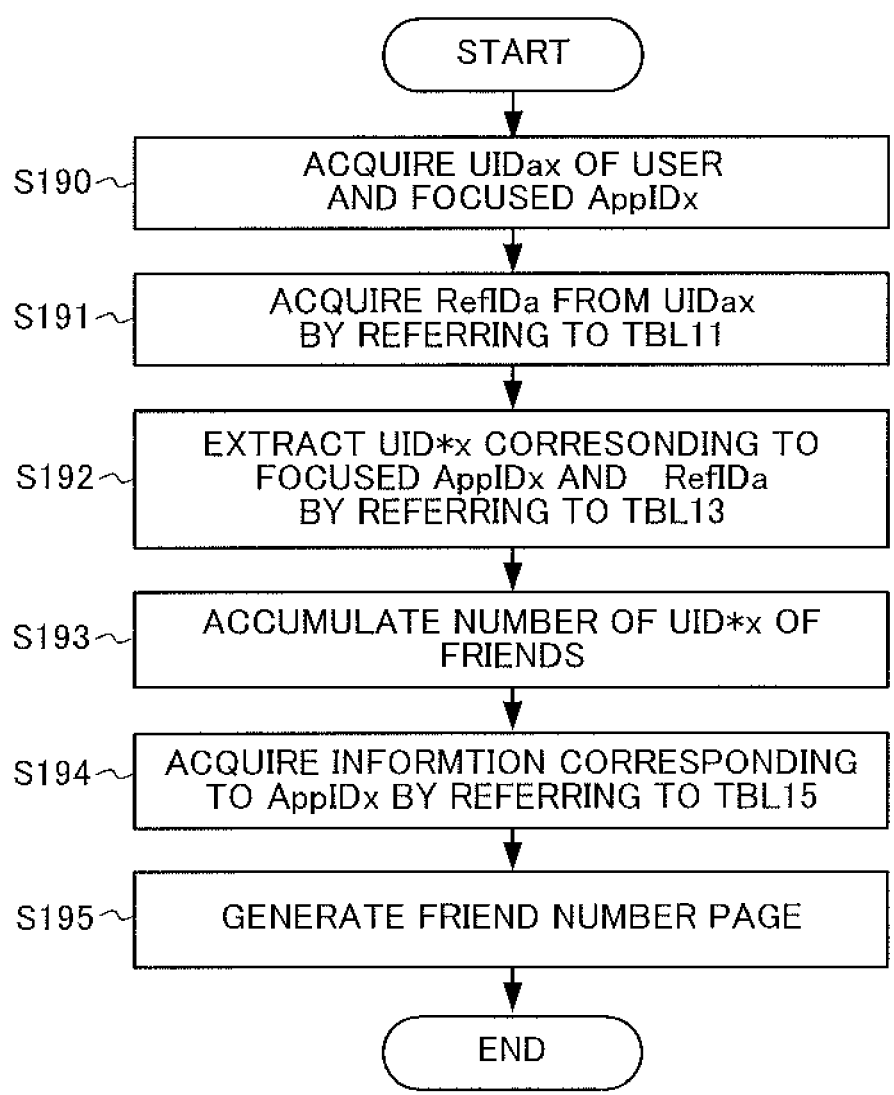
FIG. 21 is a flowchart illustrating details of the friend number processing.

FIG. 21 illustrates the details of the friend number processing. The CPU 30 acquires the user identification information UIDax and the identification information AppIDx of the focused game included in the received friend number request (S190). The CPU 30 acquires the reference identification information RefIDa of the user A using the user identification information UIDax by referring to the user information table TBL11 (S191). The CPU 30 extracts the user identification information UID*x of the friends corresponding to the reference identification information RefIDa of the user A in a record in which the group information Group indicates "Friends" and the identification information AppID indicates "AppIDx" (S192).

Specifically, the CPU 30 extracts the record satisfying (Group=Friends) AND (AppID=AppIDx) OR {(RefID_To=RefIDa) AND (RefID_From=RefIDa)}, and extracts one or plural of the user identification information UID*x included in them.

The CPU 30 accumulates the number of the extracted user identification information UID*x (S193). The CPU 30 acquires the names of the games corresponding to the identification information AppIDx, the explanation information, and the icon information by referring to the application information table TBL 15. The CPU 30 generates the friend number page (S195).

Figure 22:
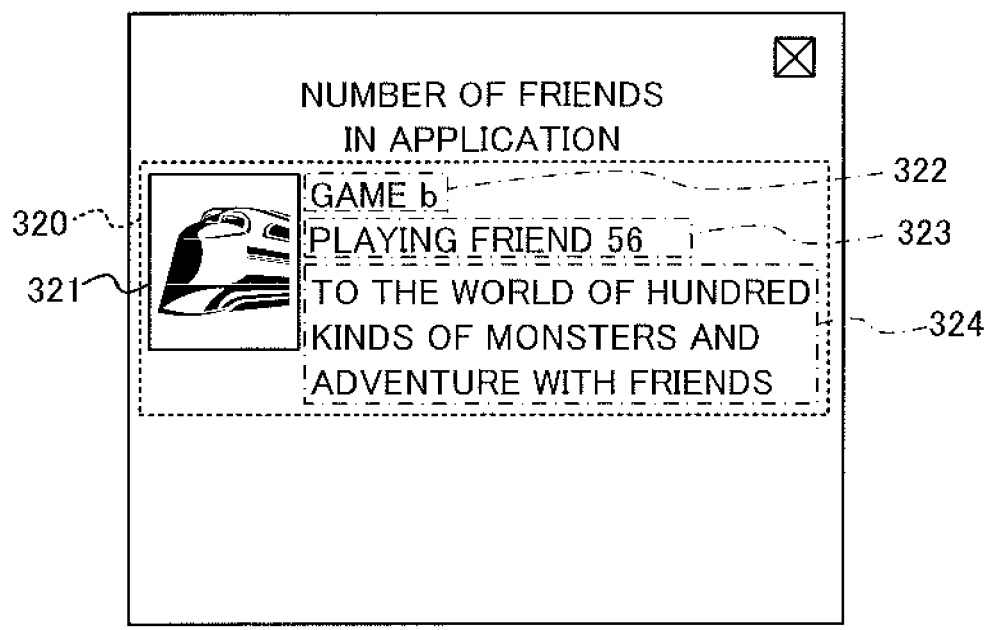
FIG. 22 is an explanatory view illustrating an example of a friend number page.

FIG. 22 illustrates an example of the friend number page. In this example, in a friend number displaying area 320, the result of the processing is displayed. In the area 321, an icon is displayed using the icon information read from the application information table TBL15. In the area 322, the name of the application (the name of the game) is displayed. These pieces of information are acquired by the processing in the step S194. In the area 323, the number of the other users who have the friendships with the user A and who have played the game b is displayed. This information is acquired by the processing in the step S193. In the area 324, the explanation of the game b is displayed. This information is acquired by the processing in the step S194.

According to the embodiment, it is possible to designate the game and know the number of the friends playing the designated game. Therefore, it is possible to know the popularity of an interested game among the friends.

According to the embodiment, the number of the users who play the application (game) is displayed in the terminal device 2. Therefore, it is possible for the users to obtain more detailed information than a relative ranking.

3. Variation

The present invention is not limited to the above-described embodiment. For example, variations described below are possible. Each variation can be combined suitably.

(1) In the above-described embodiment, a game is picked up for the explanation of an example of the application. The present invention is not limited to the example. Any kind of application can be applied for the invitation or the ranking of the popular applications. For example, the application for fortune-telling or diagnosis, the application for a convenient tool, and the application for photographic image processing can be applied. The application for a chat or a bulletin board used after building a friendship is suitable for the friend request.

(2) In the above-described embodiment, in the case of specifying one or more the candidate users for the friends, in the ranking processing, or in the friend number processing for a specific game, there is no mention about the last login date. The present invention is not limited to the example. For instance, by using the user information table TBL11 as an example of an access table, and using the last login information LastLogin associated with the user identification information UID to be stored in the user information table TBL11, in the case of specifying one or more the candidate users using the application that is subject to the friend request, in the case of specifying the number of the friends using the application for each application, or in the case of specifying the number of the friends in a certain game, using the application in a predetermined period may be added to the condition.

Figure 24:
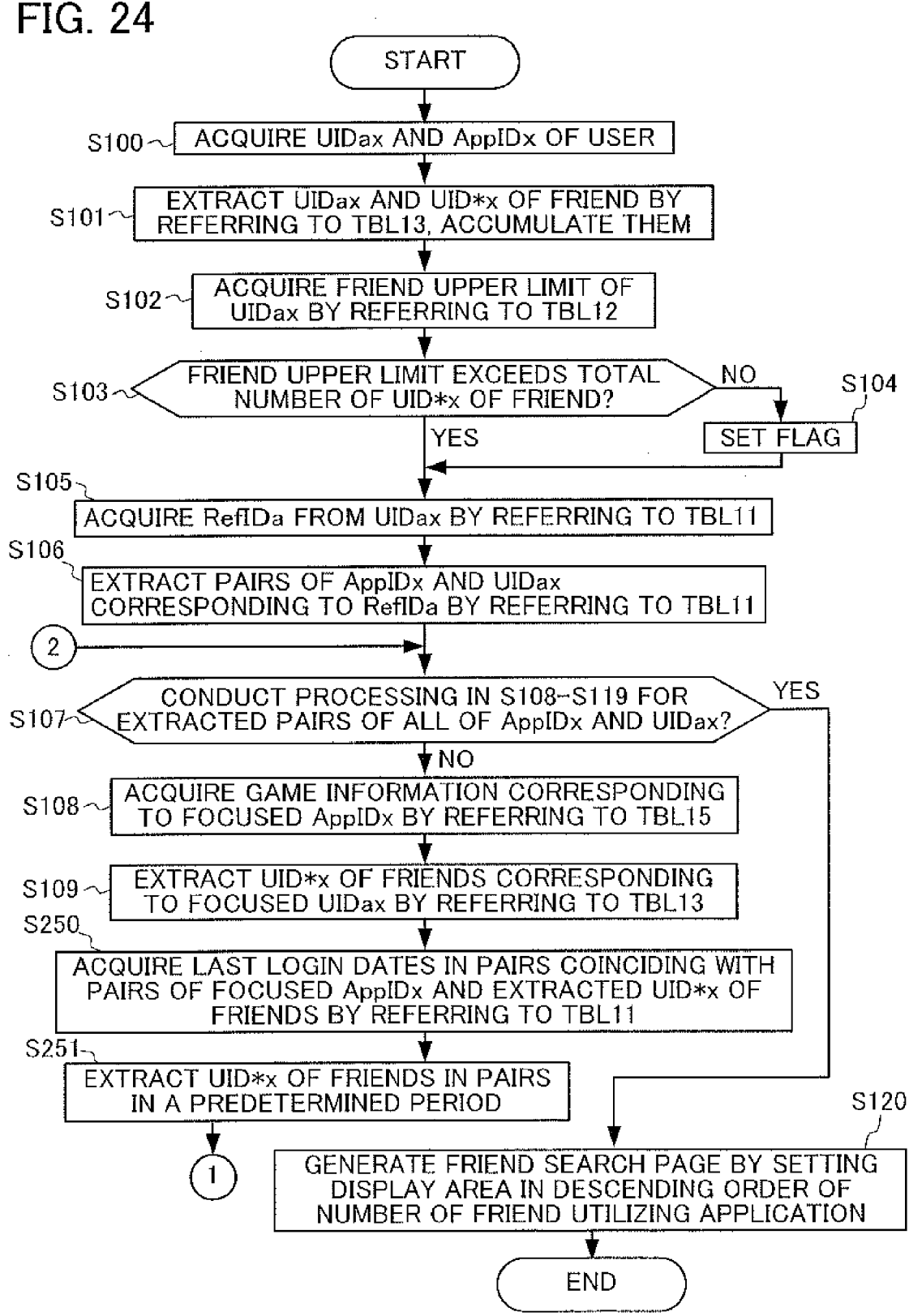
FIG. 24 is a flowchart illustrating processing details of friend processing according to a variation.

For instance, as an alternative of the friend processing illustrated in FIG. 10, the friend processing illustrated in FIG. 24 may be conducted. FIG. 24 is a flowchart of the friend processing corresponding to FIG. 10. In FIG. 24, the processing in step S250 and step S251 is added after the processing in step S109. The CPU 30 of the management server 3A conducts the processing from step S100 to step 109 as in the processing illustrated in FIG. 10. By referring to the user information table TBL11, the CPU 30 acquires the last login date of the pair coinciding with the pair of the user identification information UID*x of the friends extracted in the step S109 and the focused identification information AppIDx (S250). The last login date is stored in the field of the last login information LastLogin of the user information table TBL11. The CPU 30 extracts the pair of the user identification information UID*x of the friends and the focused identification information AppIDx in which the last login date is within a predetermined period on the basis of the acquired last login date and current date when the processing is being conducted, and further extracts the user identification information UID*x of the friends in the extracted pair (S251). According to the above-described processing, it is possible to specify only one or more the candidate users for the friends using the application in a predetermined period.

Figure 25:
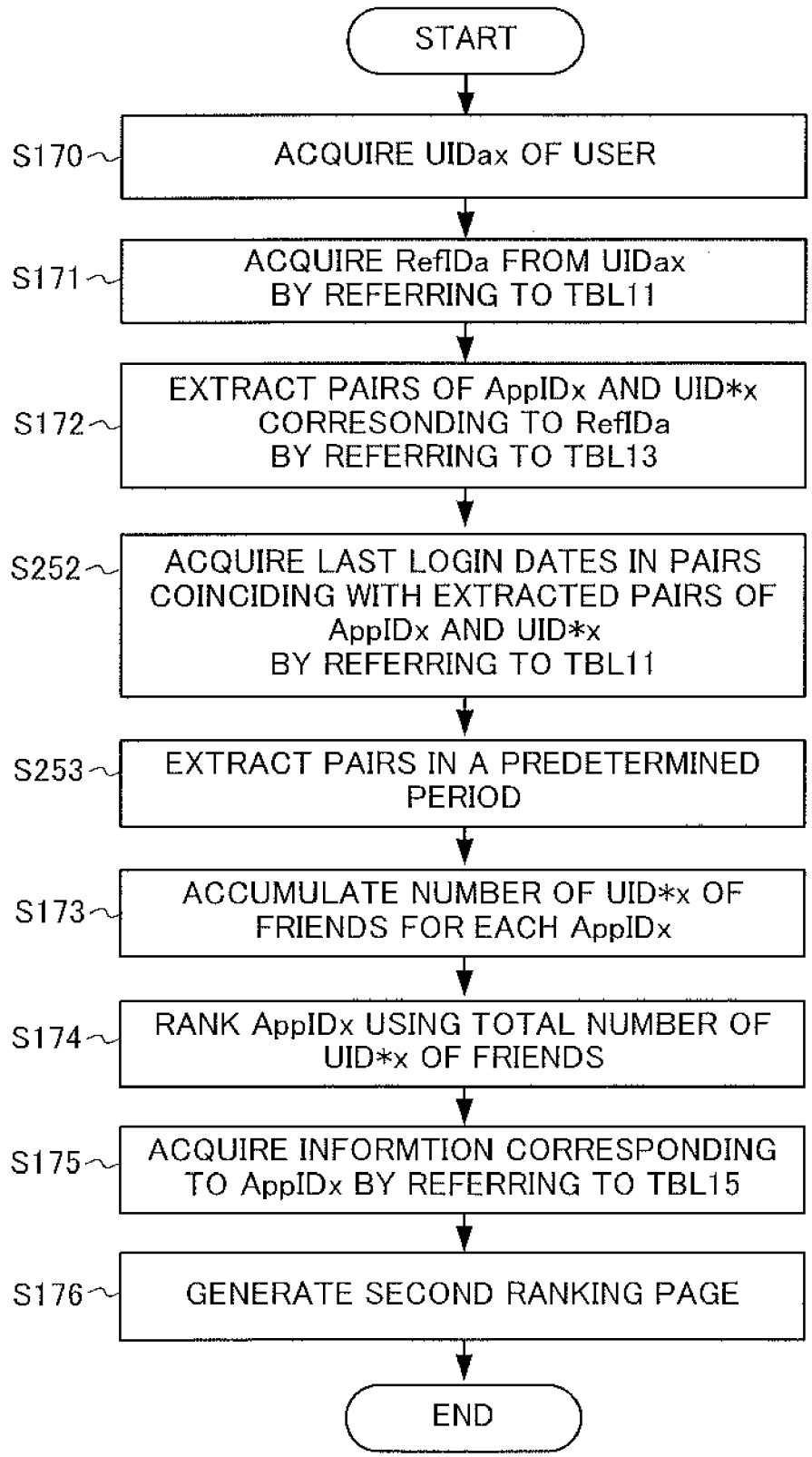
FIG. 25 is a flowchart illustrating processing details of ranking processing according to the variation.

As an alternative of the ranking processing illustrated in FIG. 18, the ranking processing illustrated in FIG. 25 may be conducted. FIG. 25 is a flowchart of the ranking processing corresponding to the second ranking processing illustrated in FIG. 18. In FIG. 25, the processing of step S252 and step S253 is added between step S172 and step S173. The CPU 30 of the management server 3A acquires user identification information UIDax included in the received access request as in the ranking processing illustrated in FIG. 18 (S170). The CPU 30 acquires the reference identification information RefIDa of the user A using the user identification information UIDax by referring to the user information table TBL11 (S171). The CPU 30 extracts the pairs of the identification information AppIDx corresponding to the reference identification information RefIDa of the user A and the user identification information UID*x of the friends in which the group information Group indicates "Friends" by referring to the relation table TBL13 (S172). The CPU 30 acquires the last login dates in the pairs coinciding with the pairs of the user identification information UID*x of the friends and the identification information AppIDx extracted in step S172 by referring to the last login information LastLogin of the user information table TBL11 (S252). The last login dates are stored in the field of the last login information LastLogin of the user information table TBL11. The CPU 30 extracts the pairs of the user identification information UID*x of the friends and the identification information AppIDx in which the last login dates are within a predetermined period on the basis of the acquired last login dates and current date when the processing is being conducted, and further extracts the user identification information UID*x of the friends in the extracted pairs (S253).

The CPU 30 accumulates the number of the extracted user identification information UID*x for each of the identification information AppIDx (S173). The CPU 30 specifies the order of the popularity of the games specified by the identification information AppIDx on the basis of the accumulated number of the user identification information UID*x of the friends (S174). The CPU 30 acquires the names of the games corresponding to the extracted identification information AppIDx, the explanation information, and the icon information by referring to the application information table TBL 15. The CPU 30 generates the second ranking page (S176). The CPU 30 arranges information including the explanation of the games in the descending order of the number of the friends playing the games to generate the second ranking page. If the terminal device 2 receives the access response including the second ranking page from the management server 3A, the terminal device 2 displays the second ranking page on the display 25. As a result of the above-described processing, it is possible to display the ranking for each application with respect to only one or more the candidate users who are the friends using the application in a predetermined period.

Figure 26:
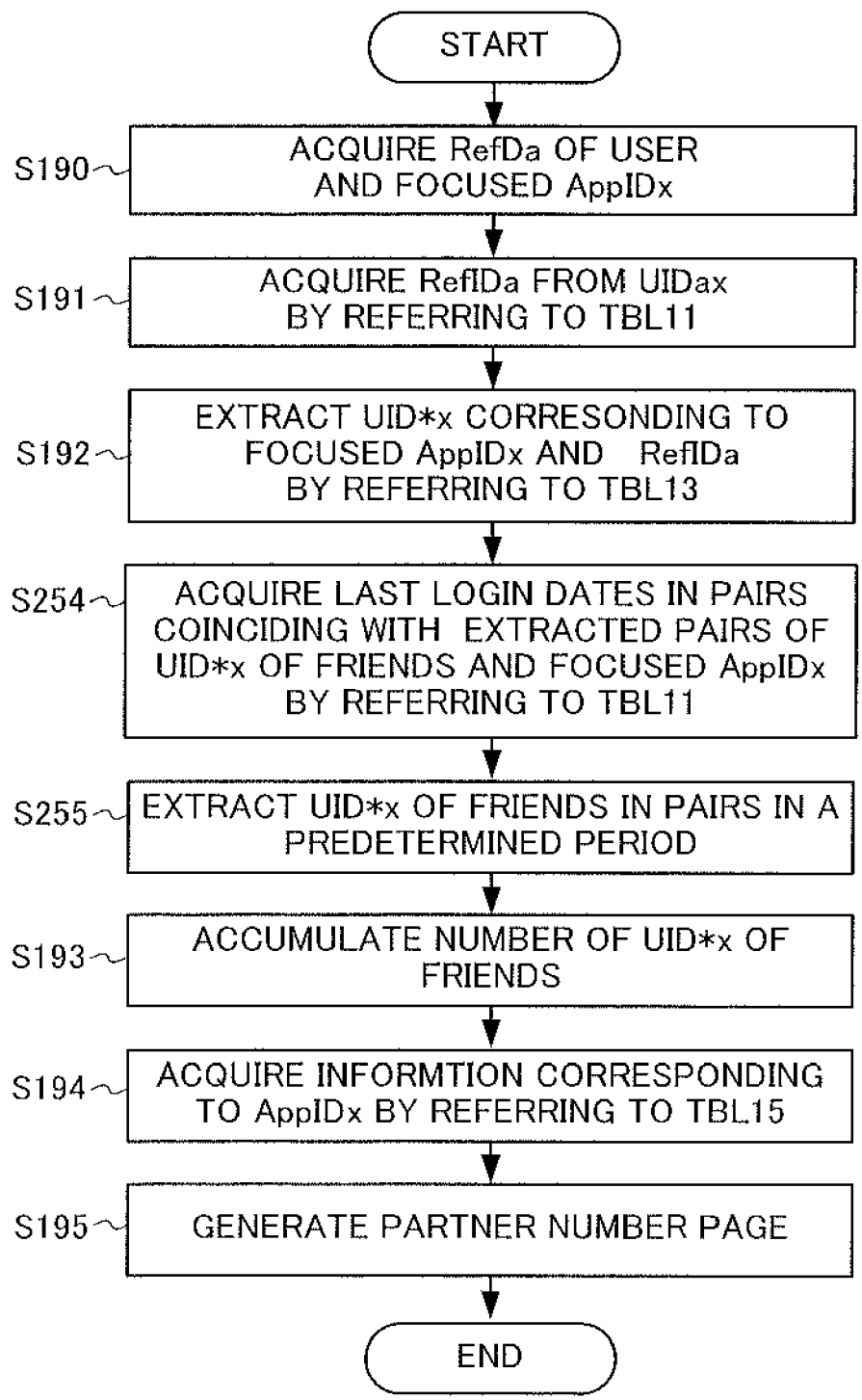
FIG. 26 is a flowchart illustrating processing details of friend number processing according to the variation.

As an alternative of the ranking processing illustrated in FIG. 21, the friend number processing illustrated in FIG. 26 may be conducted. FIG. 26 is a flowchart of the friend number processing corresponding to FIG. 21. In FIG. 26, the processing of step S254 and step S255 are added between the step S192 and the step S193. The CPU 30 of the management server 3A conducts the processing from step S190 to step 192 as in the friend number processing illustrated in FIG. 21. The CPU 30 acquires the last login dates of the pairs coinciding with the pairs of the user identification information UID*x of the friends and the focused identification information AppIDx extracted in step S192 by referring to the user information table TBL 11 (S254). The last login dates are stored in the field of the last login information LastLogin of the user information table TBL11. The CPU 30 extracts the pairs of the user identification information UID*x of the friends and the focused identification information AppIDx in which the last login dates are within a predetermined period on the basis of the acquired last login dates and the current date when the processing is being conducted, and further extracts the user identification information UID*x of the friends in the extracted pairs (S255). As a result of the above-described processing, it is possible to display the number of the friends with respect to only one or more the candidate users who are the friends using the application in a predetermined period.

It sometimes happens that the user ceases to play the game if the user finds that the user does not like the game after playing the game on a trial basis. However, it is possible to send the friend request to the user playing the game by making it a condition that the user plays the application within a predetermined period. In another example, the user may select a period of time such as "one month" and "one week" as the predetermined period when sending the friend request. A different period of time may be set as the predetermined period depending on the application. If the user identification information UID is associated with the last login information LastLogin to be stored, any table may be used in the present invention. The table may be arranged separately from the user information table TBL11.

According to the variations, candidate users are limited to the users who play the application within the predetermined period. Therefore, the users who cease to play the application after playing the application on a trial basis are excluded from one or more the candidate users. As a result, there is a merit to be able to select the users who actually play the focused application as one or more the candidate users.

According to the variations, the applications are displayed in descending order of the number of the friends playing the application within the predetermined period by referring to the date information. This allows the users to know the popularity ranking of the applications utilized by the friends in a certain period at a glance. It sometimes happens that the users cease to utilize the application after utilizing the application on a trial basis. Therefore, it may be desirable to exclude the utilization of a trial basis from the coverage of the ranking. According to the variations, the ranking is made with respect to the applications utilized within the predetermined period of time. It is possible to rank the applications after excluding the utilization of a trial basis.

According to the variations, the number of the users utilizing a certain application within the predetermined period among the friends is specified by referring to the date information. It is possible to know the number of the users utilizing a certain application over the certain period among the friends at a glance.

In the variations, it is explained that utilizing the game within the predetermined period is added to the condition in the case of specifying the number of the friends for each game in the second ranking processing. This variation can be applied to the first ranking processing. If this variation is applied to the first ranking processing, the processing corresponding to step S300 illustrated in FIG. 24 may be conducted between step S201 and step S202 illustrated in FIG. 23.

(3) Although the invitation can be conducted for plural users in the above-described embodiment, a limitation may be added to this embodiment. Specifically, a limitation may be set on the number of the users who can be invited for a predetermined period (for instance, one day, one week). A upper limit of the number of the invitation mails may be set in order to prevent many invitation mails coming. In this case, the invitation may be sent only to the users such that the number of the records in which the status information Stat of the user as a receiver is "0" (pending) is less than ten in the invitation table TBL14. Reception of the invitation may be limited at the side of the user as a receiver. For instance, if the number of the records in which the status information is "0" (pending) is more than ten, the invitation may be refused without sending the invitation mail to the receiver.

The invitation may be limited so that the number of the records in which the status information Stat of the user as a requester is "0" (pending) does not exceed ten. In addition, if the invited user starts the game, incentive (such as a point) may be provided to the invited user.

(4) In above-described embodiment, it is explained that the processing of "Friend request", "Invite" and "Ranking" is selected on the user's own page in the application servers 3B, 3C, 3D. However, the present invention is not limited to this embodiment. The processing of "Friend request", "Invite" and "Ranking" may be selected on the user's own page of the SNS site of the management server 3A.

If the processing of "Friend request", "Invite" and "Ranking" is selected on the user's own page in the application servers 3B, 3C, 3D, information such that the selected game is "game b" and the requester is "Mr. X" is notified by the application servers 3B, 3C, 3D. If the processing of "Friend request", "Invite" and "Ranking" is selected on the user's own page of the SNS site of the management server 3A, similar information may be provided. If the user logins to Mr. X's own page in the SNS site, it is possible to understand that the friend request or the invitation request is sent from "Mr. X". Therefore, a selecting unit for selecting the game to which the request is sent may be provided. This allows the user to select the game to which "Friend request" is sent to, the game to which "Invite" is sent to, or the game in which the user has become friends with the other users surveyed for "Ranking" of popular applications. "Ranking" of popular applications without selecting the game may be selected. These selections may be achieved by proving buttons for the selections. "Ranking" after selecting the game is the first ranking processing in the above-described embodiment. "Ranking" without selecting the game is the second ranking processing in the above-described embodiment.

Figure 27:
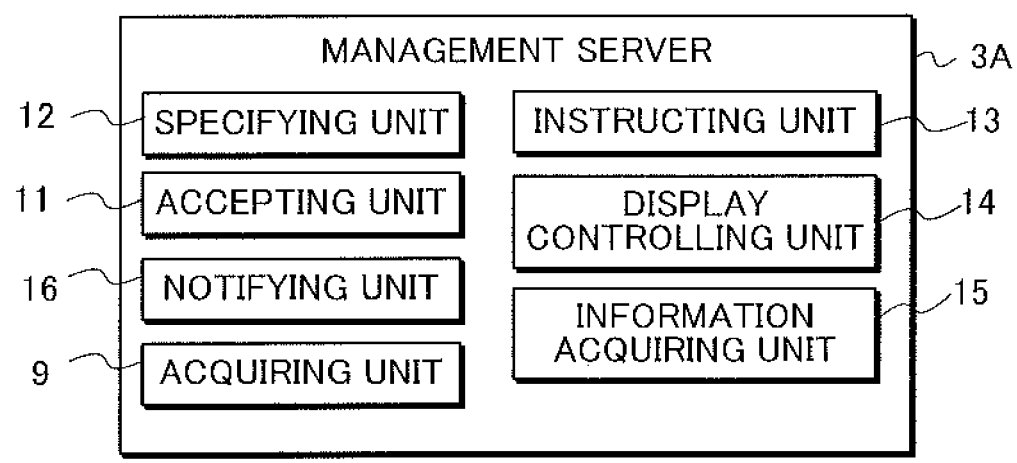
FIG. 27 is a block diagram illustrating a function of a management server according to the variation.

(5) In the above-described embodiment, the friend upper limit for each of the users with respect to each of the games is centrally managed by the management server 3A. The present invention is not limited to this embodiment. The friend upper limit may be managed by each of the application servers 3B, 3C, 3D, so that the management server 3A may inquire of each of the servers 3B, 3C, 3D as necessary. In this case, the CPU 30 of the management server 3A functions as the acquiring unit 9 that acquires the friend upper limit for the users set in the application servers 3B, 3C, 3D corresponding to the identification information accepted by the accepting unit 11 (refer to FIG. 27). The CPU 30 of the management server 3A may function as the acquiring unit 9 that sends an inquiry request inquiring the friend upper limit for the users to the application servers 3B, 3C, 3D corresponding to the identification information AppID accepted by the accepting unit 11, and acquires the friend upper limit as a response to the inquiry request from the application servers 3B, 3C, 3D (refer to FIG. 27).

Figure 28:
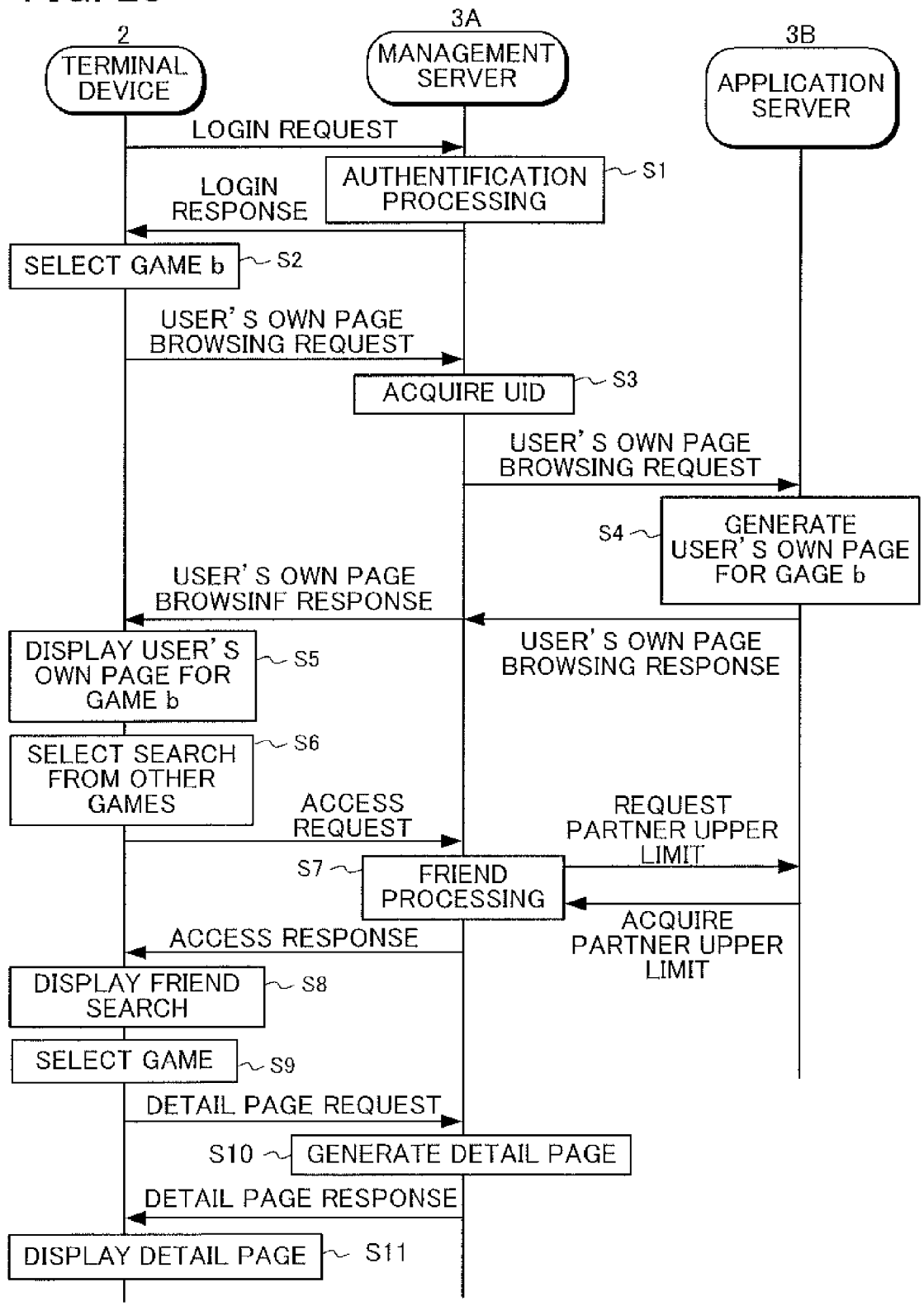
FIG. 28 is a sequence diagram illustrating an operation sequence of an application system relating to common processing according to the variation.
Figure 29:
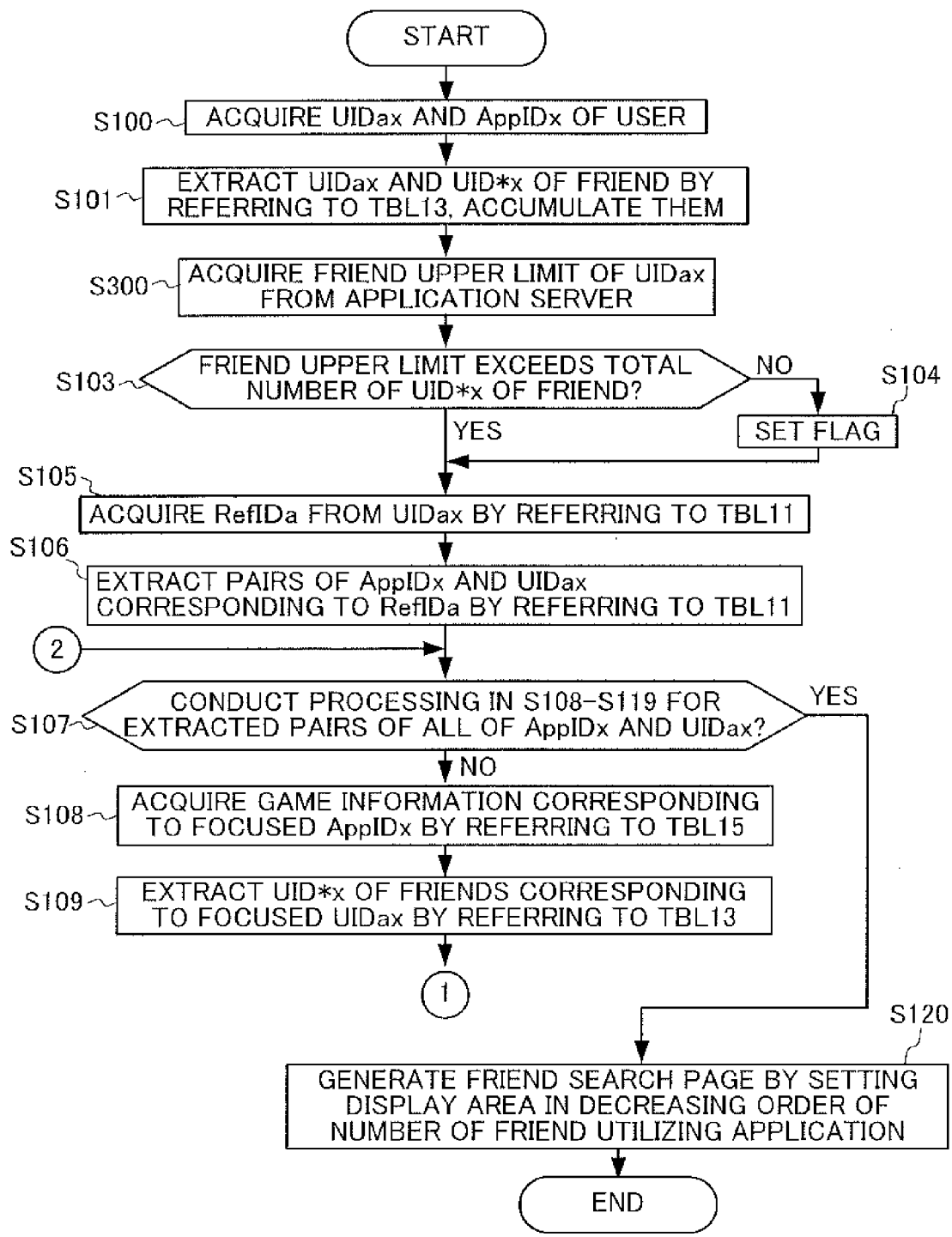
FIG. 29 is a flowchart illustrating processing details of friend processing according to the variation.
Figure 30:
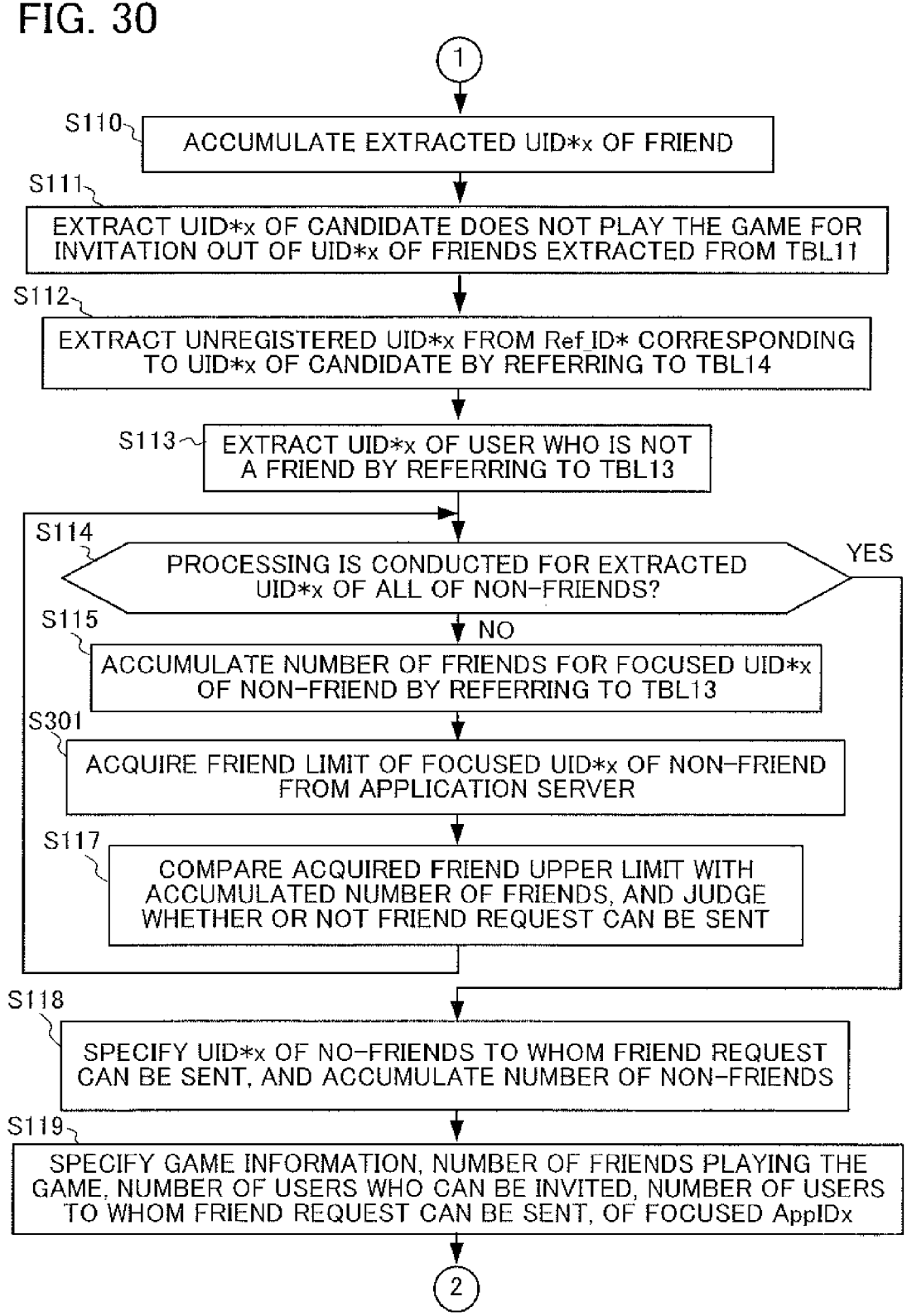
FIG. 30 is a flowchart illustrating processing details of friend processing according to the variation.

FIG. 28 illustrates an operation sequence of this variation corresponding to the operation sequence of the application system relating to the common processing illustrated in FIG. 8. In the operation sequence illustrated in FIG. 28, when the CPU 30 of the management server 3A executes the friend processing (S7), the CPU 30 sends the inquiry request inquiring the friend upper limit of the users to the application servers 3B, 3C, 3D as necessary, and acquires the friend upper limit as a response to the inquiry request from the application servers 3B, 3C, 3D. Specifically, the acquiring processing of acquiring the friend upper limit is conducted as illustrated in FIG. 29 and FIG. 30. FIG. 29 is a flowchart of the friend processing in this variation corresponding to FIG. 10. FIG. 30 is a flowchart of the friend processing in this variation corresponding to FIG. 11. In this variation, as an alternative of step S102 illustrated in FIG. 10, the processing in step S300 is conducted. The CPU 30 sends the request of the friend upper limit corresponding to the user identification information UIDax of the focused user A to the application servers 3B, 3C, 3D, and acquires the friend upper limit corresponding to the user identification information UIDax of the user A from the application servers 3B, 3C, 3D (S300). As illustrated in FIG. 30, in this variation, as an alternative of step S116 illustrated in FIG. 11, the processing in step S 301 is conducted. The CPU 30 sends the request of the friend upper limit corresponding to the user identification information UID*x of the focused non-friend to either of the application servers 3B, 3C, 3D providing the application corresponding to the extracted identification information AppIDx, and acquires the friend upper limit from the application server (S301).

Each of the application servers 3B, 3C, 3D may manage data other than the friend upper limit if the application servers can manage the data. The management server 3A may inquire of each of the application servers 3B, 3C, 3D as necessary.

The friend upper limit may be fixed in each of the applications. In this case, the fixed friend upper limit may be associated with the identification information AppID to be recorded in the application information table TBL15. In the case that the friend upper limit is fixed or variable depending on the application, the upper limit may be treated as the fixed one if the friend upper limit is associated with the identification information AppID to be stored in the application information table TBL 15. The friend upper limit table TBL12 may be referred if the upper limit is not stored (null) in the application information table TBL 15.

According to this variation, the acquiring unit for acquiring the friend upper limit from the application server is provided, so that it is possible to acquire the friend upper limit.

(6) In the above-described embodiment, the selection of the ranking processing and the friend number processing can be executed on the user's own page of the SNS site in the management server 3A. However, the present invention is not limited to this embodiment. The request based on the user's operation (the request for the ranking processing, the request for the friend number processing) may be accepted on a screen (page) provided by the application servers 3B, 3C, 3D. The application servers 3B, 3C, 3D may send the request to the management server 3A. In the case of the request for the friend number processing, the user can select the game in which the user wants to obtain the number of the friends.

Figure 31:
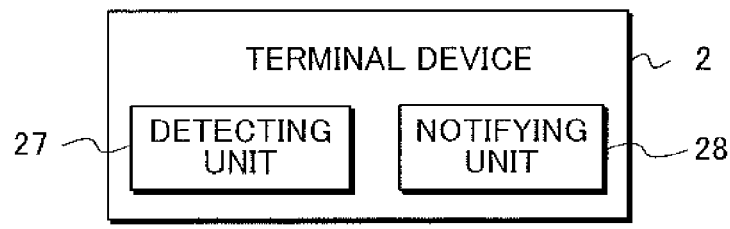
FIG. 31 is a block diagram illustrating a configuration of a terminal device according to the variation.

(7) In the above-described embodiment, if the friend upper limit varies, the notification is sent to each of the application servers 3B, 3C, 3D. However, the present invention is not limited to this embodiment. For instance, if any event (such as a raising of a level in a game) affecting the variation of the friend upper limit occurs in the application (game), the friend upper limit may be notified irrespective of whether or not there is the variation of the friend upper limit. The terminal device 2 may notify the management server 3A of the friend upper limit. In this case, as illustrated in FIG. 31, the CPU 20 of the terminal device 2 functions as a detecting unit 27 for detecting that the friend upper limit for the user of the terminal device 2 varies, and a notifying unit 28 for notifying the management server 3A of the varied friend upper limit.

Figure 32:
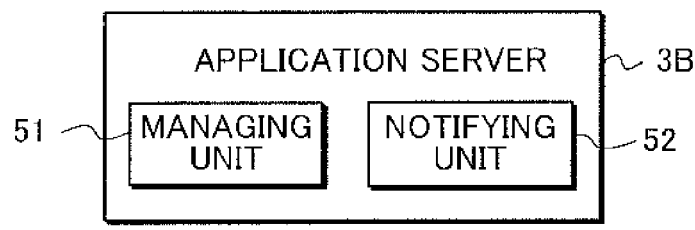
FIG. 32 is a block diagram illustrating a configuration of an application server according to the variation.

As illustrated in FIG. 32, a managing unit 51 and a notifying unit 52 may be provided in the application servers 3B, 3C, 3D that can communicate with the management server associating the user identification information UID of the users, with whom the friendship is built in each of the plural applications (games), with the identification information identifying the application (game) to centrally manage the user identification information UID. The managing unit 51 associates the friend upper limit Limit indicating the friend upper limit of the users, with whom the friendship can be built, with the degree of the predetermined usage performance of the users (players), and manages the user identification information UID. The notifying unit 52 associates the friend upper limit Limit depending on the degree of the usage performance managed by the managing unit 51 with the identification information and the user identification information UID, and notifies the terminal device 2 of the friend upper limit Limit associated with the identification information and the user identification information UID if the degree of the usage performance is updated during the utilization of the application (the progress of the game), so that the friend upper limit Limit varies. The notifying unit 52 may notify the terminal device 2 of the friend upper limit Limit if the degree of the usage performance is updated during the utilization of the application.

Figure 33:
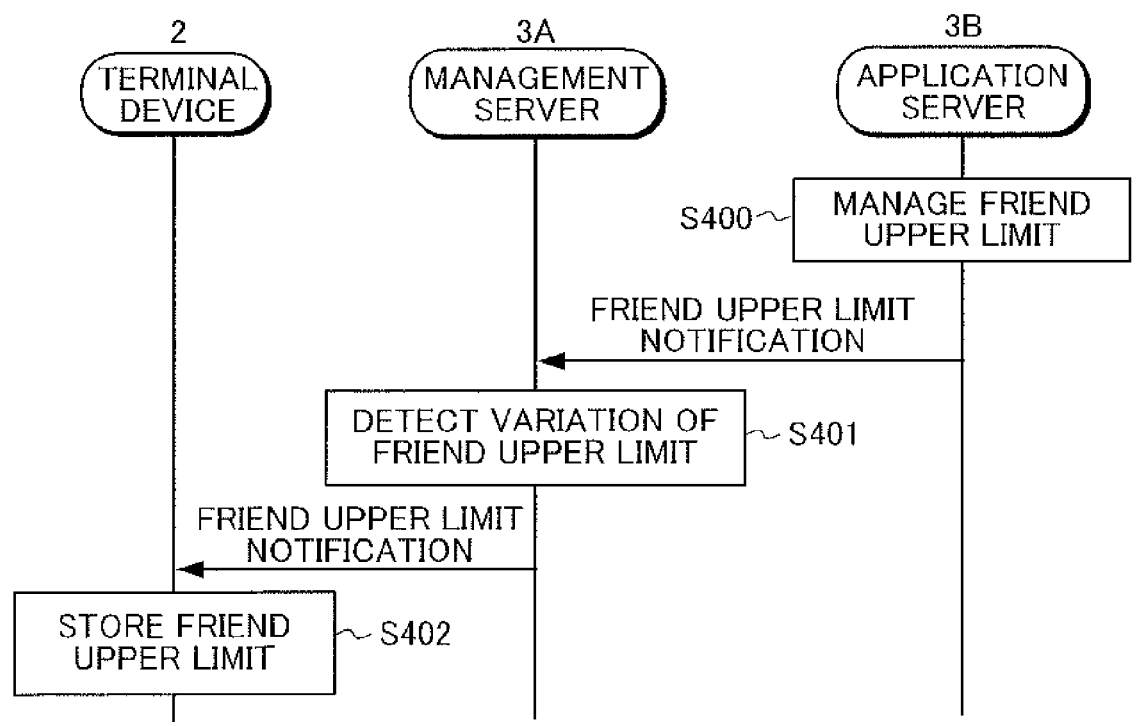
FIG. 33 is a flowchart illustrating processing details of notification processing of friend upper limit according to the variation.

In this variation, as illustrated in FIG. 33, the managing unit 51 of the application servers 3B, 3C, 3D associates the friend upper limit Limit indicating the friend upper limit of the users, with whom the friendship can be built, with the degree of the predetermined usage performance of the users, and manages the friend upper limit Limit (S400). The notifying unit 52 associates the friend upper limit Limit depending on the degree of the usage performance managed by the managing unit 51 with the identification information and the user identification information UID, and notifies the terminal device 2 of the friend upper limit Limit associated with the identification information and the user identification information UID if the degree of the usage performance is updated during the utilization of the application (the progress of the game), so that the friend upper limit Limit varies.

The terminal device 2, which is notified of the friend upper limit associated with the identification information and the user identification information UID from the application servers 3B, 3C, 3D, detects that the friend upper limit of the user of the terminal device 2 varies by the detecting unit 27 (S401). The notifying unit 28 notifies the management server 3A of the varied friend upper limit.

The CPU 30 of the management server 3A, which is notified of the varied friend upper limit from the terminal device 2, stores the varied friend upper limit in the friend upper limit table TBL12 (S402).

In this variation, the notifying unit 52 may associate the friend upper limit Limit depending on the degree of the usage performance managed by the managing unit 51 with the identification information and the user identification information UID, and notify the management server 3A of the friend upper limit Limit associated with the identification information and the user identification information UID.

The application servers may be provided with a requesting unit for requesting the management server to present the users who become candidates for the friends among the users with whom the friendships are built in the other applications (games) out of plural applications (games), and an accepting unit for accepting the request for the friend request for the users selected by the request user, the request associated with the user information of the users who are subject to the friend request, from the management server as a result of the processing of the management server conducted in response to the request of the requesting unit. The notifying unit may notify the management server of the notification in response to the approval or refusal of the user accepting the friend request.

(8) In the above-described embodiment, the CPU 30 specifies the users as the receivers of the invitation in which the user A is the requester by referring to the invitation table TBL14, and excludes the specified users from one or more the candidate users (S112). In the invitation table TBL14, a pending status (Stat=0), and a refusal status or an acceptance status (Stat=1) are recorded. The users corresponding to these statuses are excluded. The users such that the status information Stat is the first status (Stat=1) indicating the refusal status or the acceptance status, and the users such that the status information Stat is the second status (Stat=0) indicating the pending status, are excluded from one or more the candidate users of the invitation.

The present invention is not limited to this example, and can be modified in a manner explained below. The CPU 30 may exclude the users from one or more the candidate users if the status information Stat is the first status. In the second status in which the status information Stat indicates the pending status, the CPU 30 may accept the invitation again.

In the status information Stat, the refusal status may be managed in distinction from the acceptance status so that "Stat=1" is the refusal status, and "Stat=2" is the acceptance status. In this case, the CPU 30 may exclude the users from one or more the candidate users of the invitation if the status information Stat is "0", which indicates the refusal status.

In summary, the CPU 30 excludes the users form one or more the candidate users if the status of the invitation indicated by the status information Stat is the refusal status at least.

Figure 34:
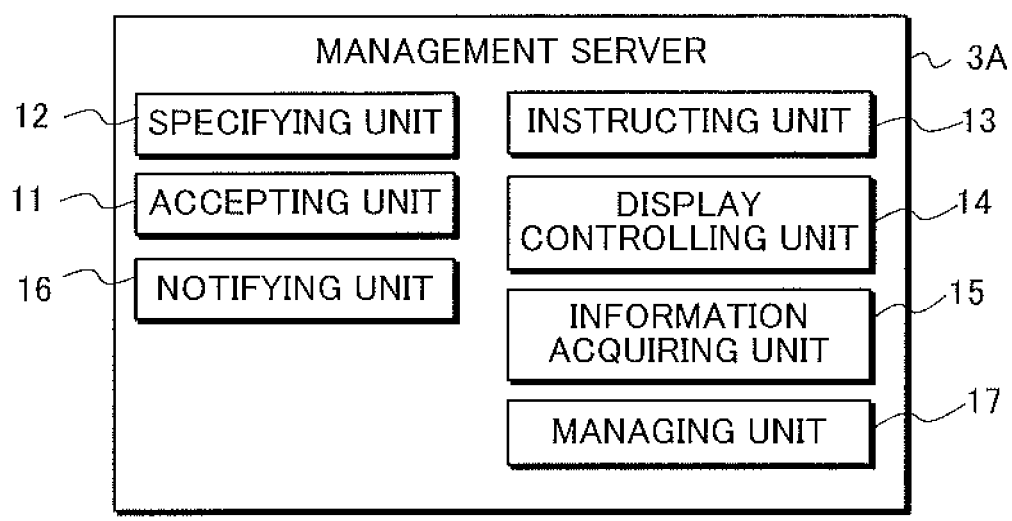
FIG. 34 is a block diagram illustrating a function of a management server according to the variation.

The management server 3A may be provided with a managing unit 17 for managing the invited users and the users refusing the invitation instead of the invitation table TBL14 as illustrated in FIG. 34. The specifying unit 12 may specify the user, who refuses the invitation out of the users invited by the request user, by using the managing unit 51 to exclude the specified user from one or more the candidate users.

Figure 35:
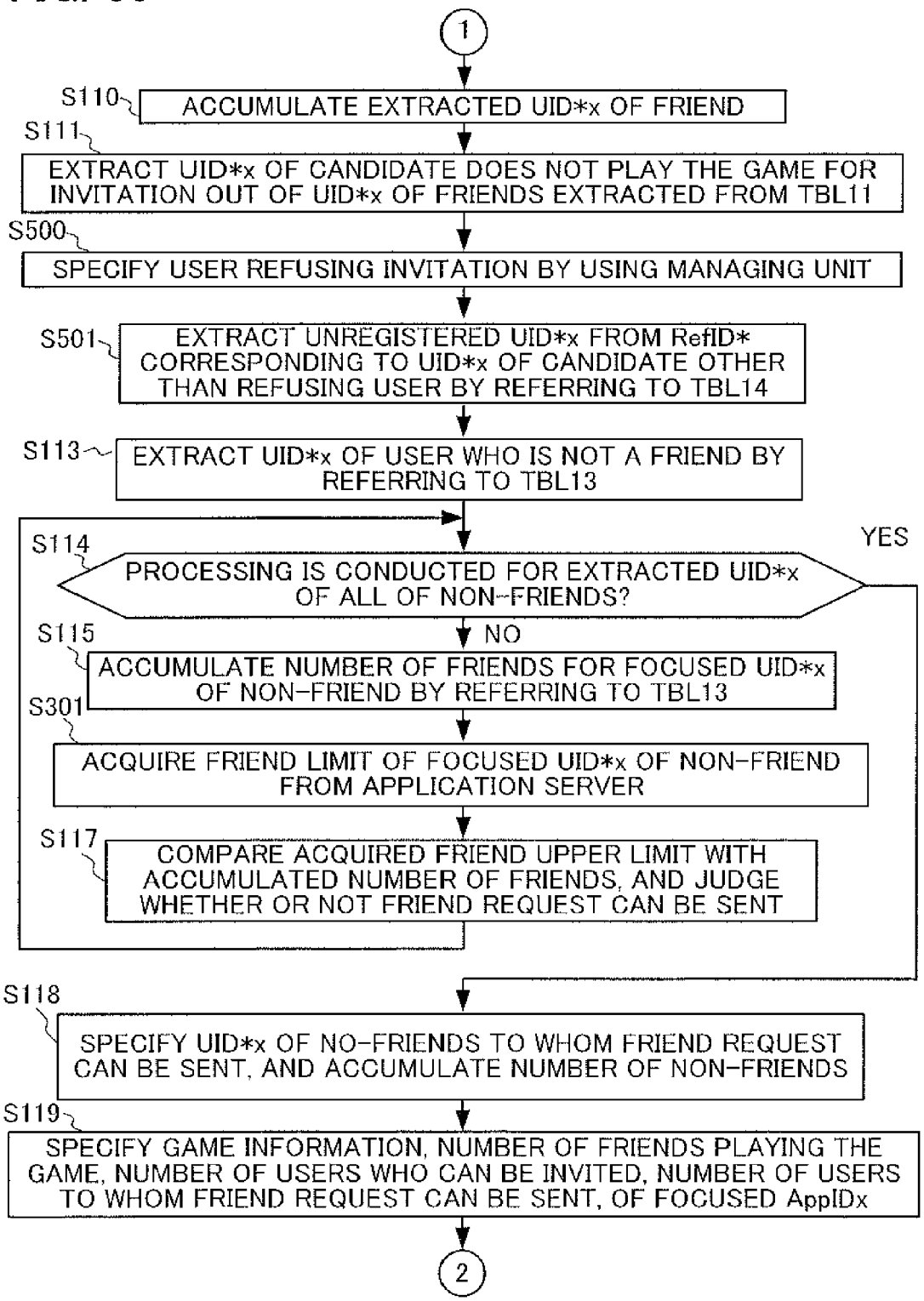
FIG. 35 is a flowchart illustrating processing details of processing according to the variation.

Specifically, the processing illustrated in FIG. 35 is conducted. FIG. 35 is a flowchart corresponding to FIG. 11. In this variation, for instance, the specifying unit 12 requests the list of the users who refuse the invitation of the managing unit 17 after the processing in step S111 is conducted. The specifying unit 12 specifies the user as one of the users who refuse the invitation if there is any user in the list coinciding with the users extracted in step S111 (S500).

If the CPU 30 judges that the reference identification information RefIDa indicating the user A is recorded as that of the requester in the invitation table TBL 14, and the reference identification information RefID* corresponding to the user identification information UID*x of the candidate user is recorded as that of the receiver in the invitation table TBL 14, by referring to the invitation table TBL14, the CPU 30 excludes the user identification information UID*x from the user identification information UID*x of one or more the candidate users, and extracts the user identification information UID*x of the remaining candidate users. The CPU 30 excludes the user identification information UID*x of the users specified in step S500 from the user identification information UID*x of the extracted candidate users to accumulate the remaining user identification information UID*x (S501).

According to this variation, the invited users and the users who refuse the invitation are associated with each other to be managed. This allows the user to prevent the user invited once from being invited again in advance.

(9) In the above-described embodiment, the CPU 30 forcibly rewrites the status information Stat as "1" indicating the refusal or the acceptance (the first status) if it is determined that the pending status of the invitation continues over the predetermined period from the date of the invitation on the basis of the date information Date indicating the date of the invitation recorded in the invitation table TBL 14.

Figure 36:
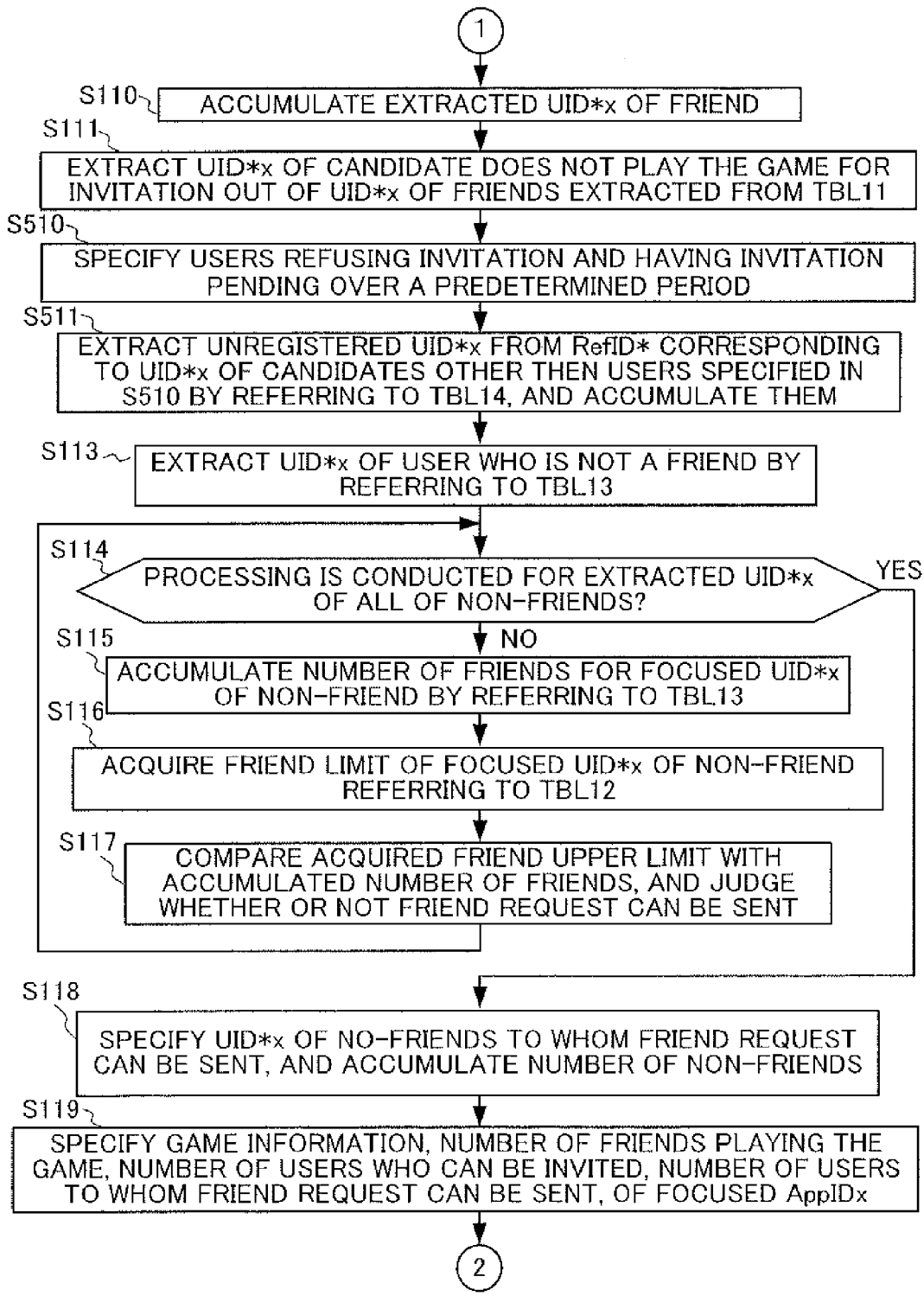
FIG. 36 is a flowchart illustrating processing details of processing according to the variation.

However, the present invention is not limited to this embodiment. The CPU 30 may treat the status of the invitation as the refusal if a predetermined period elapses since the date information Date indicating the date of the invitation in the case that the status information Stat indicates the pending status without rewriting the status information Stat using the date information Date. For instance, in this variation, the processing illustrated in FIG. 36 is conducted. FIG. 36 is a flowchart corresponding to FIG. 11. As illustrated in FIG. 36, the CPU 30 specifies the user who refuses the invitation, and the user who is in a status such that the predetermined period elapses since the date of the invitation in the case that the status information Stat is the pending status (the second status) (S510). The elapse of the predetermined period may be judged on the basis of the date information Date indicating the date of the invitation.

If the CPU 30 judges that the reference identification information RefIDa indicating the user A is recorded as that of the requester in the invitation table TBL14, and the reference identification information RefID* corresponding to the user identification information UID*x of the candidate user is recorded as that of the receiver in the invitation table TBL14, by referring to the invitation table TBL14, the CPU 30 excludes the user identification information UID*x from the user identification information UID*x of one or more the candidate users, and extracts the user identification information UID*x of the remaining candidate users. The CPU 30 excludes the record including the user identification information UID*x of the users specified in the step S510 from the extracted user identification information UID*x to accumulate the remaining user identification information UID*x (S511).

According to this variation, the second request of the invitation can be sent to the user in the pending status for the invitation. Therefore, it is possible to encourage the user who cannot decide whether the user accepts the invitation or refuses the invitation to participate in the game by inviting the user again. However, inviting the same user many times becomes an annoyance. Therefore, in this variation, even if the status information indicating the pending status, the user is excluded from one or more the candidate users if the predetermined period elapses since the date of the invitation. Accordingly, it is possible to prevent a nuisance while encouraging the user to participate in the game. It is possible to manage the refusal and the acceptance as one status. Therefore, it is possible to simplify the data structure.

Figure 37:
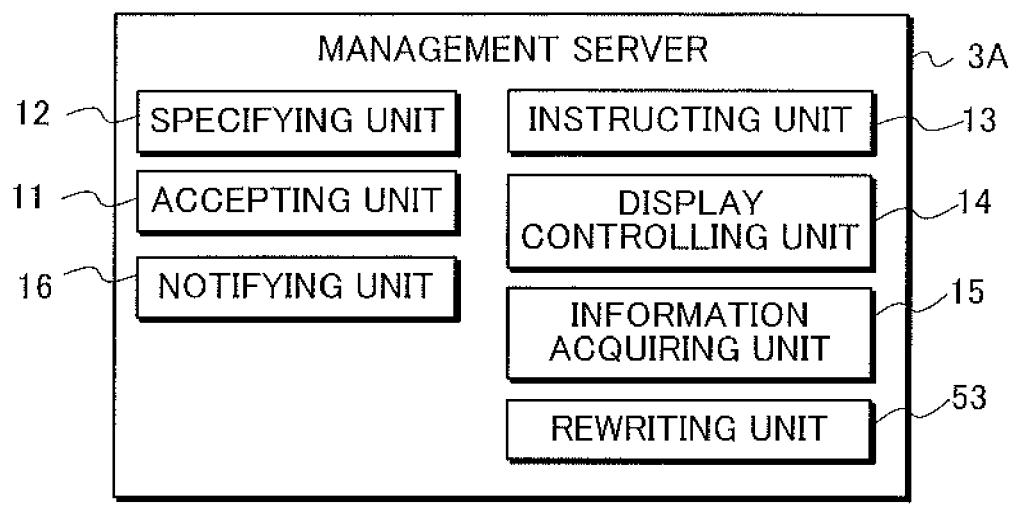
FIG. 37 is a block diagram illustrating a function of a management server according to the variation.
Figure 38:
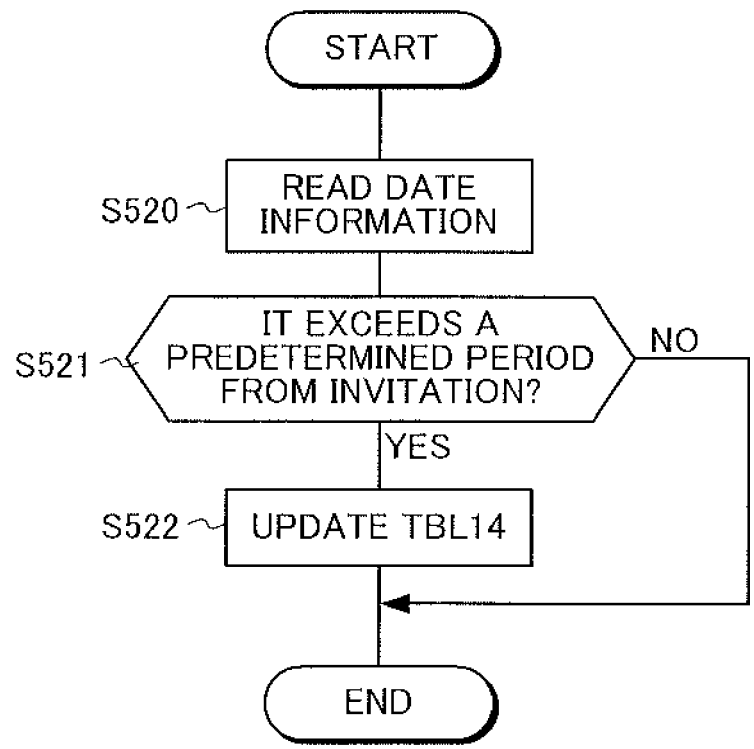
FIG. 38 is a flowchart illustrating processing details of processing according to the variation.

The CPU 30 may forcibly rewrite the status information Stat of the invitation table TBL14 as "1" (the first status) indicating the refusal if it is determined that the pending status of the invitation (the second status) continues over the predetermined period from the invitation on the basis of the date information Date indicating the date of the invitation. In this case, the CPU 30 functions as a rewriting unit 53 as illustrated in FIG. 37. Specifically, the processing illustrated in FIG. 38 is conducted. FIG. 38 is a flowchart of the processing executed periodically after the management server 3A sends the invitation mail to the terminal device 2 as illustrated in FIG. 15. As illustrated in FIG. 38, the CPU 30 reads the date information Date of the invitation table TBL14 after sending the invitation mail to the terminal device 2 (S520). The CPU 30 judges whether or not the predetermined period elapses since the invitation on the basis of the date information Date (S521). If the CPU 30 judges that the predetermined period does not elapse (S521: NO), the CPU 30 terminates the processing. If the CPU 30 judges that the predetermined period elapses (S521:YES), the CPU 30 rewrites the status information Stat of the invitation table TBL14 as "1", which indicates the refusal (S522).

A field indicating whether the record is valid or invalid may be added to the invitation table TBL14. The record may be invalid if the predetermined period elapses.

According to this variation, the status information is rewritten from the pending status of the invitation to the refusal of the invitation if there is no response from the invited user in the case that the predetermined period elapses since the date when the invitation request is notified. Therefore, it is possible to simplify the judgment of whether or not the user corresponds to the candidate user.

The user is excluded from one or more the candidate users not only in the case that the invitation is refused, but also in the case that the invitation is accepted. The user who accepts the invitation has played the game that is subject to the invitation, so that it is unnecessary to invite the user. By using this kind of data structure, it is possible to exclude the user refusing the invitation and the invited user simultaneously, so that the load of the processing is reduced.

(10) In the above-described inquiring processing, the CPU 30 may conduct the processing explained by referring to FIG. 10 and FIG. 11 to display the number of users to whom the friend request can be sent and who can be invited in the terminal device 2.

The CPU 30 may generate a page on which the number of the users to whom the friend request can be sent and the number of the users who can be invited are displayed side by side to selectively display the user to whom the friend request can be sent and the users who can be invited in the terminal device 2.

Figure 39:
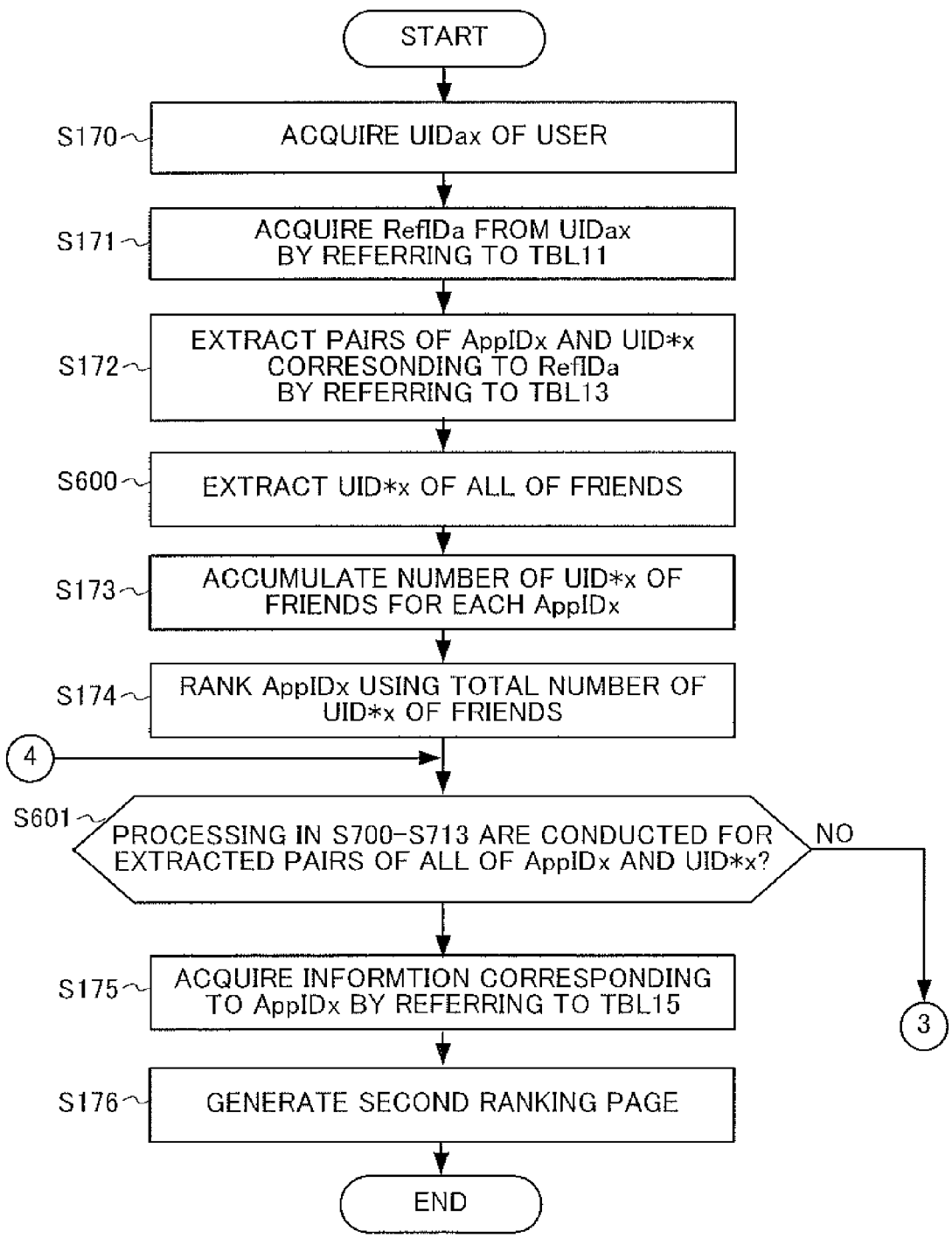
FIG. 39 is a flowchart illustrating processing details of ranking processing according to the variation.
Figure 40:
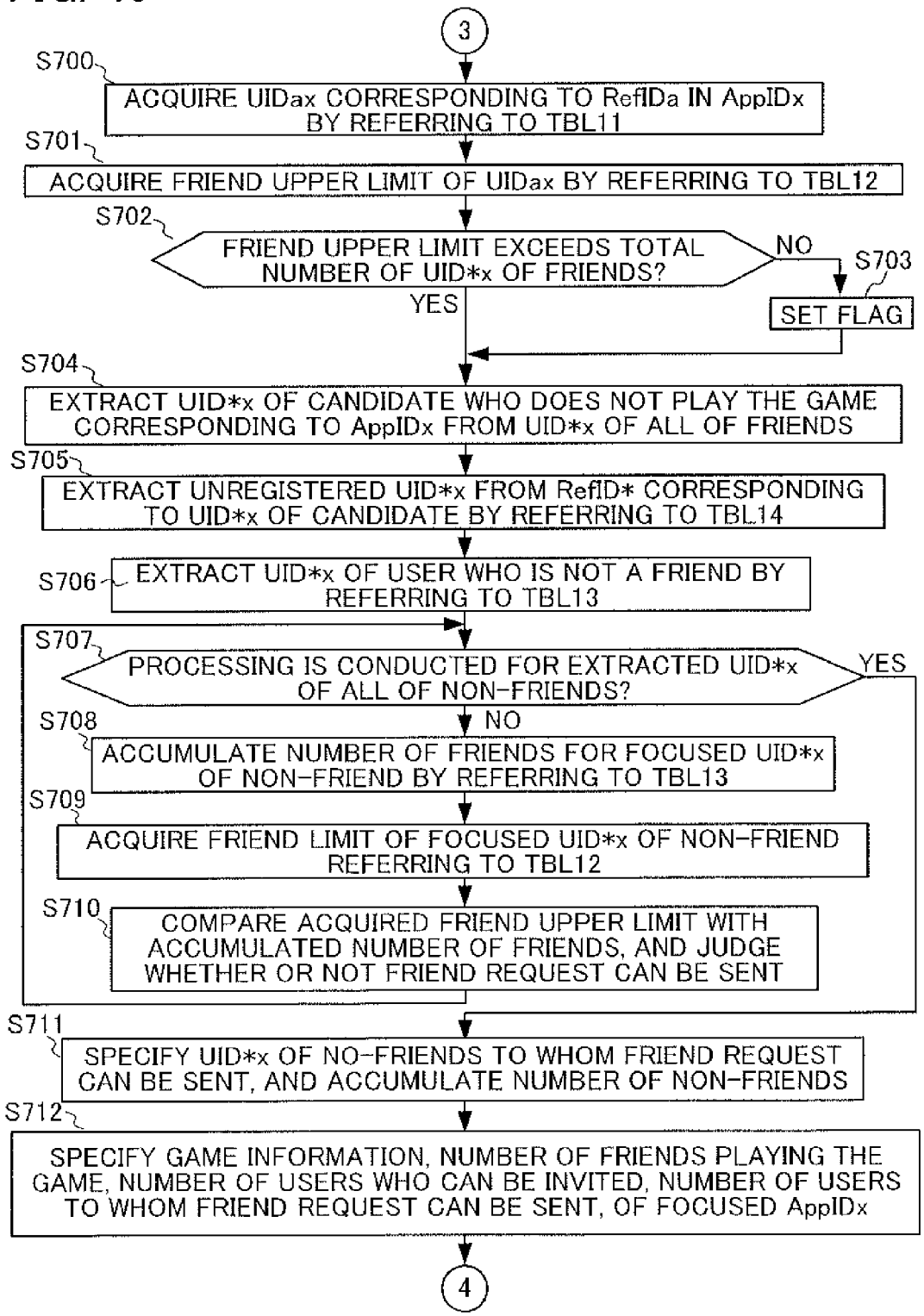
FIG. 40 is a flowchart illustrating processing details of ranking processing according to the variation.

Specifically, the processing illustrated in FIG. 38 and FIG. 40 is conducted. FIG. 39 is a flowchart of the ranking processing of this variation corresponding to the second ranking processing of FIG. 18. FIG. 40 is a flowchart of the processing of this variation corresponding to the processing of calculating the number of the users to whom the friend request can be sent and who can be invited illustrated in FIG. 10 and FIG. 11.

The CPU 30 acquires the user identification information UIDax included in the received access request illustrated in FIG. 39 (S170). The CPU 30 acquires the reference identification information RefIDa of the user A using the user identification information UIDax by referring to the user information table TBL11 (S171). The CPU 30 specifies the pairs of the identification information AppIDx corresponding to the reference identification information RefIDa of the user A and the user identification information UID*x in which "Friends" is indicated in the group information Group by referring to the relation table TBL13 (S172).

Specifically, the CPU 30 extracts the record satisfying (Group=Friends) AND {(RefID_To=RefIDa) OR (RefID_From=RefIDa)} AND (Stat=1), and specifies one or plural pairs of the identification information AppID and the user identification information UID*x included in them.

The CPU 30 excludes redundant user identification information UID*x from all of the user identification information UID*x included in the specified pairs to extract all of unique user identification information UID*x (S600). By conducting this processing, the user identification information UID*x of all friends of the user A is extracted. The extracted user identification information UID*x of all friends of the user A is used for the processing of calculating the number of the users who can be invited, which is described below.

After extracting the user identification information UID*x of all friends of the user A, the CPU 30 accumulates the number of the user identification information UID*x in the pairs extracted in step S172 for each identification information AppIDx (S173). The CPU 30 specifies the order of the popularity of the games specified by the identification information AppIDx on the basis of the total number of the user identification information UID*x of the friends (S174).

The CPU 30 judges whether or not the processing in steps S700-S713 for all of the extracted pairs of the identification information AppIDx and the user identification information UID*x is terminated (S601). If the processing in the steps S700-713 is not terminated for all of the pairs (S601:NO), the CPU 30 focuses on one identification information AppIDx, and conducts the processing of calculating the number of the users who can be invited to the game corresponding to the focused identification information AppIDx, and the processing of calculating the number of the users to whom the friend request can be sent in the game corresponding to the focused identification information AppIDx.

The CPU 30 acquires the user identification information UIDax corresponding to the reference identification information RefDa of the user A in the focused AppIDx by referring to the user information table TBL11 (S700). For instance, if the focused identification information AppIDx is "00000001", and the reference identification information RefIDa of the user A is "00000011", the user identification information UIDax is "XCV56714".

The CPU 30 conducts the processing of judging whether or not the number of the friends of the user A reaches the friend upper limit (S701-S703). The CPU 30 acquires the friend upper limit corresponding to the user identification information UIDax of the user A by referring to the friend upper limit table TBL12 (S702).

The CPU 30 judges whether or not the acquired friend upper limit exceeds the number of the user identification information UID*x of the friends for the focused identification information AppIDx out of the user identification information UID*x for each identification information AppIDx accumulated in step S173 of FIG. 39 (S702). If the judgment condition is negative (S702:NO), it is impossible to conduct the friend request in the game corresponding to the focused identification information AppIDx since the total number of the user identification information UID*x of the friends of the user A has reached the friend upper limit. Therefore, the CPU 30 sets a flag indicating that the friend request is unavailable (S703). However, if the judgment condition is affirmative (S702:YES), the CPU 30 conducts the next processing without setting the flag since the total number of the user identification information UID*x of the friends of the user A has not reached the friend upper limit.

The CPU 30 conducts the processing of specifying the users who can be invited to the game corresponding to the focused identification information AppIDx (S704-S705). The CPU 30 extracts the user identification information UID*x of one or more the candidate users who do not play the game corresponding to the focused identification information AppIDx out of the user identification information UID*x of all of the friends extracted in step S600 of FIG. 39 in the case that one or more the users who do not play the games that are subject to the invitation are one or more the candidate users (S704). Specifically, the CPU 30 focuses one user identification information UID*x out of the user identification information UID*x of all of the friends, and acquires the reference identification information RefID* corresponding to the focused user identification information UID*x. The CPU 30 acquires one or plural of the identification information AppIDx corresponding to the acquired reference identification information RefID*. The CPU 30 judges whether or not the focused identification information AppIDx is included in the acquired one or plural identification information AppIDx. If the focused identification information AppIDx is not included, the friends corresponding to the reference identification information RefID* do not play the game corresponding to the focused identification information AppIDx. Therefore, the CPU 30 extracts the user identification information UID*x corresponding to the reference identification information RefID*x as the user identification information UID*x of one or more the candidate users. The above-described processing is conducted for the user identification information UID*x of all of the friends extracted in step S600 in FIG. 39.

The CPU 30 extracts the record, in which the reference identification information RefIDa indicating the user A is recorded as that of the requester, and the reference identification information RefID* corresponding to the user identification information UID*x of one or more the candidate users is recorded as that of the receiver, out of the records including the focused identification information AppIDx by referring to the invitation table TBL14. The CPU 30 excludes the user identification information UID*x corresponding to the reference identification information RefID* of one or more the candidate users included in the extracted records from the user identification information UID*x of one or more the candidate users extracted in step S704, and extracts the user identification information UID*x of one or more the candidate users that is not recorded in the invitation table TBL14 to accumulate them (S705).

In the invitation table TBL14, the records including the pairs of the users as the requesters and the users as the receivers such that the invitation is pending or accepted are recorded. The users recorded in the records are ones who have been invited ever once. Therefore, the invitation is not conducted again for the users who have been invited ever once. Accordingly, it is possible to specify the other users whom the user A can invite and the number of the other users. The accumulated number of the other users who can be invited is displayed on the second ranking page of this variation for each game (refer to an area 225 in FIG. 41 explained below).

The CPU 30 conducts the processing of specifying the users to whom the friend request can be sent in the application corresponding to the focused identification information AppIDx (S706-S711). If the flag indicating that the friend request is unavailable is set in step S703, the CPU 30 resets the flag to proceed to step S712 without conducing the processing in steps S706-S711.

The CPU 30 extracts the user identification information UID*x of the non-friends for the focused identification information AppIDx by referring to the relation table TBL13 (S706). The CPU 30 extracts the other users, who have the friendships with the user A in a certain game other than the focused game corresponding to the focused identification information AppIDx, and have played the focused game (the first condition). The CPU 30 extracts the users who do not have the friendships with the user A in the focused game (the second condition).

The CPU 30 judges whether or not the processing in steps S708-S710 is completed for the user identification information UID*x of all of the non-friends extracted in step S706 (S707). If the judgment condition is satisfied (S707:YES), the CPU 30 proceeds to the processing in step S711. If the judgment condition is not satisfied (S707:NO), the CPU 30 proceeds to step S708 to accumulate the number of the friends of the focused non-friends using the user identification information UID*x of the focused non-friends by referring to the relation table TBL13. In this case, the CPU 30 extracts the receiver's reference identification information RefID_To from the record in which the user identification information UID*x of the non-friends coincides with the requester's user identification information UID_From, by referring to the relation table TBL13. The CPU 30 extracts the request's reference identification information RefID_From from the record in which the user identification information UID*x of the non-friends coincides with the receiver's user identification information UID_To. The number of the user identification information UID*x corresponding to the extracted receiver's reference identification information RefID_To and the extracted requester's reference identification information RefID_From becomes the number of the friends of the non-friends indicated by the user identification information UID*x of the non-friends. The CPU 30 accumulates the number of the friends of the non-friends indicated by the user identification information UID*x of the non-friends.

The CPU 30 acquires the friend upper limit of the user identification information UID*x of the focused non-friend by referring to the friend upper limit table TBL12 (S709). The CPU 30 compares the acquired friend upper limit with the accumulated number of the friends of the focused non-friend. If the accumulated number does not reach the friend upper limit, the CPU 30 judges that the friend request can be sent to the focused non-friend (the third condition is satisfied). If the accumulated number reaches the friend upper limit, the CPU 30 judges that the friend request cannot be sent to the focused non-friend (S710). The CPU 30 returns the processing to step S707, and repeats the processing from step S707 to step S710 until the judgment condition in step S707 is satisfied. If the judgment condition in step S707 is satisfied, the CPU 30 proceeds to the processing in step S711.

In step S711, the CPU 30 specifies the user identification information UID*x of the focused non-friend to whom the friend request can be sent, and accumulates the number of the non-friends to whom the friend request can be sent. The accumulated number of the non-friends is the number of the users who have the friendships in any game other than the focused game, and do not have the friendships in the focused game. The accumulated number of the non-friends are displayed in the second ranking page in this variation for each game (refer to an area 226 in FIG. 41 explained below).

The CPU 30 temporally stores the number of the users who can be invited to the focused game corresponding the focused identification information AppIDx, which is accumulated in the processing in step S705, and the number of the user to whom the friend request can be sent in focused game, which is accumulated in the processing in step S711, in a variable area or the working area (S712).

The CPU 30 returns the processing to step S601 illustrated in FIG. 39. If the processing from step S700 to step S713 is terminated for all of the identification information AppIDx extracted in step S172 (S601:YES), the CPU 30 acquires the name of the game corresponding to the extracted identification information AppIDx, the explanation information, and the icon information by referring to the application information table TBL15. The CPU 30 generates the ranking page using the number of the users who play the game corresponding to each of the identification information AppIDx accumulated in step S173, the number of the users who can be invited to and to whom the friend request can be sent for the game corresponding to each of the identification information AppIDx stored in step S512, the name of the game corresponding to each of the identification information AppIDx acquired in step S175, the explanation information, and the icon information (S176). The CPU 30 arranges information including the explanation of the games in descending order of the number of the friends who play the games to generate the second ranking page. If the terminal device 2 receives the access response including the second ranking page from the management server 3A, the terminal device 2 displays the second ranking page on the display 25.

If the flag indicating that the friend request is unavailable in the processing in step S703, the number of the users to whom the friend request can be sent is not displayed instead of displaying of the number of the users to whom the friend request can be sent. Alternatively, "Request Unavailable. You hit upper limit of the request" is displayed instead of displaying of the number of the users to whom the friend request can be sent.

Figure 41:
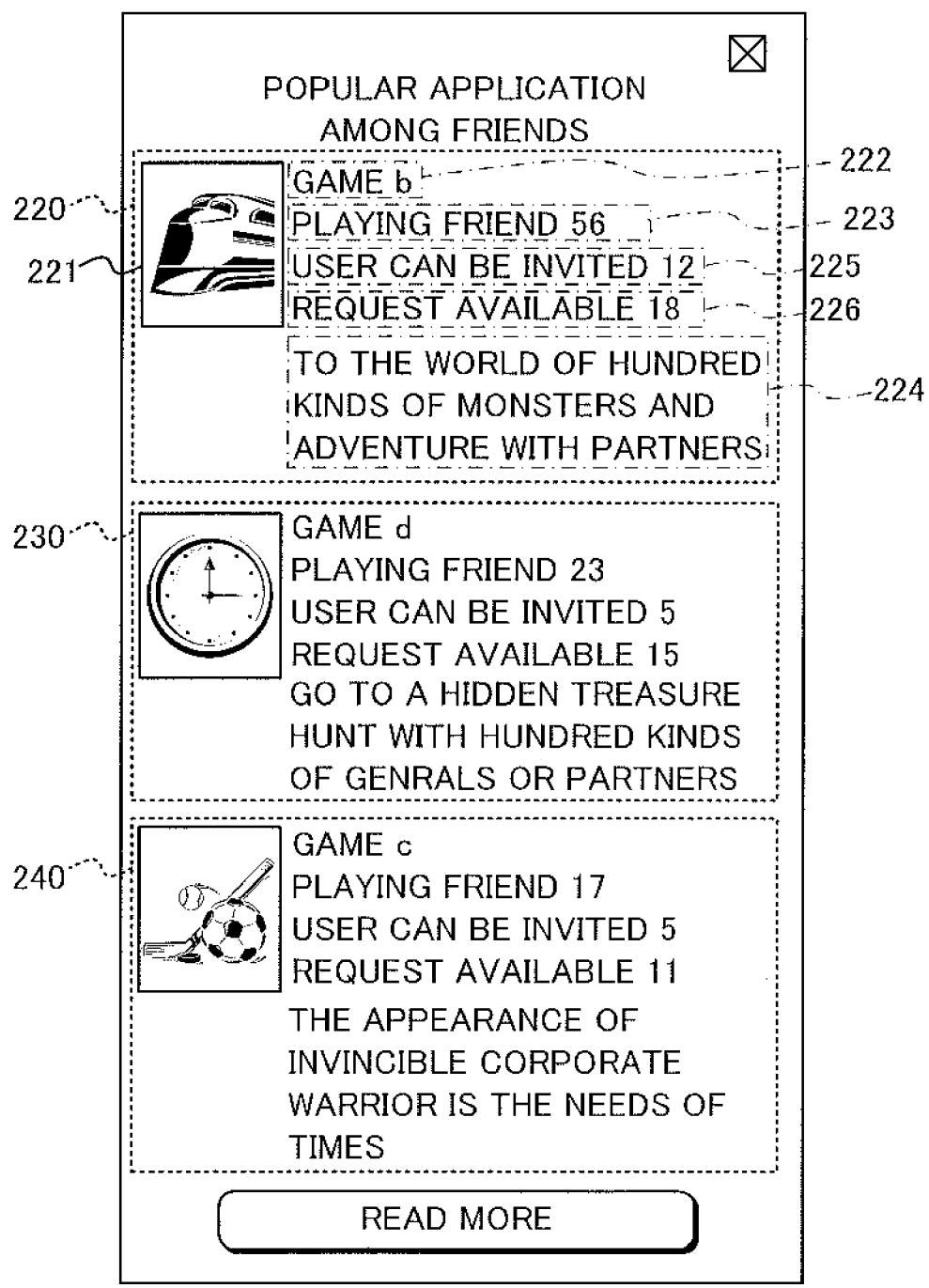
FIG. 41 is an explanatory view illustrating an example of a ranking page according to the variation.

FIG. 41 illustrates an example of the second ranking page in this variation. In this example, the ranking display areas 220, 230, 240 are arranged, so that the ranking is displayed in the ranking indicating area 220, the ranking indicating area 230, the ranking indicating area 240, in the descending order of ranking.

In the area 221, the icon is displayed using the icon information read from the application information table TBL15. In the area 222, the name of the application (game) is displayed. These pieces of information are acquired by the processing in step S175. In the area 223, the number of the other users who have the friendships with the user A in any of the games the user A plays and have played the game b. This information is acquired by the processing in step S173. In the area 224, the explanation of the game b is displayed. This information is acquired by the processing in step S175. The games displayed in the page also includes the game the user A has not played.

In the area 225, it is displayed how many more users having the friendship with the user A in the other games the user A can invite for the game b. The number of the users who can be invited is accumulated in the processing in step S705. In the area 226, the number of the users to whom the user A can newly send the friend request in the game b. The number of the user to whom the friend request can be sent is accumulated in the processing in step S711.

As described above, according to this variation, in the case that a specific application to which the request user wants to invite a specific user and the specific user whom the request user wants to invite to the specific application are determined in advance, if it turns out that the specific user has not utilized the specific application, the screen is switched to the display of the users who can be invited. Therefore, it is possible to invite the specific user without sending the friend request to the specific user. The user to whom the request user wants to send the friend request in a certain application might not utilize the certain application. Presenting the pair of the function of the friend request and the function of the invitation to the user in the terminal device 2 improves the user's convenience.

According to this variation, it is possible to display the number of the non-friends, with whom the friendships are built in any application other than the ranking-displayed applications, utilize the ranking-displayed applications (the first condition), and who do not have the friendships with the request user in the ranking-displayed application (the second condition), and the number of whose friends does not reach the friend upper limit of the non-friends (the third condition). This allows the request user to know the number of the non-friends to whom the friend request can be sent in the ranking-displayed application, which improves the request user's convenience.

This variation also allows the request user to know the number of the non-friends who can be invited to the ranking-displayed application, which improves the request user's convenience.

In this variation, it is described that the number of the users who can be invited to each of the ranking-displayed games and the number of the users to whom the friend request can be newly sent in each of the ranking-displayed games when conducting the second ranking processing. However, this variation can be applied to the first ranking processing in a manner similar to that in the second ranking processing. When applying this variation to the first ranking processing, the processing from step S700 to step S712 may be conducted for the identification information AppIDx corresponding to the game displayed on the screen illustrated in FIG. 9 (the game b in the example of FIG. 9).

(11) In the above-described embodiment and variations, by providing the user information table TBL11, the friend upper limit table TBL12, and the relation table TBL13, various pieces of information are intensively managed. When conducting a unified management, by providing a discrete user information table TBL11a, a discrete friend upper limit table TBL12a, and a discrete relation table TBL13a in a part or all of the application servers 3B, 3C, 3C, synchronization may be performed between the user information TBL11 and the discrete user information table TBL11a, between the friend upper limit table TBL12 and the discrete friend upper limit table TBL12a, and between the relation table TBL13 and the discrete relation table TBL13a.

Figure 42:
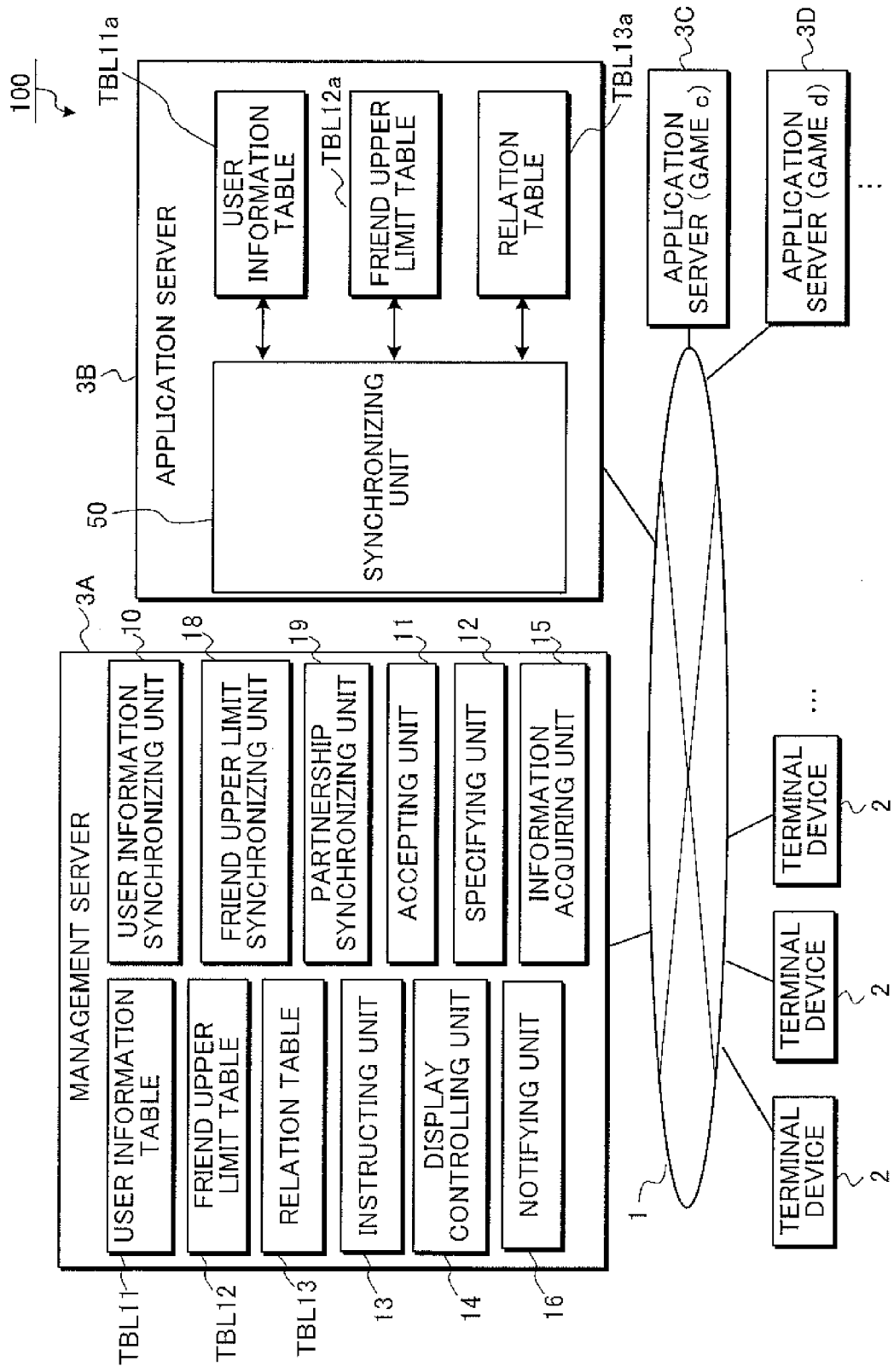
FIG. 42 is a block diagram illustrating an application system according to the variation.

FIG. 42 illustrates a block diagram of the application system 100 according to this variation. In this variation, the application server 3B is provided with the discrete user information table TBL11a, the discrete friend upper limit table TBL12a, and the discrete relation table TBL13a. The other application servers 3C, 3D are not provided with those tables. However, the other application servers 3C, 3D may be provided with those tables.

In the following explanation, in order to distinguish the tables of the management server 3A from those of the application server 3B, the user information table TBL11, the friend upper limit table TBL12, and the relation table TBL13 provided in the management server 3A are called the first user information table TBL11, the first friend upper limit table TBL12, and the first relation table TBL13. The user information table TBL11a, the friend upper limit table TBL12a, and the relation table TBL13a provided in the application server 3B are called the second user information table TBL11a, the second friend upper limit table TBL12a, and the second relation table TBL13a.

FIG. 43 illustrates a data structure of the second user information table TBL11a. As illustrated in this figure, plural records are recorded in the second user information table TBL11a. One record is provided with the record identification information ID uniquely identifying the record, the user identification information UID uniquely identifying the user, and the last login information Last-Login indicating the date of the last login. The reference identification information RefID recorded in the first user identification table TBL11 illustrated in FIG. 3 is not recorded in the second user identification table TBL11a. This is because the reference identification information RefID is identification information for the management in the management server 3A, which is not necessary to be managed in the application server 3B. The identification information AppID stored in the first user identification information TBL11 is not stored in the second user information table TBL11a. This is because the application server 3B presents the game b, which is uniquely specified. It is unnecessary to store the identification information AppID in application server 3B.

FIG. 44 illustrates a data structure of the second friend upper limit table TBL12a. As illustrated in the figure, plural records are recorded in the second friend upper limit table TBL12a. The record identification information ID, the user identification information UID, and the friend upper limit Limit are associated with each other to be stored in one record. In the first friend upper limit table TBL12 illustrated in FIG. 4, the friend upper limit Limit, which is managed by all of the application servers 3B, 3C, 3D is aggregated. However, in the second friend upper limit table TBL12a as illustrated in FIG. 44, the friend upper limit Limit relating to the game b managed by the application server 3B is stored.

FIG. 45 illustrates a data structure of the second relation table TBL13a. As illustrated in this figure, plural records are recorded in the relation table TBL13a. In one record, the record identification information ID, the identification information AppID, the group information Group indicating the type of the relation, the requester's user identification information UID_From which is the user identification information UID of the user as the requester, the receiver's user identification information UID_To which is the user identification information UID of the user as the receiver, and the status information Stat indicating the status of the request are associated with each other to be stored. The requester's reference identification information RefID_From, which is the reference identification information RefID of the user as the requester and is stored in the second relation table TBL13 illustrated in FIG. 5, is not stored. The receiver's reference identification information Ref_To, which is the reference identification information RefID of the user as the receiver and is stored in the second relation table TBL13 illustrated in FIG. 5, is not stored. The reference identification information RefID is identification information for the management in the management server 3A, which is not necessary to be managed in the application server 3B.

The explanation will be back to FIG. 42. The application server 3B is further provided with the synchronizing unit 50. The synchronizing unit 50 performs in connection with a user information synchronizing unit 10, a friend upper limit synchronizing unit 18, and a friendship synchronizing unit 19 of the management server 3A so as to synchronize the memory contents in each of the second user information table TBL11a, the second friend upper limit table TBL12a, and the second relation table TBL13a with those in each of the first user information table TBL11, the first friend upper limit table TBL12, and the first relation table TBL13. Specifically, the CPU of the application server 3B executes a predetermined API (Application Programming Interface) to achieve the synchronization.

The user information synchronizing unit 10 synchronize the memory contents in the first user information table TBL11 with those in the second user information table TBL11a. Specifically, if the memory contents of the second user information table TBL11a varies in the application server 3B, the synchronizing unit 50 sends a user information varying notification indicating the contents of the variation to the management server 3A. If the user information synchronizing unit 10 of the management server 3A receives the user information varying notification, the user information synchronizing unit 10 updates the memory contents of the first user information table TBL11. For instance, the addition of a new user identification information UID, the deletion of the user identification information UID, and the variation of the last login information LastLogin causes the above-described operation of the synchronizing unit 50.

The synchronizing unit 50 may send the user information varying notification to the management server 3A at a predetermined timing. For instance, if the user identification information UID and the last login information LastLogin vary, the synchronizing unit 50 may immediately send the user information varying notification, or may send the contents of the variation altogether at a predetermined time. If the user information synchronizing unit 10 inquires of the application server 3B the variation of the user information at a predetermined timing, the synchronizing unit 50 may send the user information varying notification including the contents varied after the time of the last inquiry. In this case, if the user information synchronizing unit 10 of the management server 3A receives the user information varying notification, the user information synchronizing unit 10 updates the memory contents in the first user information table TBL11.

The friend upper limit synchronizing unit 18 functions as an acquiring unit for acquiring the friend upper limit Limit of the users set in the application server corresponding to the identification information AppID accepted by the accepting unit 11. The friend upper limit synchronizing unit 18 synchronizes the memory contents in the first friend upper limit table TBL12 with those in the second friend upper limit table TBL12a. Specifically, if the memory contents in the second friend upper limit table TBL12a varies in the application server 3B, the synchronizing unit 50 sends the friend upper limit varying notification indicating the contents of the variation to the management server 3A. If the friend upper limit synchronizing unit 18 of the management server 3A receives the friend upper limit varying notification, the friend upper limit synchronizing unit 18 updates the memory contents in the first friend upper limit table TBL 12.

The friendship synchronizing unit 19 synchronizes the memory contents in the first relation table TBL13 with those in the second relation table TBL13a. Specifically, if the memory contents in the second relation table TBL13a varies in the application server 3B, the synchronizing unit 50 sends the friendship varying notification indicating the contents of the variation to the management server 3A. If the friendship synchronizing unit 19 receives the friendship varying notification, the friendship synchronizing unit 19 updates the memory contents in the first relation table TBL13.

The synchronizing unit 50 sends the friendship varying notification to the management server 3A if the friendship is established with the approval of the friend request. If the friendship is not established with the refusal of the friend request, the synchronizing unit 50 may send the friendship varying notification to the management server 3A to synchronize the memory contents in the first relation table TBL13 with the second relation table TBL13a. However, this is optional. It is unnecessary to send the friendship varying notification and to perform the synchronization. If the synchronization of the memory contents is performed for the status information Stat, it is possible to know that the friend request is pending in the management server 3A.

If the friendship is cancelled in the application server 3B, the cancellation of the friendship is reflected in the second relation table TBL13a. The synchronizing unit 50 detects this to send the friendship varying notification to the management server 3A. If the friendship synchronizing unit 19 receives the friendship varying notification, the friendship synchronizing unit 19 reflects the cancellation of the friendship to the memory contents in the first relation table TBL13.

An application server that is not in connection with the management server 3A provides stand-alone services by using the second information table TBL11a, the second friend upper limit table TBL12a, and the second relation table TBL13a. By applying this variation, if the synchronizing unit 50 is added by using functions including an API, this kind of application server can be easily incorporated into the application system 100.

According to this variation, the synchronization is performed between the second user information table TBL11a in the application server and the first user information table TBL11 in the management server 3A, and between the second relation table TBL13a in the application server and the first relation table TBL13 in the management server 3A. As a result, it is possible to easily reflect the management of the discrete application in the application server to the management server 3A.

According to this variation, the synchronization is performed between the second friend upper limit table TBL12a in the application server and the first friend upper limit table TBL12 in the management server 3A. As a result, it is possible to easily reflect the management of the friend upper limit in the discrete application of the application server to the management server 3A.

It is possible to conduct the above-described inquiring processing as a result of the management of the reflected discrete application.

Figure 46:
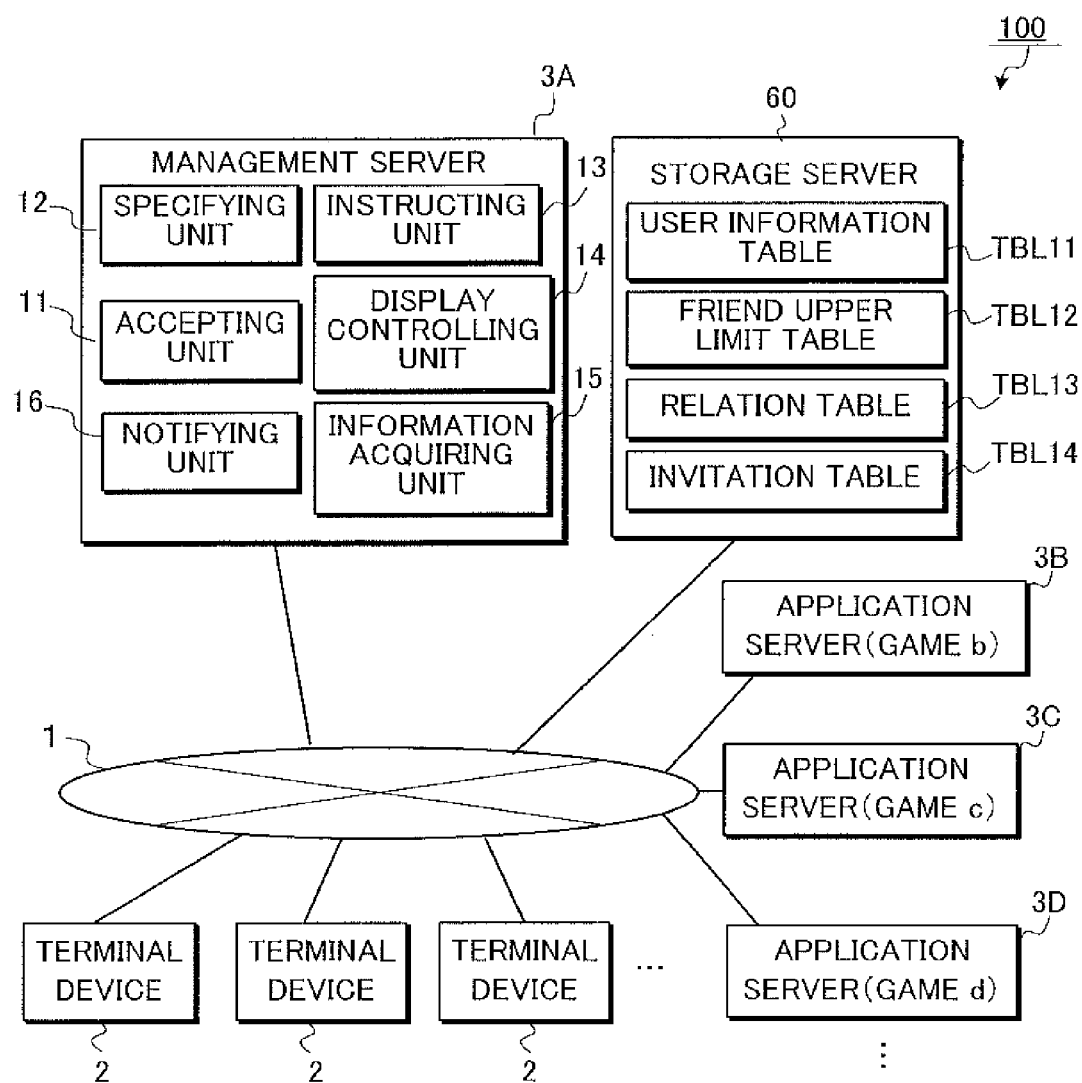
FIG. 46 is a block diagram illustrating an application system according to the variation.

(12) In the above-described embodiment and each of the variations, it is described that the user information table (access table) TBL11, the friend upper limit table TBL12, the relation table TBL13, and the invitation table TBL14 are stored in the hard disc 33 in the management server 3A. However, the present invention is not limited to this example. As illustrated in FIG. 46, the user information table (access table) TBL11, the friend upper limit table TBL12, the relation table TBL13, and the invitation table TBL14 may be stored in a storage server 60 that can communicate with the management server 3A through the communication network 1. In this case, the management server 3A may access the storage server 60 as necessary to read information from each of the tables.

Figure 47:
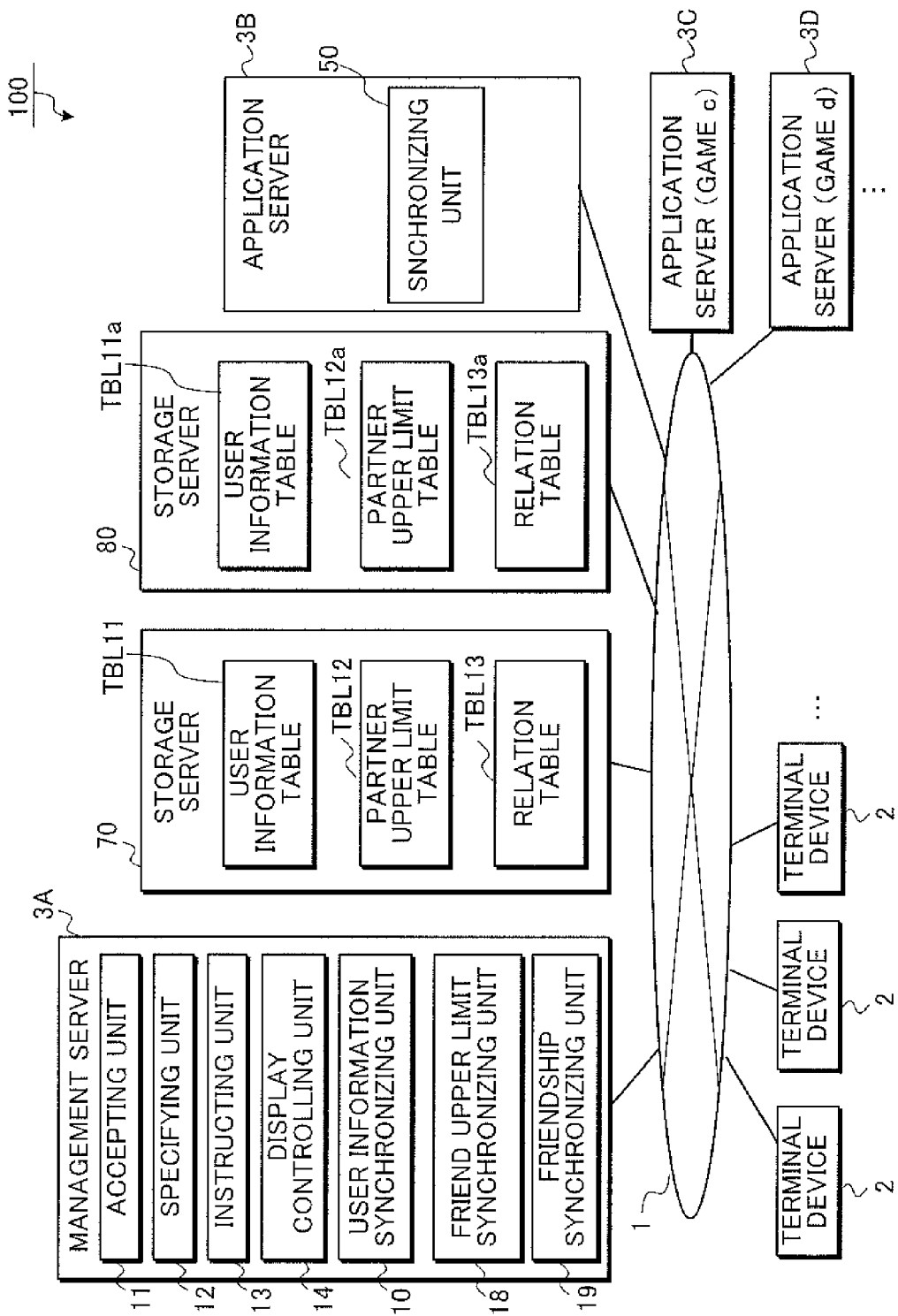
FIG. 47 is a block diagram illustrating an application system according to the variation.

As illustrated in FIG. 47, the user information table (access table) TBL11, the friend upper limit table TBL12, and the relation table TBL13 may be stored in a storage server 70 that can communicate with the management server 3A through the communication network 1. The user information table TBL11a, the friend upper limit table TBL12a, and the relation table TBL13a may be stored in a storage server 80 that can communicate with the application servers 3B, 3C, 3D through the communication network 1.

In this case, the management server 3A may access the storage server 70 as necessary to read information from each of the tables. The application servers 3B, 3C, 3D may access the storage server 80 as necessary to read information from each of the tables.

(13) In the above-described application and each of the variations, a program executed in the management server 3A or the terminal device 2 may be stored in a recording medium readably by a computer. By using the recording medium, the program can be installed in the computer, for instance.

The above-described "computer" includes an OS and hardwares including peripherals. The "computer" may include plural computer devices that are connected with each other through a network including a communication line, such the Internet, WAN, LAN, a leased line. The "recording medium readably by a computer" may be a non-transitory recording medium such as a flexible disc, a magneto optical disc, a ROM, a CD-ROM, and a hard disc built in a computer.

The "recording medium readably by a computer" includes one storing a program for a prescribed time such a volatile memory (RAM) installed inside a server to which the program is transmitted through a network or a computer system that becomes a client. The above-described program may be one for implementing a part of the above-described functions. The above-described program may be one that can implement the above-described functions in combination with a program that has been recorded in a computer system, that is, so-called difference file (difference program). A distributing server that distributes a program for implementing a part or all of the functions of the present invention, a storage medium provided in the distributing server, and a storage medium storing the program in order to distribute the program with the distributing server, which exists in an external of the distributing server, are included in the scope of the present invention.

A part or all of the above-described functions may be implemented as an integrated circuit such as a LSI (Large Scale Integration). Each of the above-described functions may be implemented as a discrete processor. A processor may be achieved by integrating a part or all of the functions. An integrated circuit may be achieved by not only the LSI, but also a leased circuit, or a general purpose processor. If an alternative technology of the integrated circuit as a substitution of the LSI is appeared as a result of the improvement of a semiconductor technology, an integrated circuit by the alternative technology may be used.

4. The Invention Introduced from the Embodiment and the Variations

The invention relating to the invitation processing and the invention relating to the inquiring processing are introduced from the above-described embodiment and variations in addition to the friend request processing.

(1) the Invention Relating to the Invitation Processing

To be able to invite the users with whom friendships are built in the other applications to a certain application, the management server according to the present invention is capable of communicating with plural application servers corresponding to plural applications respectively and terminal devices of users. The management server is provided with: an accepting unit adapted for accepting identification information identifying an application designated through an operation of the terminal device performed by a request user requesting a presentation of a candidate user who is a candidate for invitation; a specifying unit adapted for specifying a part or all of candidate users satisfying the condition that the part or all of the candidate users do not utilize the application indicated by the identification information accepted by the accepting unit; a display controlling unit adapted for displaying the part or all of the candidate users specified by the specifying unit in the terminal device of the request user in order to select the candidate user from the candidate users; and a notifying unit adapted for notifying the candidate user selected from one or more the candidate users displayed in the terminal device of an invitation request.

According to this invention, the management server capable of communicating with the plural application servers specifies one or more the candidate users who do not utilize the application which is designated by the request user and is subject to the invitation. Therefore, the request user can select one or more the users that are subject to the invitation from one or more the candidate users who do not utilize the application which the request user utilizes. This allows the request user to easily invite the other users to the application service the request user utilizes.

Another condition that a friendship is built in the utilized application the request user has utilized may be added to the above-described condition. In this case, it is possible to invite the user with whom the request user's friendship is built in another application. This allows the request user to spread a new application to the user with whom the request user's friendship was built in the past.

The notifying unit may notify the selected candidate user of the invitation request in any manner. For instance, the notifying unit may send an email of the invitation request to a registered email address. The notifying unit may display the fact that there is the invitation request on a page the selected candidate user manages. The notifying unit may post an article about the invitation on another social medium or a bulletin board.

In the above-described management server, it is preferable that the server is provided with a user information table storing user information of one or more users utilizing the application identified by the identification information, the first user information table in which the user information is associated with the identification information. It is also preferable that the specifying unit specifies the candidate user satisfying the above-described condition by referring to the user information table.

According to this invention, the management server is provided with the user information table associating various applications with the user information of all of the users to store them therein. Therefore, it is possible to centrally manage the users in the plural applications.

In the above-described management server, it is preferable that the server is provided with a friendship table storing at least a pair of the user information of the user sending the friend request and the user information of the user accepting the friend request in which the pairs are associated with the identification information, and the specifying unit specifies the user as the candidate user with whom a friendship is built in the utilized application the request user has utilized by referring to the friendship table, in addition to the above-described condition.

According to this invention, the pairs of a sender side and a receiver side in the friend request are stored. Therefore, it is unnecessary to store all of the other user information in records in which the status information associated with one user information indicates the friendship status using the one user information as a key. This allows the memory capacity for data to be reduced.

It is preferable that the specifying unit extracts the user information of the other user accepting the friend request in the pairs of the user information of the other user accepting the friend request and the user information of the one user sending the friend request which coincides with the user information of the request user out of the pairs of the user information of the one user and the user information of the other user associated with the identification information corresponding to the application the request user has utilized by referring to the friendship table. It is also preferable that the specifying unit extracts the user information of the one user sending the friend request in the pairs of the user information of the one user sending the friend request and the user information of the other user accepting the friend request which coincides with the user information of the request user. Then, it is preferable that the other user in the extracted user information of the other user and the one user in the extracted user information of the one user are treated as the user with whom the friendship is built in the application the request user has utilized.

In the above-described management server, it is preferable that the display controlling unit displays the utilized application the request user has utilized in the terminal device of the request user in order to select the candidate user from the candidate users, and the specifying unit specifies the part or all of the candidate users satisfying the above-mentioned condition in the utilized application selected by the request user in the terminal device.

According to this invention, after displaying the utilized application in the terminal device of the request user in order to select the candidate user from the candidate users, the existence of the friendship is a prerequisite for the candidate user. This allows the request user to conduct the selection suitable to the request user's preference such as the selection of the utilized application similar to the application to which the request user wants to invite.

In the above-described management server, it is preferable that the specifying unit specifies the number of users who can be invited to the utilized application the request user has utilized, and the display controlling unit displays the number of the users who can be invited specified by the specifying unit in the terminal device of the request user.

According to this invention, it is possible to know the number of the users who can be invited, so that the convenience for the request user is greatly improved. The number of the users who can be invited may be specified for each utilized application, and may be displayed for each utilized application in the terminal device of the request user. The total number of the users who can be invited in the plural utilized applications may be specified, and may be displayed in the terminal device of the request user.

In the above-described management server, it is preferable that the server is provided with an invitation table storing the pairs of the user information of the inviting user and the user information of the invited user, and the status information indicting the status of the invitation, in which the pairs are associated with the identification information. It is also preferable that the specifying unit specifies the user information of the invited user in the record, in which the user information of the invited user is associated with the identification information accepted by the accepting unit, and in which the user information of the request user coincides with the user information of the inviting user, and in which the status information indicates the refusal at least, by referring to the invitation table, to exclude the user in the specified user information from one or more the candidate users.

According to this invention, the status information indicating the status of the invitation and the user information are associated with each other, and managed by the invitation table. Therefore, it is possible to know the status of the invitation by referring to the invitation table. If the status information indicates the refusal, the corresponding user is excluded from the candidate user. Accordingly, the nuisance that the invitation is sent again even if the invitation is refused can be prevented in advance.

In the above-described management server, it is preferable that the status indicated by the status information includes a first status indicating that the invitation is refused or accepted, and when the status information indicates the refusal of the invitation at least, the status information is in the first status.

According to this invention, the refusal and the acceptance are included in the first status all together. Therefore, the user is excluded from one or more the candidate users not only when the invitation is refused but also when the invitation is accepted. The user accepting the invitation has utilized the application that is subject to the invitation, so that it is unnecessary to invite the user accepting the invitation. By employing the above-described data structure, it is possible to exclude the inviting user and the invited user simultaneously to reduce the processing load.

In the above-described management server, it is preferable that the status indicated by the status information includes a second status indicating that the invitation is pending. It is also preferable that the specifying unit extracts the user information of the invited user in the record, in which the user information is associated with the identification information accepted by the accepting unit, and in which the user information of the request user coincides with the user information of the inviting user, and in which the status information indicates the second status, by referring to the invitation table. It is further preferable the specifying excludes the extracted user and the specified user from one or more the candidate users.

According to this invention, the user for whom the invitation is pending is excluded from one or more the candidate users. Therefore, it is possible to get rid of redundant processing such that the invitation is requested again even if the invitation is pending. This allows the processing load of the management server to be reduced.

In the above-described management server, it is preferable that the server is provided with a managing unit for managing the inviting user and the invited user. It is also preferable that the specifying unit specifies the user refusing the invitation if the user is managed as the user whom the request user invites by the managing unit to exclude the specified user from one or more the candidate users. According to this invention, the inviting user and the invited user are associated with each other to be managed. Therefore, it is possible to prevent the invitation for the refusing user from being conducted in advance.

In the above-described management server, it is preferable that the server is provided with the invitation table storing the pairs of the user information of the inviting user and the user information of the invited user, and the status information indicting the status of the invitation, and an invitation date information indicating the date of invitation, in which the pairs, the status information, and the invitation date information are associated with the identification information. It is also preferable that the specifying unit, by referring to the invitation table, specifies the user information of the invited user in the record, in which the user information of the invited user is associated with the identification information accepted by the accepting unit, and in which the user information of the request user coincides with the user information of the inviting user, and in which the status information indicates the refusal at least, and in the record in which the status information indicates that the invitation is pending, and a predetermined time elapses since the date indicated. It is further preferable that the specifying unit excludes the specified user from one or more the candidate users.

According to this invention, it is allowed that the invitation is requested again for the user for whom the invitation is pending. It is possible to encourage the user who does not decide whether to accept or refuse the invitation to participate in the application by inviting the user who does not decide whether to accept or refuse the invitation again. However, the invitation requested for many times bothers the user. In the present invention, if the predetermined time elapses since the date of the invitation, the user is excluded from one or more the candidate users even if the status information indicates that the invitation is pending. Therefore, while encouraging the user to participate in the application, it is possible to prevent a nuisance.

More specifically, it is preferable that the status indicated by the status information includes the first status indicating the refusal or acceptance of the invitation and the second status indicating that the invitation is pending. It is also preferable that the status indicated by the status information is the first status when the status information indicates the refusal of the invitation at least. It is further preferable that the status indicated by the status information is the second status when the status information indicates that the invitation is pending. In this case, the refusal and acceptance can be managed as one status. This allows the data structure to be simplified.

In the above-described management server, it is preferable that the server is provided with the invitation table storing the pairs of the user information of the inviting user and the user information of the invited user, and the status information indicting the status of the invitation, and the invitation date information indicating the date of invitation, in which the pairs, the status information, and the invitation date information are associated with the identification information. It is also preferable that the specifying unit, by referring to the invitation table, specifies the user information of the invited user in the record, in which the user information of the invited user is associated with the identification information accepted by the accepting unit, and in which the user information of the request user coincides with the user information of the inviting user, and in which the status information indicates the refusal at least. It is further preferable that the specifying unit excludes the specified user from one or more the candidate users, and the server is provided with a rewriting unit rewrites the status indicated by the status information from the pending status of the invitation to the refusal of the invitation if there is no response from the invited user even if the predetermined period elapses since the date of sending of the invitation request.

According to this invention, if there is no response from the invited user even if the predetermined period elapses since the date of sending of the invitation request, the status indicated by the status information is rewritten from the pending status of the invitation to the refusal of the invitation. This allows the judgment whether or not the user corresponds to the candidate user to be simplified.

More specifically, it is preferable that the status indicated by the status information includes the first status indicating the refusal or acceptance of the invitation and the second status indicating the pending status of the invitation. It is also preferable that the status indicated by the status information is the first status when the status information indicates the refusal of the invitation at least. It is further preferable that the rewriting unit rewrites the status indicated by the status information from the second status to the first status if there is no response from the invited user even if the predetermined period elapses since the date of notification of the invitation request.

According to this invention, the user is excluded from one or more the candidate users not only when the invitation is refused but also when the invitation is accepted. The user accepting the invitation has utilized the application that is subject to the invitation, so that it is unnecessary to invite the user accepting the invitation. By employing the above-described data structure, it is possible to exclude the inviting user and the invited user simultaneously to reduce the processing load.

The present invention can be comprehended as a non-transitory computer readable recording medium with a program stored thereon, the program is used for a computer of the management server. The non-transitory computer readable recording medium is one with the program stored thereon, the program is used for the computer of the management server capable of communicating with plural application servers corresponding to plural applications respectively and terminal devices of users. The program causes the computer as an accepting unit adapted for accepting identification information identifying an application designated through an operation of the terminal device performed by a request user requesting the presentation of a candidate user who is a candidate for invitation; a specifying unit adapted for specifying a part or all of candidate users satisfying the condition that the part or all of the candidate users do not utilize the application indicated by the identification information accepted by the accepting unit; a display controlling unit adapted for displaying the part or all of the candidate users specified by the specifying unit in the terminal device of the request user in order to select the candidate user from the candidate users; and a notifying unit adapted for notifying the candidate user selected from one or more the candidate users displayed in the terminal device of an invitation request.

The present invention can be comprehended as a controlling method for the management server. The controlling method is one for controlling the management server capable of communicating with plural application servers corresponding to plural applications respectively and terminal devices of users. The controlling method is provided with: accepting identification information identifying an application designated through an operation of the terminal device performed by a request user requesting a presentation of a candidate user who is a candidate for invitation; specifying the part or all of the candidate users satisfying the condition that the part or all of the candidate users does not utilize the application indicated by the accepted identification information; displaying the part or all of specified candidate users specified in the terminal device of the request user in order to select the candidate user from the candidate users; and notifying the candidate user selected from one or more the candidate users displayed in the terminal device of an invitation request.

(2) the Invention Relating to the Inquiring Processing

To provide the management server notifying the users of the situations of the whole of friends in various applications, the management server according to the present invention is capable of communicating with plural application servers corresponding to plural applications respectively and terminal devices of users. The management server is provided with: an accepting unit adapted for accepting a request through an operation of the terminal device performed by the user; an information acquiring unit adapted for acquiring usage information relating to a certain application a certain user utilizes, the certain user with whom a friendship is built with a request user sending the request accepted by the accepting unit in utilized application the request user has utilized out of the plural applications; and a display controlling unit adapted for displaying the acquired usage information acquired by the information acquiring unit.

According to this invention, the information acquiring unit acquires the usage information relating to the application the friend utilizes, the friend with whom the request user's friendship is built in the utilized application the request user has utilized. The display controlling unit displays the acquired usage information in the terminal device. This allows the request user to obtain various information relating to the application the friend utilizes.

The usage information includes the ranking of the popular games, the number of the users playing games, the number of the user to whom the friend request can be sent, and the number of the users who can be invited, for example.

The request based on the operation of the terminal device of the user includes one directly sent from the terminal device to the management server through the operation of the terminal device performed by the request user browsing a page provided by the management server, and one sent from the application server to the management server through the operation of the terminal device performed by the request user browsing a page provided by any of the plural application servers.

More specifically, it is preferable that the above-described management server is provide with a friendship table storing pairs of user information of the users, between whom the friendship is built, associated with the identification information identifying the application. It is also preferable that the request includes the identification information identifying the application, and the information acquiring unit extracts the pairs of the user information of the request user and the user information of the user with whom the request user's friendship is built, along with the identification information, by referring to the friendship table, to obtain the usage information using the extracted pairs of the user information and the identification information.

The management server according to the present invention is capable of communicating with plural application servers corresponding to plural applications respectively and terminal devices of users. The management server is provided with: an accepting unit adapted for accepting a request based on an operation of the terminal device performed by the user; an information acquiring unit adapted for acquiring usage information relating to a certain application the user utilizes, the user with whom a friendship is built with a request user sending the request accepted by the accepting unit in the application corresponding to the request out of the plural applications; and a display controlling unit adapted for displaying the acquired usage information acquired by the information acquiring unit.

According to this invention, the information acquiring unit acquires the usage information relating to the application the friend of the request user utilizes in the application corresponding to the request. The display controlling unit displays the acquired usage information in the terminal device. This allows the request user to obtain various information relating to the friends via a specific application.

The request based on the operation of the terminal device performed by the user includes one directly sent from the terminal device to the management server through the operation of the terminal device performed by the request user browsing a page provided by the management server, and one sent from the application server to the management server through the operation of the terminal device performed by the request user browsing a page provide by any of the plural application servers.

If the request is sent from the terminal device to the management server, the request may include the identification information identifying the application the request user selects out of the plural applications. The information acquiring unit may specify the application corresponding to the request using the identification information included in the request. If the request is sent from the application server, the information acquiring unit may specify the application provided by the application server sending the request as the application corresponding to the request.

More specifically, the above-described management server may be provided with: the friendship table storing the pairs of the user information of the users between whom a friendship is built associated with the identification information identifying the application; an application information table storing the identification information and application information indicating the contents of the application, in which the identification information and the application information are associated with each other; the request including the identification information indicating the application; the information acquiring unit extracting the pairs of the user information of the request user, the user information of the user with whom the request user's friendship is built, and the identification information, by referring to the friendship table, to obtain the application information corresponding to the extracted identification information by referring to the application information table.

In the above-described management server, it is preferable that the display controlling unit displays a part or all of the applications in descending order of the number of the users with whom the request user's friendship is built utilizing each of the applications any of the users with whom the request user's friendship is built utilizes.

According to this invention, the applications are displayed in descending order of the number of the users utilizing the applications among the friends. This allows the users to know the ranking of the popular applications at a glance.

In this case, the display controlling unit displays the applications in descending order of the number of the users utilizing the applications, the users with whom the request user's friendship is built. Specifically, the information acquiring unit accumulates the number of the users for each of the applications, and generates the accumulated number for each of the applications as the usage information. The display controlling unit displays the applications in descending order of the accumulated number of the users.

In the above-described management server, it is preferable that the server is provided with an access table storing the identification information identifying the application, the date information indicating the date of utilizing the application, and the user information identifying the user, in which the identification information, the date information, and the user information are associated with each other. It is also preferable that the display controlling unit displays, by using the access table, a part or all of the applications in descending order of the number of the users utilizing the applications in the predetermined period, the users with whom the request user's friendship is built, with respect to the applications any of the users with whom the request user's friendship is built utilizes.

According to this invention, the applications are displayed in descending order of the number of the users utilizing the application among the friends in the predetermined period by referring to the date information. This allows the users to know the ranking of the popular applications utilized among the friends in the predetermined period. It sometimes happens that the users cease to play the application after playing the application on a trial basis, so that it may be desirable that a trial usage is excluded from the coverage of the ranking. According to this invention, the ranking is made for the applications used within the predetermined period, so that it is possible to rank the applications after excluding the trial usage.

The display controlling unit displays the applications in descending order of the number of the users utilizing the applications in the predetermined period. Specifically, the information acquiring unit may accumulate the number of the users utilizing the applications in the predetermined period for each of the applications, the users with whom the request user's friendship is built, by using the access table, with respect to the applications any of the users with whom the request user's friendship is built utilize. The information acquiring unit may generate the accumulated number of the users for each of applications as the usage information. The display controlling unit may display the applications in descending order of the accumulated number of the users.

In the above-described management server, it is preferable that the information acquiring unit specifies the number of the users with whom the request user's friendship is built for each of the applications, with respect to the applications any of the users with whom the request user's friendship is built utilizes, to generate the usage information. It is also preferable that the display controlling unit displays the number of the users for each of the applications.

According to this invention, the number of the users utilizing the application is displayed in the terminal device. This allows the users to obtain information which is more detailed than a relative ranking.

In the above-described management server, it is preferable that the server is provided with the access table storing the identification information identifying the application, the date information indicating the date of utilizing the application, and the user information identifying the user, in which the identification information, the date information, and the user information are associated with each other. It is also preferable that the information acquiring unit specifies the number of the users utilizing the applications in the predetermined period for each of the applications, the users with whom the request user's friendship is built, by using the access table, with respect to the applications any of the users with whom the request user's friendship is built utilizes, to generate the usage information. It is also preferable that the display controlling unit may display the number of the users for each of the applications.

According to this invention, the number of the users utilizing a certain application among the friends in the predetermined period is specified by referring to the date information. This allows the users to know the number of the user utilizing the certain application in a certain period among the friends at a glance.

In the above-described management server, the accepting unit accepts the request including the identification information identifying the application. The information acquiring unit specifies the number of the users, to whom the friend request can be sent, and who satisfies all of conditions out of the users with whom the request user's friendship is built in the utilized applications the request user has utilized, the first condition in which the user utilizes the application identified by the identification information accepted by the accepting unit, the second condition in which the request user's friendship with the user has not been built in the identified application, the third condition in which friend upper limit is not encountered in the identified application.

According to this invention, it is possible to display the number of the users, with whom the friendship is built in the utilized application, and who utilize the identified application (the first condition), with whom the request user's friendship is not built in the identified application (the second condition), and whose friend upper limit is not encountered (the third condition). This allows the user to know the number of the user to whom the friend request can be sent in the identified application, and allows the user's convenience to be improved. Displaying a part or all of candidate users to whom the friend request can be sent in order to select the candidate user from the candidate users may enable the users to select the user out of one or more the candidate users to send the friend request.

In the above-described management server, it is preferable that the accepting unit accepts the request including the identification information identifying the application. It is also preferable that the information acquiring unit acquires the number of the users as the usage information, the users who can be invited and satisfies the condition that the user does not utilize the application identified by the identification information accepted by the accepting unit.

According to this invention, it is possible to know the number of the users who can be invited to the identified application. This allows convenience to be improved. Displaying a part or all of candidate users who can be invited in order to select the candidate user from the candidate users may enable the user to select the user out of the part or all of the candidate users to invite the selected user.

The number of the users to whom the friend request can be sent and the number of the users who can be invited may be displayed in parallel. The candidate user to whom the friend request can be sent and the user who can be invited may be displayed in the terminal device in order to select the candidate user from the candidate users. In this case, by switching the screen to the display of the users who can be invited, the invitation can be conducted without sending the friend request, if the application the user wants to invite to and the friend the user wants to invite to the application have been decided, and it becomes clear that the friend has not utilized the application. It sometime happens that a certain user, to whom another user wants to send the friend request in a certain application, does not utilize the certain application. Presenting the pairs of the function of the friend request and the function of the invitation to the user in the terminal device allows the user's convenience to be improved.

The present invention can be comprehended as a non-transitory computer readable recording medium with a program stored thereon, the program is used for a computer of the management server. The non-transitory computer readable recording medium is one with the program stored thereon, the program is used for the computer of the management server capable of communicating with plural application servers corresponding to plural applications respectively and terminal devices of users. The program causes the computer as the accepting unit adapted for accepting a request through on an operation of the terminal device performed by the user; an information acquiring unit adapted for acquiring usage information relating to a certain application a certain user utilizes, the certain user with whom a friendship is built with a request user sending the request accepted by the accepting unit in utilized application the request user has utilized out of the plural application; and a display controlling unit adapted for displaying the acquired usage information acquired by the information acquiring unit.

The present invention can be comprehended as a controlling method for the management server. The controlling method for the management server according to the present invention is one for controlling the management server capable of communicating with plural application servers corresponding to plural applications respectively and terminal devices of users. The method is provide with: accepting a request through an operation of the terminal device performed by the user; acquiring usage information relating to a certain application a certain user utilizes, the certain user with whom the request user's friendship is built with a request user sending the accepted request in utilized application the request user has utilized out of the plural applications; and displaying the acquired usage information.

LIST OF REFERENCE SIGNS

1 . . . communication network, 2 . . . terminal device, 3A . . . management server, 3B, 3C, 3D . . . application server, TBL1 . . . user information table, TBL12 . . . friend upper limit table, TBL 13 . . . relation table, TBL14 . . . invitation table, 11 . . . accepting unit, 12 . . . specifying unit, 13 . . . instructing unit, 14 . . . display controlling unit, 15 . . . information acquiring unit, 16 . . . notifying unit, 30 . . . CPU, 100 . . . application system.

The invention claimed is:

1. A management server capable of communicating with plural application servers corresponding to plural applications respectively and terminal devices of users, the management server comprising:
   an accepting unit adapted for accepting identification information identifying an application designated through an operation of the terminal device performed by a request user requesting a presentation of a candidate user who is a candidate for a friend;
   a specifying unit adapted for specifying a part or all of candidate users satisfying all of conditions out of one or more users with whom the request user's friendship is built in one or more utilized applications that the request user has utilized, a first condition in which the candidate user utilizes the designated application identified by the identification information accepted by the accepting unit, a second condition in which the request user's friendship with the candidate user has not been built in the designated application, a third condition in which a friend upper limit is not encountered;
   a display controlling unit adapted for displaying the part or all of the candidate users specified by the specifying unit in the terminal device of the request user in order to select one or more users from the part or all of the candidate users; and
   an instructing unit adapted for instructing the application server corresponding to the application indicated by the identification information accepted by the accepting unit to send a friend request for the one or more users selected out of the part or all of the candidate users by the request user.

2. The management server according to claim 1,
   wherein the specifying unit specifies the candidate user satisfying the first condition by referring to a first user information table storing user information of one or more users utilizing the application identified by the identification information, the first user information table in which the user information is associated with the identification information,
   wherein the specifying unit specifies the candidate user satisfying the second condition by referring to a first friendship table storing at least a pair of user information of one user and user information of another user, the one user and the other user having a friendship with the one user, the first friendship table in which the pair of the user information of the one user and the user information of the other user is associated with the identification information.

3. The management server according to claim 2, comprising:
   a user information synchronizing unit adapted for synchronizing contents of the first user information table with contents of a second user information table storing user information of one or more users utilizing the application provided by the application server; and
   a friendship synchronizing unit adapted for synchronizing contents of the first friendship table with contents of a second friendship table storing at least a pair of user information of one user and user information of another user, the one user and the other user having a friendship with the one user in the application provided by the application server.

4. The management server according to claim 2, wherein the pair of the user information of the one user and the user information of the other user stored in the first friendship table comprises the user information of the one user sending a friend request to the other user, and the user information of the other user accepting the friend request.

5. The management server according to claim 1, further comprising an acquiring unit adapted for acquiring the friend upper limit of any of the users, which is set in the application server corresponding to the identification information accepted by the accepting unit, wherein the specifying unit specifies the candidate user satisfying the third condition by referring to a first friend upper limit table storing the friend upper limit acquired by the acquiring unit, the first friend upper limit table in which the acquired friend upper limit is associated with the user information of the user.

6. The management server according to claim 5, the acquiring unit comprising a friend upper limit synchronizing unit adapted for synchronizing contents of the first friend upper limit table with contents of a second friend upper limit table storing the friend upper limit managed by the application server, the second friend upper limit table in which the managed friend upper limit is associated with the user information of each or the users.

7. The management server according to claim 1, further comprising an acquiring unit adapted for sending an inquiry request for the friend upper limit of any of the users to the application server corresponding the identification information accepted by the accepting unit, and acquiring the friend upper limit from the application server as a response to the inquiry request, wherein the specifying unit specifies the candidate user satisfying the third condition on the basis of the friend upper limit acquired by the acquiring unit.

8. The management server according to claim 1, wherein the condition that the candidate user utilizes the application within a predetermined period is added to the first condition, wherein the specifying unit specifies the candidate user satisfying the first condition by referring to an access table storing date information indicating a date of utilizing the application, the access table in which the date information is associate with the user information of the user.

9. The management server according to claim 1, wherein the display controlling unit displays the utilized application the request user has utilized in the terminal device of the request user in order to select the one or more users from the part or all of the candidate users, wherein the specifying unit specifies the part or all of the candidate users satisfying all of the conditions out of the users with whom the request user's friendship is built in the utilized application selected by the request user in the terminal device.

10. The management server according to claim 1, wherein the specifying unit specifies the number of users who can be invited to utilized application the request user has utilized, wherein the display controlling unit displays the number of the users who can be invited specified by the specifying unit in the terminal device of the request user.

11. A non-transitory computer readable recording medium with a program stored thereon, the program is used for a computer of a management server, the management server capable of communicating with plural application servers corresponding to plural applications respectively and terminal devices of users, the program causing the computer to function as:

an accepting unit adapted for accepting identification information identifying an application designated through an operation of the terminal device performed by a request user requesting a presentation of a candidate user who is a candidate for a friend;

a specifying unit adapted for specifying a part or all of candidate users satisfying all of conditions out of one or more users with whom the request user's friendship is built in one or more utilized applications that the request user has utilized, a first condition in which the candidate user utilizes the designated application identified by the identification information accepted by the accepting unit, a second condition in which the request user's friendship with the candidate user has not been built in the designated application, a third condition in which a friend upper limit is not encountered;

a display controlling unit adapted for displaying the part or all of the candidate users specified by the specifying unit in the terminal device of the request user in order to select one or more users from the part or all of the candidate users; and an instructing unit adapted for instructing the application server corresponding to the application indicated by the identification information accepted by the accepting unit to send a friend request for the one or more users selected out of the part or all of the candidate users by the request user.

12. A controlling method for controlling a management server capable of communicating with plural application servers corresponding to plural applications respectively and terminal devices of users, the controlling method comprising:

accepting identification information identifying an application designated through an operation of the terminal device performed by a request user requesting a presentation of a candidate user who is a candidate for a friend;

specifying a part or all of candidate users satisfying all of conditions out of one or more users with whom the request user's friendship is built in one or more utilized applications that the request user has utilized, a first condition in which the candidate user utilizes the designated application identified by the accepted identification information, a second condition in which the request user's friendship with the candidate user has not been built in the designated application, a third condition in which a friend upper limit is not encountered;

displaying the part or all of specified candidate users in the terminal device of the request user in order to select one or more users from the part or all of the candidate users; and instructing the application server corresponding to the application indicated by the accepted identification information to send a friend request for the one or more users selected out of the part or all of the candidate users by the request user.

13. A non-transitory computer readable recording medium with a program stored thereon, the program is used for a computer of a terminal device of a user, wherein a management server connected to plural application servers corresponding to plural applications respectively is capable of communicating with plural terminal devices of plural users, wherein each of the plural application servers manages a friend upper limit indicating an upper limit of the number of friends for each of the users, wherein the management server comprising: an accepting unit adapted for accepting identification information identifying an application designated through an operation of the terminal device performed by a request user requesting a presentation of a candidate user who is a candidate for a friend; a specifying unit adapted for specifying a part or all of candidate users satisfying all of conditions out of one or more users with whom the request user's friendship is built in one or more utilized applications that the request user has utilized, a first condition in which the candidate user utilizes the designated application identified by the identification information accepted by the accepting unit, a second condition in which the request user's friendship with the candidate user has not been built in the designated application, a third condition in which a friend upper limit is not encountered; a display controlling unit adapted for displaying the part or all of the candidate users specified by the specifying unit in the terminal device of the request user in order to select one or more users from the part or all of the candidate users; and an instructing unit adapted for instructing the application server corresponding to the application indicated by the identification information accepted by the accepting unit to send a friend request for the one or more users selected out of the part or all of the candidate users by the request user, wherein the program causes the computer to function as:

a detecting unit adapted for detecting a variation of the friend upper limit of the user of the terminal device; and a notifying unit adapted for notifying the management server of a varied friend upper limit if the variation of the friend upper limit is detected by the detecting unit.

* * * * *